United States Patent [19]
Kikinis et al.

[11] Patent Number: 5,634,080
[45] Date of Patent: May 27, 1997

[54] HAND-HELD PORTABLE COMPUTER HAVING AN ELECTROLUMINESCENT FLAT-PANEL DISPLAY WITH PIXEL ELEMENTS AT RIGHT ANGLES TO THE PLANE OF THE DISPLAY AND AN EXCITATION DIRECTION PARALLEL TO THE PLANE OF THE DISPLAY

[75] Inventors: Dan Kikinis, Sratoga; Pascal Dornier, Sunnyvale; William J. Seiler, Scotts Valley, all of Calif.

[73] Assignee: Elonex IP Holdings, Ltd., London, England

[21] Appl. No.: 277,154

[22] Filed: Jul. 19, 1994

Related U.S. Application Data

[63] Continuation-in-part of Ser. No. 144,231, Oct. 28, 1993, and a continuation-in-part of Ser. No. 159,078, Nov. 29, 1993, which is a continuation-in-part of Ser. No. 97,946, Jul. 26, 1993, Pat. No. 5,278,730, which is a continuation of Ser. No. 905,480, Jun. 29, 1992, abandoned.

[51] Int. Cl.⁶ .......................... G06F 13/00; G06F 19/00; H04M 11/00
[52] U.S. Cl. .................... 395/893; 395/281; 395/200.01; 345/156; 345/45; 455/89; 361/686
[58] Field of Search ..................... 395/325, 800, 395/275, 425, 725, 155, 280, 200.09, 893, 281, 200.01; 345/160, 169, 173, 45, 156; 379/93, 96; 364/709.09; 320/21; 313/505, 510; 361/686; 455/89

[56] References Cited

U.S. PATENT DOCUMENTS

| | | | |
|---|---|---|---|
| 4,016,542 | 4/1977 | Azure | 345/160 |
| 4,523,297 | 6/1985 | Ugon et al. | 364/709.1 |
| 4,534,012 | 8/1985 | Yokozawa | 395/275 |
| 4,545,023 | 10/1985 | Mizzi | 364/709.13 |
| 4,748,656 | 5/1988 | Gibbs et al. | 379/93 |
| 4,785,226 | 11/1988 | Fujisawa et al. | 320/21 |
| 4,849,674 | 7/1989 | Cherry et al. | 313/509 |
| 5,029,183 | 7/1991 | Tymes | 375/1 |
| 5,065,357 | 11/1991 | Shiraishi et al. | 395/200 |
| 5,133,076 | 7/1992 | Hawkins et al. | 395/800 |
| 5,210,854 | 5/1993 | Beaverton et al. | 395/500 |
| 5,239,227 | 8/1993 | Kikinis | 313/506 |
| 5,243,332 | 9/1993 | Jacobson | 345/44 |

Primary Examiner—Gopal C. Ray
Attorney, Agent, or Firm—Donald R. Boys

[57] ABSTRACT

A personal digital assistant module with a local CPU, memory, and I/O interface has a host interface comprising a bus connected to the local CPU and a connector at a surface of the personal digital assistant for interfacing to a bus connector of a host general-purpose computer, providing direct bus communication between the personal digital assistant and the host general-purpose computer. In an embodiment, the personal digital assistant also stores a security code. The personal digital assistant according to the invention forms a host/satellite combination with a host computer having a docking bay, wherein upon docking a docking protocol controls access by the host to memory of the personal digital assistant based on one or more passwords provided by a user to the host. In another embodiment the personal digital assistant also has an expansion port connected to the local CPU, and expansion peripheral devices may be connected and operated through the expansion port.

13 Claims, 53 Drawing Sheets

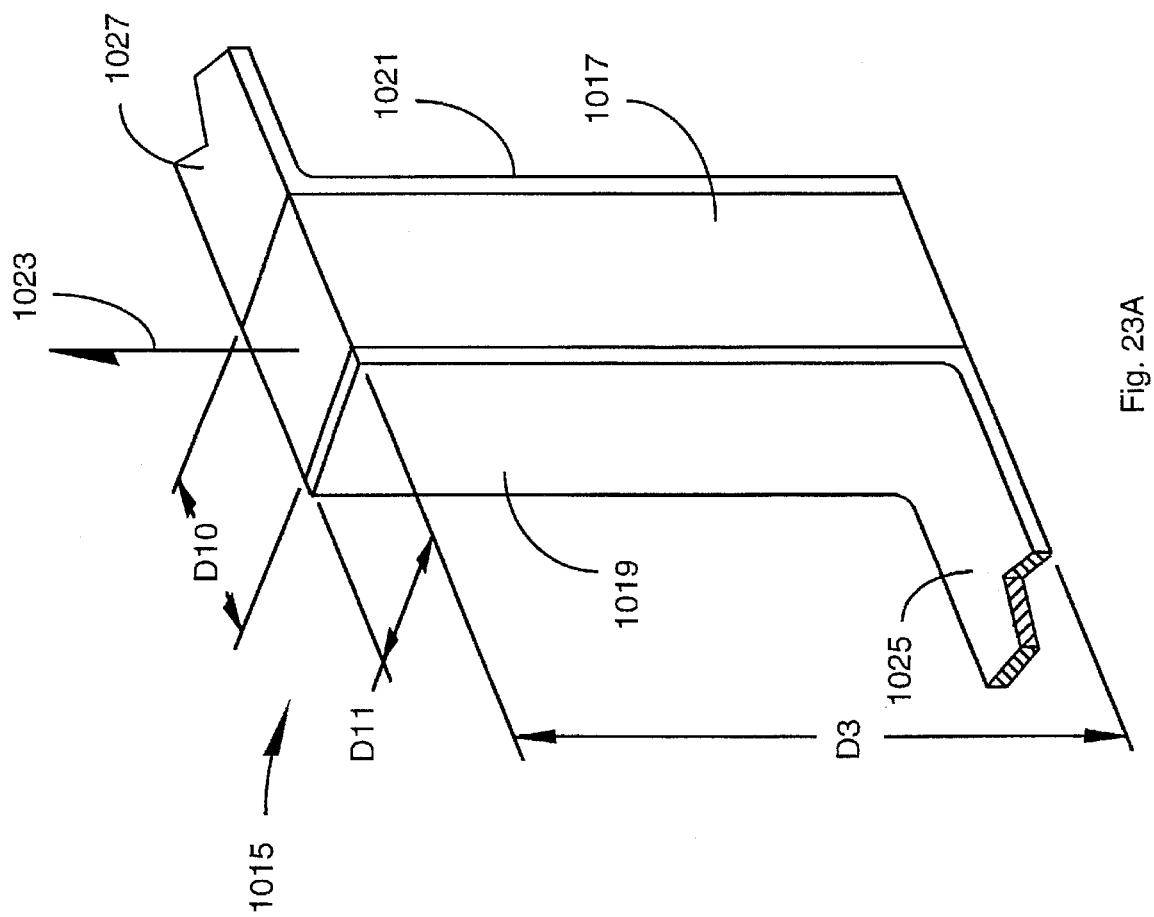

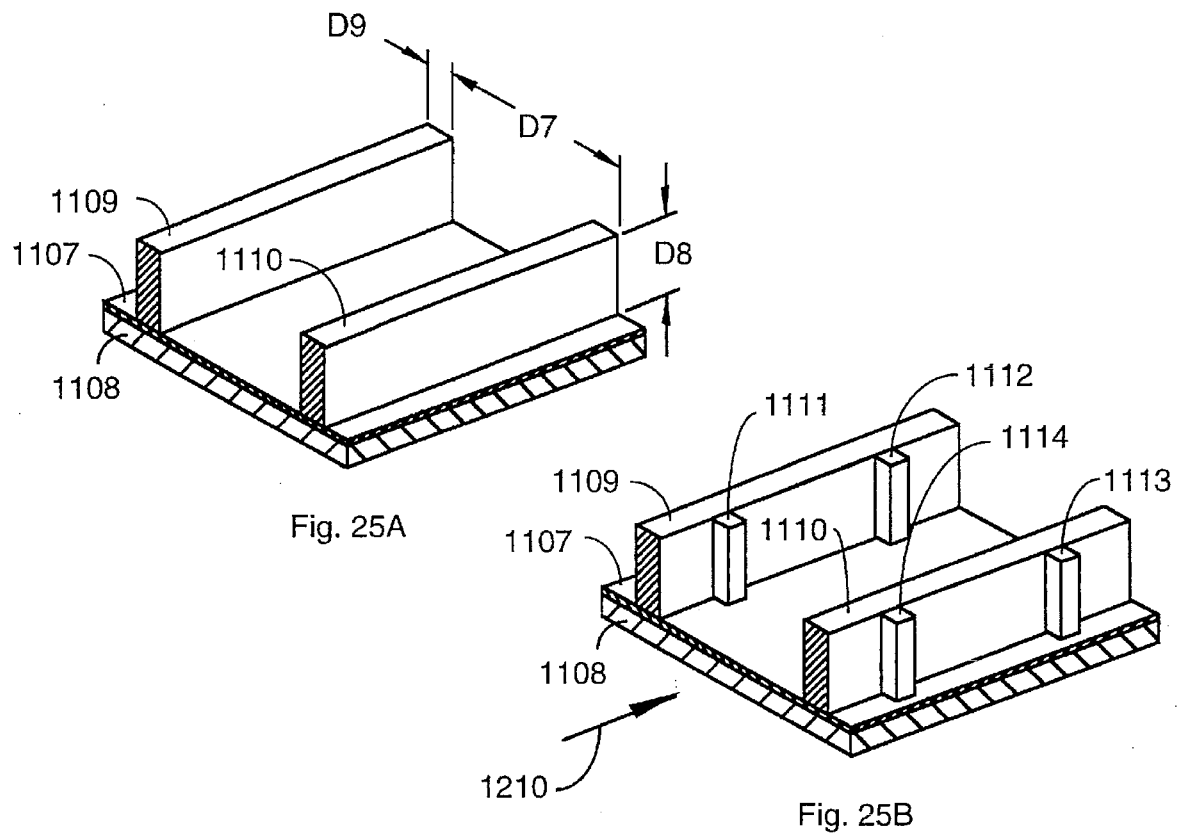
Fig. 25A
Fig. 25B
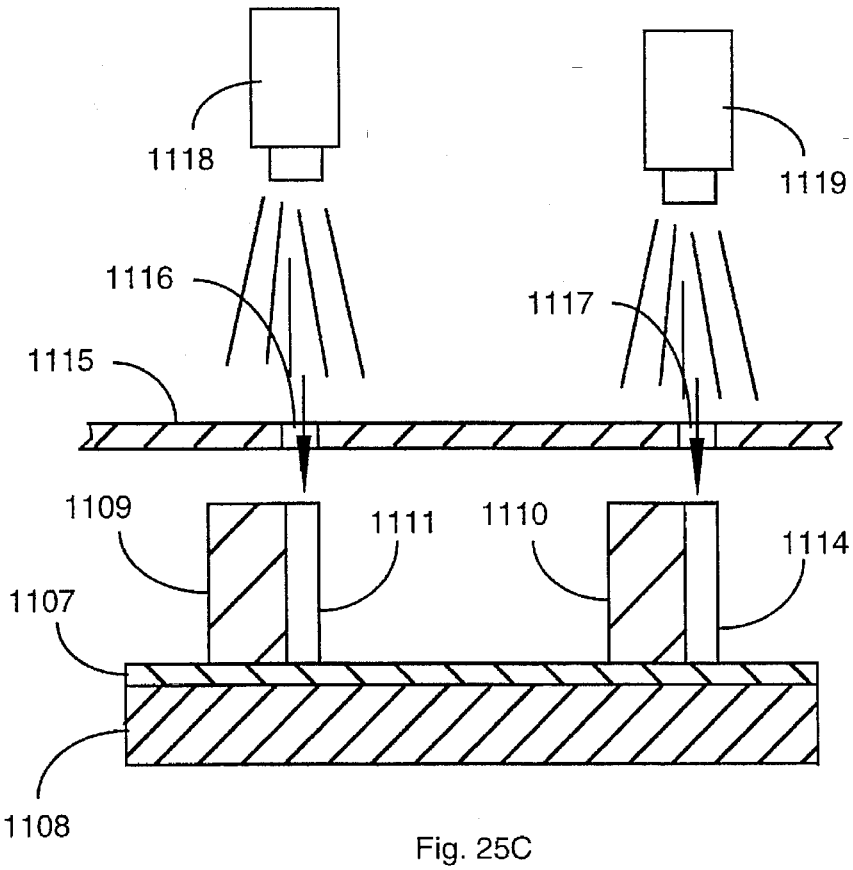
Fig. 25C

HAND-HELD PORTABLE COMPUTER HAVING AN ELECTROLUMINESCENT FLAT-PANEL DISPLAY WITH PIXEL ELEMENTS AT RIGHT ANGLES TO THE PLANE OF THE DISPLAY AND AN EXCITATION DIRECTION PARALLEL TO THE PLANE OF THE DISPLAY

CROSS REFERENCE TO RELATED APPLICATIONS

This application is a continuation-in-part of copending application Ser. No. 08/144,231 filed Oct. 28, 1993, a continuation-in-part of copending application Ser. No. 08/159,078 filed Nov. 29, 1993, which is a continuation-in-part of 08/097,946 filed Jul. 26, 1993, now U.S. Pat. No. 5,278,730, which is a continuation of application Ser. No. 07/905,480, filed Jun. 29, 1992, abandoned; and comprises in addition the description and drawings of U.S. Pat. No. 5,239,227, published Aug. 24, 1993.

FIELD OF THE INVENTION

This invention is in the area of portable computers and pertains more specifically to small portable computing devices known in the art as personal digital assistants.

BACKGROUND OF THE INVENTION

Personal Digital Assistant (PDA) units, as of the date of this disclosure, enjoy a position of hope in the computer marketplace. Some believe this approach, a small, relatively inexpensive, and eminently portable computer unit, having software specifically written for tasks a user might expect to perform while travelling, will provide eminently useful and therefore salable computer products. Apple Computer, Hewlett Packard, and several other well-known computer manufacturers have made a considerable investment at no small risk in such systems.

Given the new systems now introduced, and those coming, for what is now known about them, there are still a number of drawbacks and problems. For example:

1. The PDA systems introduced are relatively costly, with starting prices ranging from several hundred dollars to two thousand dollars and more. At such prices, rivalling current pricing for desktop systems, the buying public may react negatively. It is true that prices will fall with increased manufacturing volume and competition, but the high end start may well be rejected by potential users.

2. The systems being offered are still relatively bulky, considering the limited range of tasks that may be accomplished. Most are certainly too big to be conveniently carried in a breast pocket. The Newton, manufactured by Apple Corporation, weighs about a pound and is approximately the size of a VHS video cassette.

3. A big drawback of the PDA systems being offered is the way they transfer data between a user's desktop unit, or other host, and the PDA. Known communication is by modem, by infrared communication, and by serial connection. These all require manipulation by a user, modulation on one or both ends of the communication path, and the like, which can be time-consuming, error-prone, and hardware extensive (expensive). Presently the Newton offers a modem and/or LED communication as an option, adding to the overall cost.

4. In known PDAs, software is typically recorded in ROM, so updating applications can be difficult, and sometimes impossible. This will be a problem because PDA users will not want the PDA to have the same capabilities at all times. Typical users will be people who travel and work while they travel. These users require different functions for a trip to Taiwan than for a trip to France, for example. What is needed is a quick and convenient means to update and substitute software.

5. Another difficulty is in the fact that the data files a user manipulates while travelling are typically data files also resident in a home unit, herein called a host unit, such as the user's office desktop machine or notebook or other portable computer. It is very troublesome to have two or more sets of critical data, with differences that one must remember to correct at an appropriate time. This can cause unending grief if files are not correctly updated. At best, current PDAs must use a relatively slow compressed bus to download and upgrade files. Typically this is done through a serial port, using a linking application like Laplin™.

What is needed is a small and inexpensive PDA that has a range of features that eliminate the above-described risks and problems. This new unit needs to be smaller than those presently being introduced, such as about credit-card size, or perhaps modeled on the PCMCIA type II or type III standard form factors. It should be inexpensive enough to produce that at least a minimum version could be sold in the roughly $100–$200 range, so it will be a unit seen to be a relatively inexpensive necessity. A PDA unit of this sort is the subject of the present invention, and is termed by the inventors a micro-PDA, or μPDA.

A very important feature of the μPDA in an aspect of the present invention is a direct parallel bus interface with a connector allowing the unit to be docked by plugging it into a docking bay in a host unit. Moreover, when the μPDA is docked in the host, there needs to be a means to effectively disable the CPU in the μPDA and to provide direct access to both the μPDA software and data storage by the host CPU. This direct access would provide immediate ability to communicate in the fastest available fashion between the μPDA and the host, and would also facilitate additional important features to be described below.

The μPDA also needs to have an optional compressed bus interface, including a connector separate from the host interface, so add-on devices may be utilized, such as a FAX modem, cellular communication, printer, and so on.

An additional feature that could be optionally provided in another aspect of the invention is an interface at the host to allow a user to select pre-arranged software mixes for loading to the μPDA. This feature comprises a set of control routines operating in conjunction with the host's display and input means, to allow the user to quickly select applications and perhaps data as well to be loaded to the μPDA satellite, to configure the smaller, more portable unit for specific itineraries and purposes.

Another desirable feature is an ability to automatically update data files. In this aspect of the invention, with the μPDA docked, data on the host, if carrying a later date and/or time stamp than the data on the μPDA, would be automatically updated on the μPDA and vice-versa. When one returns from an excursion using the μPDA and docks the satellite at the host, the host gains access, determines the location of the latest files, and accomplishes the update. This feature needs to have some built-in user prompting to be most effective. It makes the μPDA a true satellite system.

SUMMARY OF THE INVENTION

In a preferred embodiment of the invention a personal digital assistant module is provided comprising an enclosure for enclosing and supporting internal elements, a microcontroller within the enclosure for performing digital operations to manage functions of the personal digital assistant module, and a memory means connected to the microcontroller by a memory bus structure for storing data and executable routines. There is a power supply means within the enclosure for supplying power to functional elements of the personal digital assistant module, a display means operable by the microcontroller and implemented on a surface of the enclosure, and input means connected to the microcontroller for providing commands and data to the personal digital assistant module. A host interface means comprising a host interface bus structure, which may be configured as a PCMCIA bus interface, is connected to the microcontroller and to a first portion of a host interface connector at a surface of the enclosure, and the host interface means is configured to directly connect the microcontroller to a compatible bus structure of a host computer.

In one embodiment the personal digital assistant module has an expansion bus interface comprising an expansion bus structure connected to the microcontroller and to a first portion of an expansion bus connector for connecting the microcontroller to a peripheral device. A wide variety of peripheral devices are provided for use with the personal digital assistant of the invention.

In another aspect, the personal digital assistant module also has a nonvolatile storage device, such as an EEPROM connected to the microcontroller and containing one or more codes unique to the personal digital assistant, for uniquely identifying the personal digital assistant to digital devices connected on the host interface.

In a preferred embodiment, the display and input means for the personal digital assistant are configured as an overlaid touch screen and LCD display on a surface of the outer case of the personal digital assistant. A pointer device implemented as a thumbwheel in one embodiment and as a pressure sensitive pad in another is provided as part of the input capability.

The personal digital assistant module forms a unique combination with a general-purpose computer host having the personal digital assistant as a satellite unit. The host in this instance has a docking bay especially configured to dock the personal digital assistant, making a direct bus connection between the local CPU of the personal digital assistant and the CPU of the host. The host may be a desktop unit, a notebook computer, or a smaller portable like a palmtop computer. This combination provides power and convenience not before available.

Many other digital devices are also provided according to various aspects of the invention, such as modems, scanners, data acquisition peripherals, cellular phones, and a software vending machine, and all of these devices may be appended to the personal digital assistant by the expansion bus interface or, in many cases, by the host interface.

The personal digital assistant provided according to embodiments of the present invention is a unit more compact than conventional PDAs. It represents a new dimension in computer application and applicability, in a form promising to be eminently usable by and useful to almost everyone; and at a price easily affordable. It solves the communication problem intrinsic to personal digital assistants relative to larger and more powerful computers, with a unit that fits into a user's breast pocket, and at a very low price.

BRIEF DESCRIPTION OF THE DRAWINGS

FIG. 23A is an isometric view of a single electroluminescent cell according to the present invention.

FIG. 25A is an isometric view showing early steps in a thick film construction technique according to the present invention.

FIG. 25B shows a further step in the thick film technique, with vertically oriented electroluminescent structures deposited adjacent to electrically conductive traces.

FIG. 25C illustrates a unique deposition technique for constructing the electroluminescent structures of FIG. 25B.

FIG. 25I is an isometric view similar to FIG. 25A illustrating an early step in a construction technique according to an alternative embodiment of the present invention.

DESCRIPTION OF THE PREFERRED EMBODIMENTS

Figure 1A:
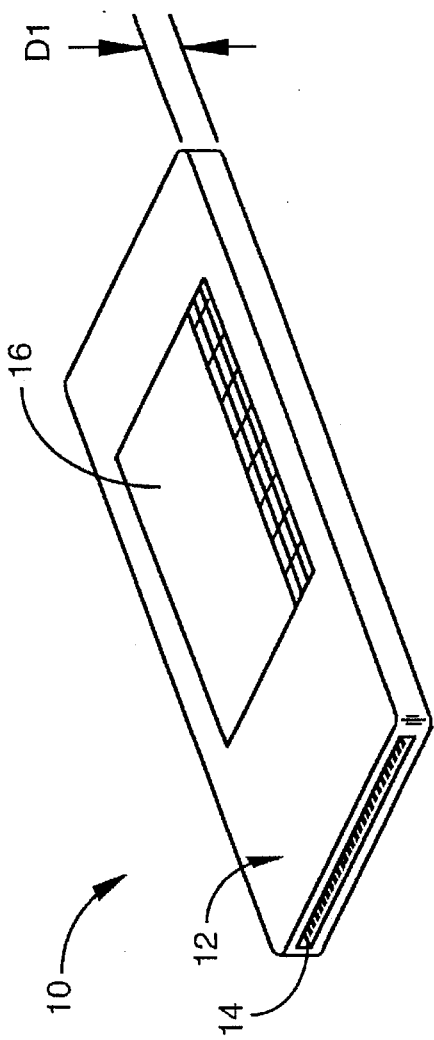
FIG. 1A is an isometric view of a μPDA according to an embodiment of the present invention.

FIG. 1A is an isometric view of a μPDA 10 according to an embodiment of the present invention. In this embodiment the unit is modeled on the PCMCIA standard Type II form factor, having a height D1 of about 5 mm. Body 12 is described in further detail below, and has a female portion 14 of a connector recessed at one end for engaging a mating male portion of the connector in a host computer, connecting the μPDA internal circuitry directly with a host internal bus. The host unit may be a notebook computer having a docking bay for the μPDA. Docking bays may be provided in desktop and other types of computers, and even in other kinds of digital equipment, several examples of which are described below.

Still referring to FIG. 1A, in this embodiment there is a combination I/O interface 16 implemented on one side of the μPDA, comprising a display overlaid with a touch-sensitive planar structure providing softkey operation in conjunction with interactive control routines operable on the μPDA in a stand-alone mode.

Although not shown in FIG. 1A, there may also be guides implemented along the sides of the case of the device for guiding the module in and out of a docking bay in a host computer unit. There may also be one or more mechanical features facilitating engagement and disengagement of the module in a docking bay.

Figure 1B:
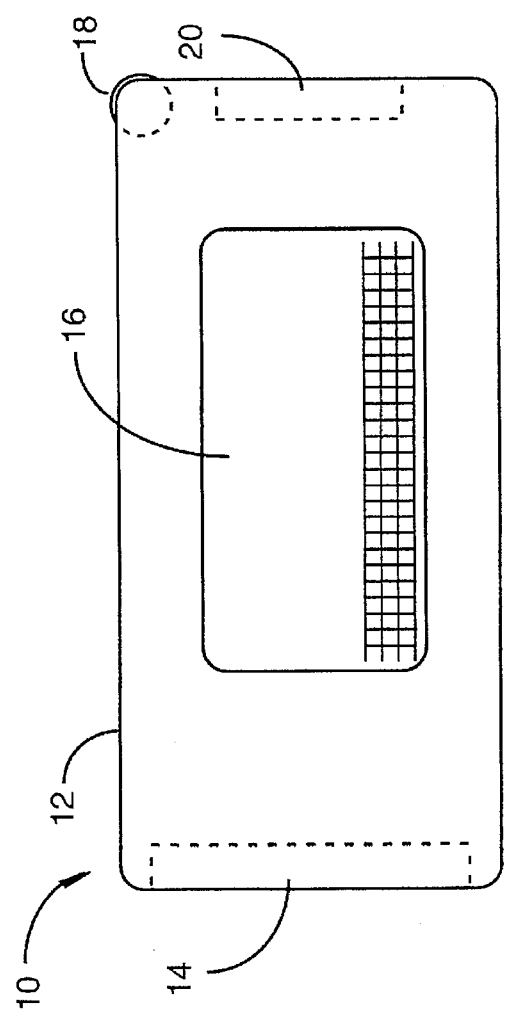
FIG. 1B is a plan view of the μPDA of FIG. 1A.

FIG. 1B is a top plan view of the μPDA of FIG. 1A, showing a thumbwheel 18 implemented in one corner of the μPDA. The thumbwheel in this embodiment is an input device capable of providing input with both amplitude and directional characteristics, and in some cases rate characteristics as well. The thumbwheel has many uses in combination with the μPDA and I/O interface 16. One such use is controlled scrolling of icons, characters, menus, and the like on the display of the device. The thumbwheel provides many of the functions of a pointer device.

In this embodiment of the μPDA a second external connector portion 20 is provided. This connector portion is for engaging peripheral devices as part of an expansion bus interface.

Figure 2:
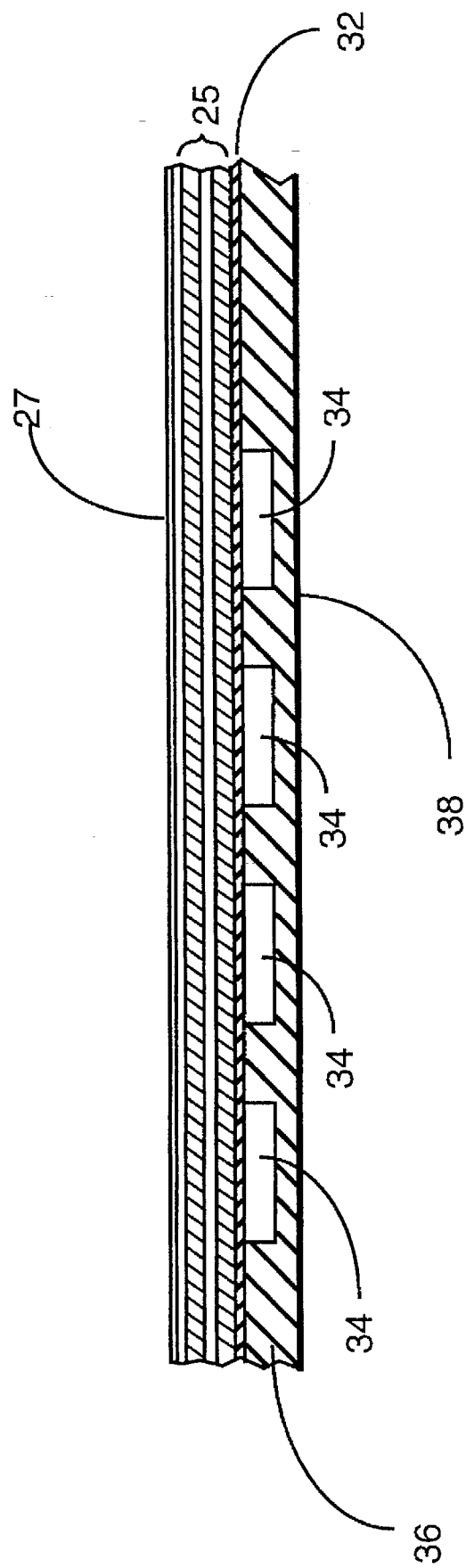
FIG. 2 is a cross-sectional view of the μPDA of FIGS. 1A and 1B.

FIG. 2 is a simplified cross-sectional view of a means for constructing a μPDA according to the present invention in a Type II PCMCIA, or other relatively small package. ICs 34 are encapsulated in a conformal material 36, and interconnection is accomplished by traces on a flexible polymer film 32 shown as overlaying the encapsulated structure. In this structure the ICs are not packaged in the conventional manner having solder leads for assembly to a printed circuit board. Rather, connections are made directly between the solder pads on the chip and the traces on the Kapton film. Also there is no intention to relate ICs indicated by element No. 34 with specific functional ICs in a μPDA. This cross-section is illustrative of a method of construction only.

In this compact construction there may also be traces on the side of film 32 away from the interconnections for the CPU and memory for connection to other elements, such as display 25 and touch-sensitive screen 27.

LCD display 25 is implemented on one side of the μPDA, and touch-sensitive interface 27 is provided overlaying at least a portion of the LCD display. A metal casing 38, or other suitable material or combinations of material, surrounds the internal components and conforms to Type II PCMCIA form factors. This simplified cross-section illustrates some of the principles of construction that can allow the needed components to be inexpensively fitted into the small form factor needed. In another embodiment the μPDA is implemented in the form factor of a type III (10 mm thick) PCMCIA unit, using relatively conventional technology, such as PCB technology, rather than the encapsulated construction described immediately above. Various other constructions, form factors, and combinations are possible, as well.

Figure 3:
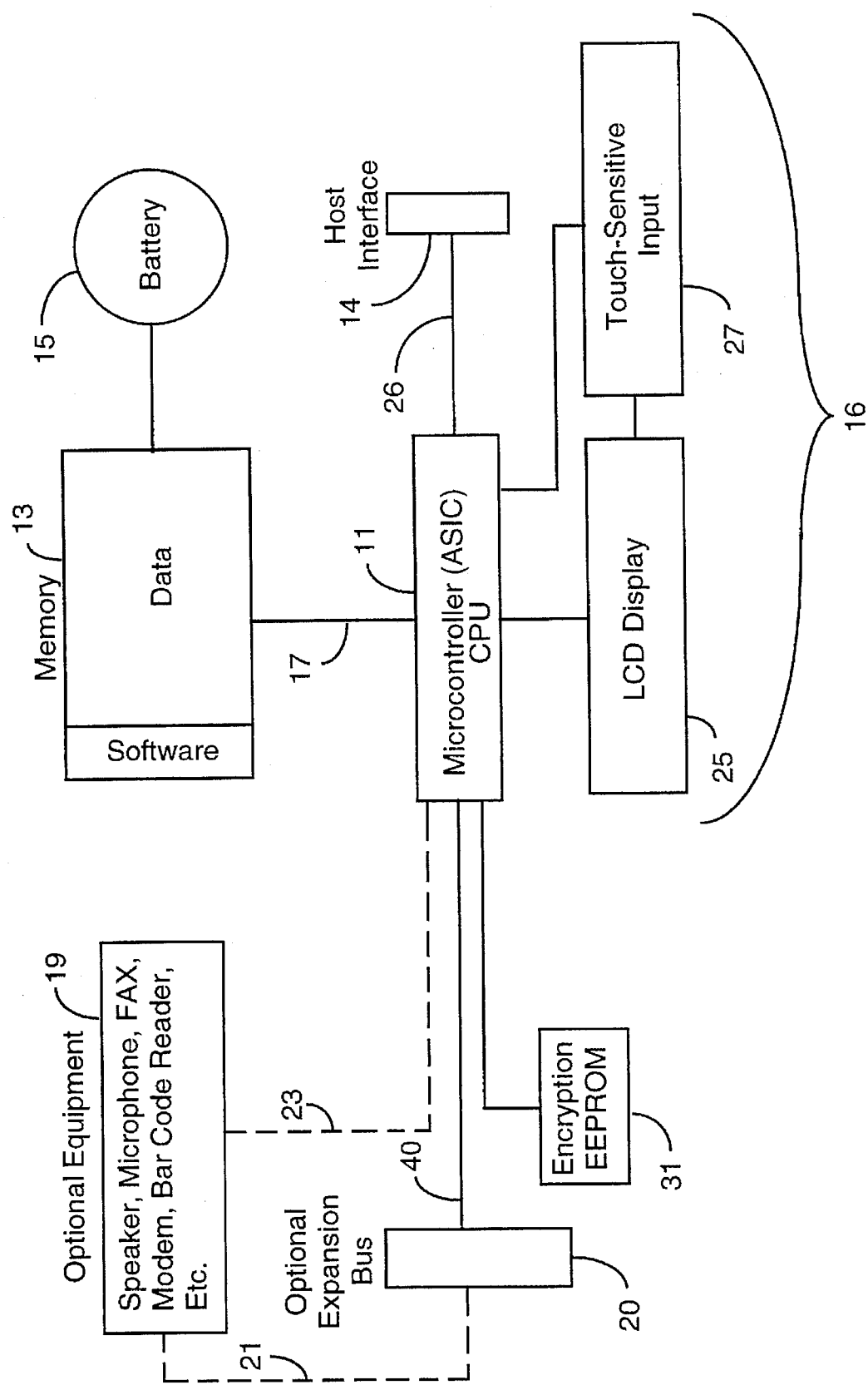
FIG. 3 is a block diagram of the μPDA of FIG. 1A and some peripheral elements.

FIG. 3 is a simplified electrical block diagram of the μPDA of FIGS. 1A, 1B and 2. A unique microcontroller 11 acts as the CPU of the μPDA in the stand-alone mode, that is, when the μPDA is not docked in a host unit. When the μPDA is docked in a host computer, microcontroller 11 acts as a slave unit, granting bus control to the CPU of the host. In docked mode, the CPU of the host thus gains control of the memory contents of the μPDA, subject in most cases to security procedures which are described below. Thus the host computer can transfer data and software into and out of a docked μPDA memory. In other embodiments many other cooperative operating modes may be accomplished between the two CPUs and accessible memory devices.

Memory 13 is preferably a nonvolatile device from 1 to 2 megabytes in this embodiment, and both control routines for applications and data files are stored in this memory. Memory 13 may be flash memory, CMOS ROM, CMOS RAM with battery, or a combination, with the software stored in and the data in the flash memory. The memory device is interfaced to microcontroller 11 via a dedicated bus structure 17, and microprocessor 11 is configured to drive memory bus 17.

A battery 15 is the power source in the stand-alone mode, and may be recharged in one or more of several ways. The power traces are not shown in FIG. 3, but extend to all of the powered devices in the μPDA module. When the unit is docked in the host, the host power source may be connected to pins through the host interface to recharge the battery. Alternatively, an attached means such as a solar panel may be configured to charge the battery and/or provide power to the μPDA. A solar panel for power is described elsewhere in this disclosure. Also the battery may be easily removed for periodic replacement.

Host bus connector 14 is a part of a host interface which comprises a bus structure 26 for providing connection to the host in docked mode, as described above. In a preferred embodiment, the host interface is according to PCMCIA Type II, Rev. 3 standard, which is capable of communication either in PCMCIA mode or in a mode similar to PCI mode. PCI mode refers to a high-speed intermediate bus protocol being developed by Intel corporation, expected to become a standard bus architecture and protocol in the industry. The physical interface at the host in this embodiment is a slot-like docking bay, as is typical of know docking bays for PCMCIA devices. This docking bay may be implemented as a docking box, a built-in unit like a floppy-drive unit, or it may take some other form.

Connector portion 20 is a part of the expansion bus interface described above, comprising a dedicated bus structure 40 connected to microcontroller 11. This interface can be implemented in a number of different ways. The purpose of the optional expansion bus interface is to connect to optional peripheral devices, such as a printer, a FAX modem, a host cellular phone, and others. The expansion bus interface is not an essential feature in a minimum embodiment of the present invention, but provides vastly enhanced functionality in many embodiments.

The expansion interface can take any one of several forms. A preferred form is an extended enhanced parallel port and protocol based on an invention by the present inventors disclosed in a copending patent application. Another form is an indexed I/O port having 8-bit address and 8-bit data capability. The requirement of the expansion port is that the connection and communication protocol be compatible with expansion devices, such as telephone modems, fax modems, scanners, and the like. Many other configurations are possible.

Optional equipment such as devices listed in box 19 may be connected for use with the μPDA through the expansion bus. Selected ones of such devices may also be built in to the μPDA in various embodiments, providing variations of applicability. In the former case, connection is through path 21 and the expansion bus interface via connector portion 20. In the built-in case, connection is in the interconnection traces of the μPDA as indicated by path 23.

I/O interface 16 (also FIG. 1B) is for viewing μPDA application-related data and for touch-sensitive input via softkeys. By softkeys is meant assignment by software of various functions to specific touch sensitive screen areas, which act as input keys. Labels in I/O interface 16 identify functionality of the touch-sensitive areas in various operating modes according to installed machine control routines. LCD display 25 and the touch-sensitive area 27 together form the combination I/O interface 16 described also above.

In some embodiments of the present invention, data and program security is provided comprising an Electrically Erasable Programmable Read Only Memory (EEPROM) 31, which is connected by dedicated communication lines to microcontroller 11. EEPROM 31 holds one or more codes installed at the point of manufacturing to provide security for information transfer between a host and a μPDA. The purpose is to control access by a host to the memory contents of a μPDA, so each μPDA may be configured to an individual. To accomplish this, docking and bus mastering machine control routines are initiated at the point of docking, and this security process is described in more detail below. In other embodiments, security codes may be provided by a Read Only Memory (ROM) chip or other permanent or semi-permanent memory source.

Figure 4:
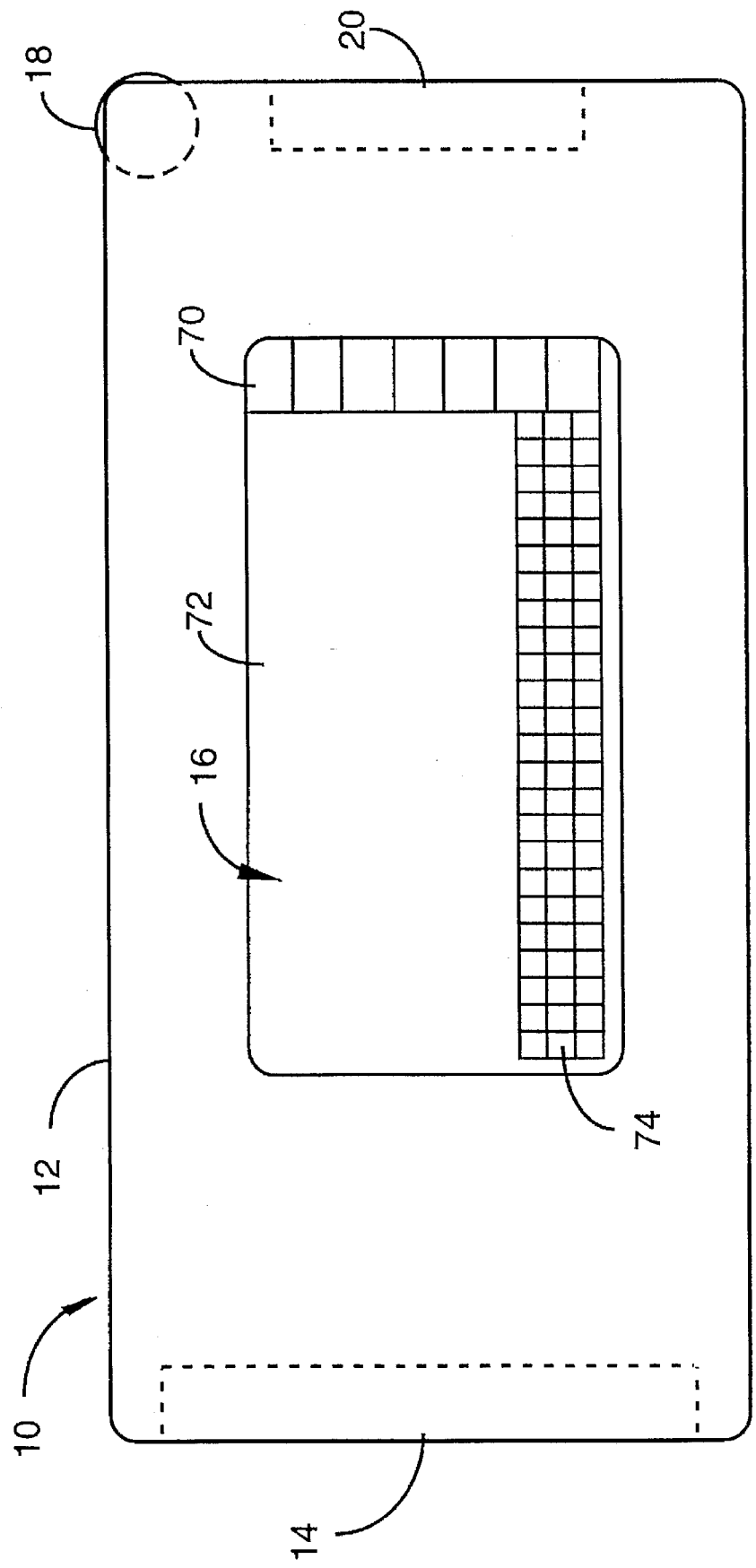
FIG. 4 is a more detailed plan view of the μPDA of FIG. 1A showing in particular an LCD display and touch screen user interface in an aspect of the present invention.

FIG. 4 is a plan view similar to FIG. 1B, of a μPDA, showing in particular I/O interface 16. The size and location of I/O interface 16 may vary, but in general occupies a major portion of one of the sides of the module. In one embodiment I/O interface 16 comprises an LCD display with a resolution of 256 by 144 pixels in a screen size that displays 32 by 12 characters. Each character in this embodiment is displayed in an area eight pixels wide and twelve pixels high. In another embodiment, the pixel resolution is 320 by 200, which corresponds to 40 by 16 characters.

The touch-sensitive areas of the touch-sensitive screen correspond to the character areas of the display. By touching an area with a finger or stylus, data can be entered quite quickly and with minimal CPU demand.

At one corner, thumbwheel 18 provides a two-directional means of controlling the configuration of the display according to installed control routines. A menu 70 is configured at one side to represent the current status of any application in progress and to provide appropriate user menu selections. In a preferred embodiment input from thumbwheel 18 is used for scrolling through menu 70, and active areas may be indicated by a cursor. A user makes a menu selection by pressing the appropriate touch-sensitive area. A specific input may be provided to cause the menu area to be displayed on either side of the display according to a user's preference.

Specific characters are displayed in this embodiment in a region 74, with each character area associated with a touch-sensitive input area. As region 70 dedicated to selectable characters is much too small to display all characters of a standard keyboard, input from thumbwheel 18 allows a user to pan region 74 displaying an entire virtual standard keyboard. Movement of thumbwheel 18 in one direction pans the character region horizontally, and movement in the other direction pans the character region vertically. When an end is reached the window pans onto the virtual keyboard from the other end. In this manner, a user may quickly pan the character window to display an entire standard keyboard, and make selections with a finger or a stylus. Of course, it is not required that a virtual keyboard be laid out for access in the format of a standard keyboard. Characters and punctuation, etc., could just as simply be displayed in a single strip along a region of the display, and scrolled by input from the thumbwheel or other pointer-type input device.

In this embodiment, to avoid delays caused by panning, if the thumbwheel is rotated quickly the character window jumps rather than scrolling to speed up the interface. In addition, menu 70 may optionally provide for a character display in different fonts and sizes, although a single font is preferred to minimize memory demand. It will be apparent to those with skill in the art that there are many alternatives for character selection and display, and many ways thumbwheel 18 may be configured to allow for scrolling and panning.

A document window 72 is provided in this embodiment at the top or bottom of I/O interface 16. A cursor locates the active position within the document for editing purposes. Menu 70 provides selection of available fonts, and input by thumbwheel 18 controls cursor movement over the document. As a document will in almost all cases be much larger than the display capability of region 72, it is necessary to pan the document window in essentially the same manner as the keyboard window is panned. For example, rotating thumbwheel 18 in one direction may display horizontal strips of a document, while rotating the thumbwheel in the opposite direction moves the window vertically strips of the same document.

A soft key or optional hard key maybe configured to switch between the document and keyboard window, and the same or another key may be configured to switch between scrolling left or right, up or down, document or keyboard. A switch key may be used to change the thumbwheel mode of operation. A switch key may also be used in combination with a floating pointer to select characters and menu items. In this embodiment, the user can keep his or her hands relatively stationary on just the thumbwheel and the switch key, making all possible selections. Use of a a switch key in combination with a floating pointer facilitates the use of small fonts. A switch key may also be incorporated as an additional hard key in a convenient location on the case 12.

It will be obvious to a person skilled in the art than there are numerous ways to combine menu selections, switching keys and I/O configurations to provide a user-friendly user interface. A further embodiment of the present invention provides an I/O set-up application wherein a user may completely customize features of I/O area displays.

There are other sorts of mechanical interfaces which may be used to provide pointer-style input in different embodiments of the invention as alternatives to the thumbwheel disclosed. One is a four-way force-sensitive mouse button and a selector button, which may be located at opposite ends of case 12 below I/O interface 16. Each button is designed to be operated by one finger. The four-way force-sensitive mouse button can provide menu scrolling of a cursor and panning and/or indexing of keyboard and document windows, while the selector button is used to select and edit according to position of a cursor. This configuration minimizes hand movement and keeps the I/O area clear for viewing.

Implementation of thumbwheels, pressure-sensitive switches and buttons, and the like, are known in the art, including the translation of mechanical motion and pressure to electrical signals and provision of such signals to a microcontroller. For this reason, details of such interfaces are not provided in this disclosure. Combinations of such inputs with displays and input areas may, however, be considered as inventive.

Figure 5:
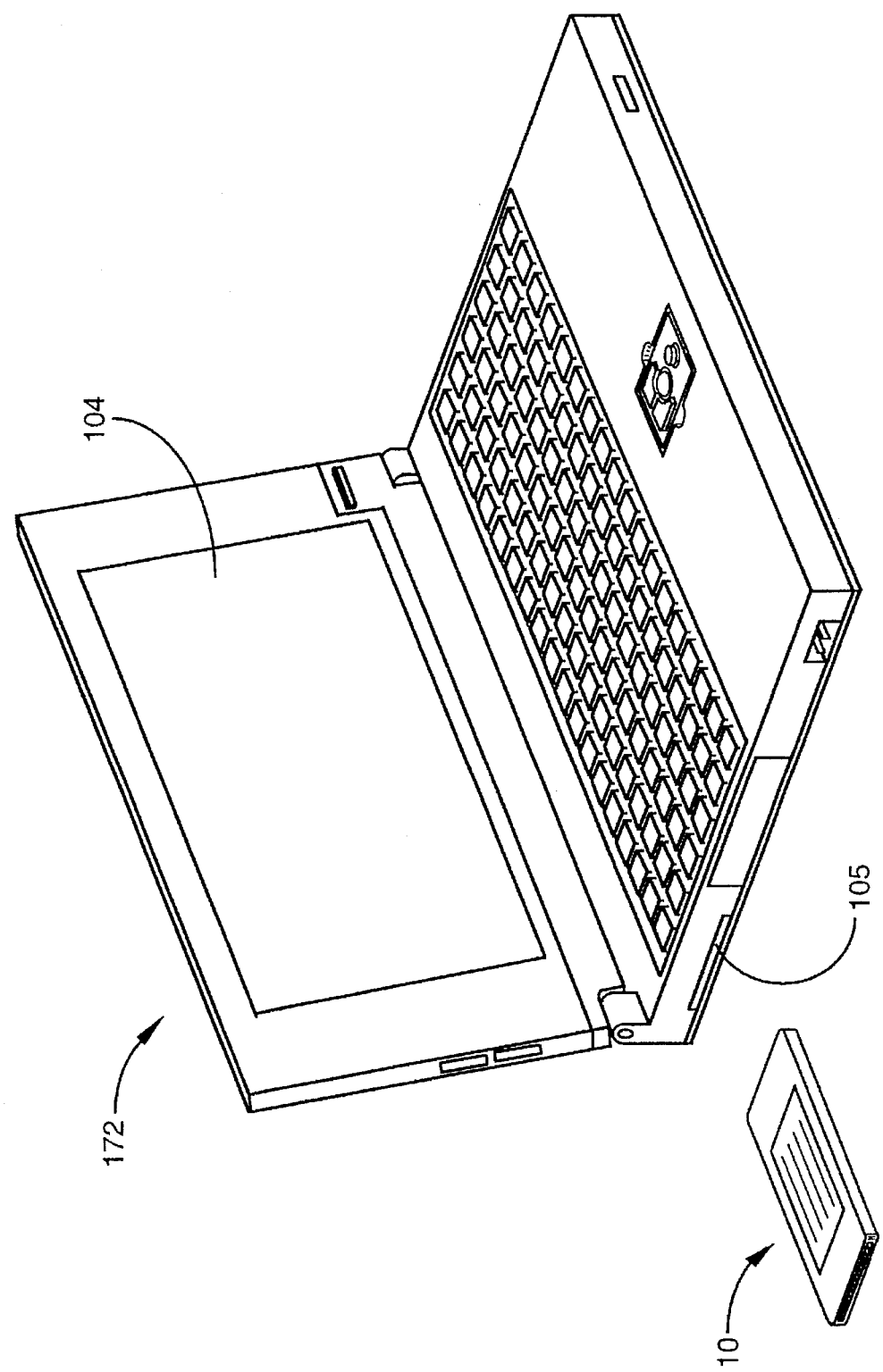
FIG. 5 is an isometric view of a μPDA and a host notebook computer in an aspect of the present invention, with the μPDA about to be docked in a docking bay of the notebook computer.

FIG. 5 is an isometric drawing of a µPDA 10 in position to be docked in a notebook computer 172 via a Type II PCMCIA docking port 105 according to an embodiment of the present invention. As further described below, once the µPDA is docked, it is activated and a procedure is initiated with the host computer to manage communication and verify memory access rights (security).

Access rights are considered important by the inventors for a number of reasons. Firstly, through the expedient of one or more specific codes, unique to each µPDA, a user may protect files stored in his module from access by unauthorized persons. The code can be used both to control access to data and files via I/O interface 16, and also through the host bus interface, so data and files may be secure from access by an unauthorized host system.

In the former case, when a µPDA is powered up, an application routine can query the user for an access code to be entered at I/O interface 16 FIG. 4). If the code is not entered properly, access is denied, and power goes off. Codes for the purpose are stored in EEPROM 31 (FIG. 3), or in whatever ROM device may be devoted to the purpose. In some embodiments, the code may by mask-programmed at manufacture, so it is not alterable. In others, the code may be accessible and changeable by special procedures in the field.

In the case of host communication, it is possible that a portable or desktop computer, or some other device, may have a docking port physically configured to receive a µPDA, yet not be configured to communicate with the µPDA. This certainly might be the case where the µPDA is in the PCMCIA form. For purposes of disclosure and description, this specification terms such a unit a generic host. If the unit is configured to communicate with a µPDA it is an enabled host. If a host is configured for full access to a particular µPDA, it is a dedicated host.

If a docking unit is a generic host, there will be no communication unless the person presenting the µPDA provides the control routines to the host. This may be done for a generic host such as by transfer from a floppy disk, from a separate memory card through the docking port, or, in some embodiments, the communication software may be resident in memory 13 (FIG. 3) of a docked µPDA, transferrable to the host to facilitate further communication.

If the docking unit is in fact an enabled host, or is configured after docking to be an enabled host, the stored code or codes in EEPROM 31 (or other storage unit) may be used to verify authorization for data and program transfer between the host and a µPDA. In one embodiment this procedure is in the following order: First, when one docks a µPDA in a compatible docking port, certain pin connections convey to both the µPDA microcontroller and to the host CPU that the module is docked. Assuming an enabled host, the fact of docking commences an initialization protocol on both systems.

In most embodiments, if the docking unit is a non-host, that is, it is not capable of communication with the docked module, nothing happens, and the user may simply eject the docked module. If the computer is an enabled host, an application is started to configure host access to the µPDA's data files through the µPDA microcontroller. A user interface, described more fully below for a particular embodiment, is displayed on the host monitor 104 (FIG. 5). The host interface menu, as well as other application menus, may be formatted in part as a display of the µPDA I/O interface 16 as seen in FIG. 4 and described in accompanying text. In some embodiments, the docked µPDA can be operated in situ by manipulating the input areas of the µPDA displayed on the host's screen.

If the host is not a home unit for the docked module, that is, the host does not have matching embedded ID codes to those stored in the docked module, a visitor protocol is initiated. In this event, a visitor menu is displayed on host display 104 for further input, such as password queries for selections of limited data access areas in the docked module. In this case, too, a user may gain full access to the docked module's memory registers by entering the proper password(s).

If the host is a fully compatible host home unit, full access may be immediately granted to the host to access memory contents of the docked module, including program areas; and both data and programs may be exchanged.

In any case, when the µPDA is ejected or otherwise removed from the docking port, the on-board module microcontroller again gains full control of the internal µPDA bus structures.

Figure 6:
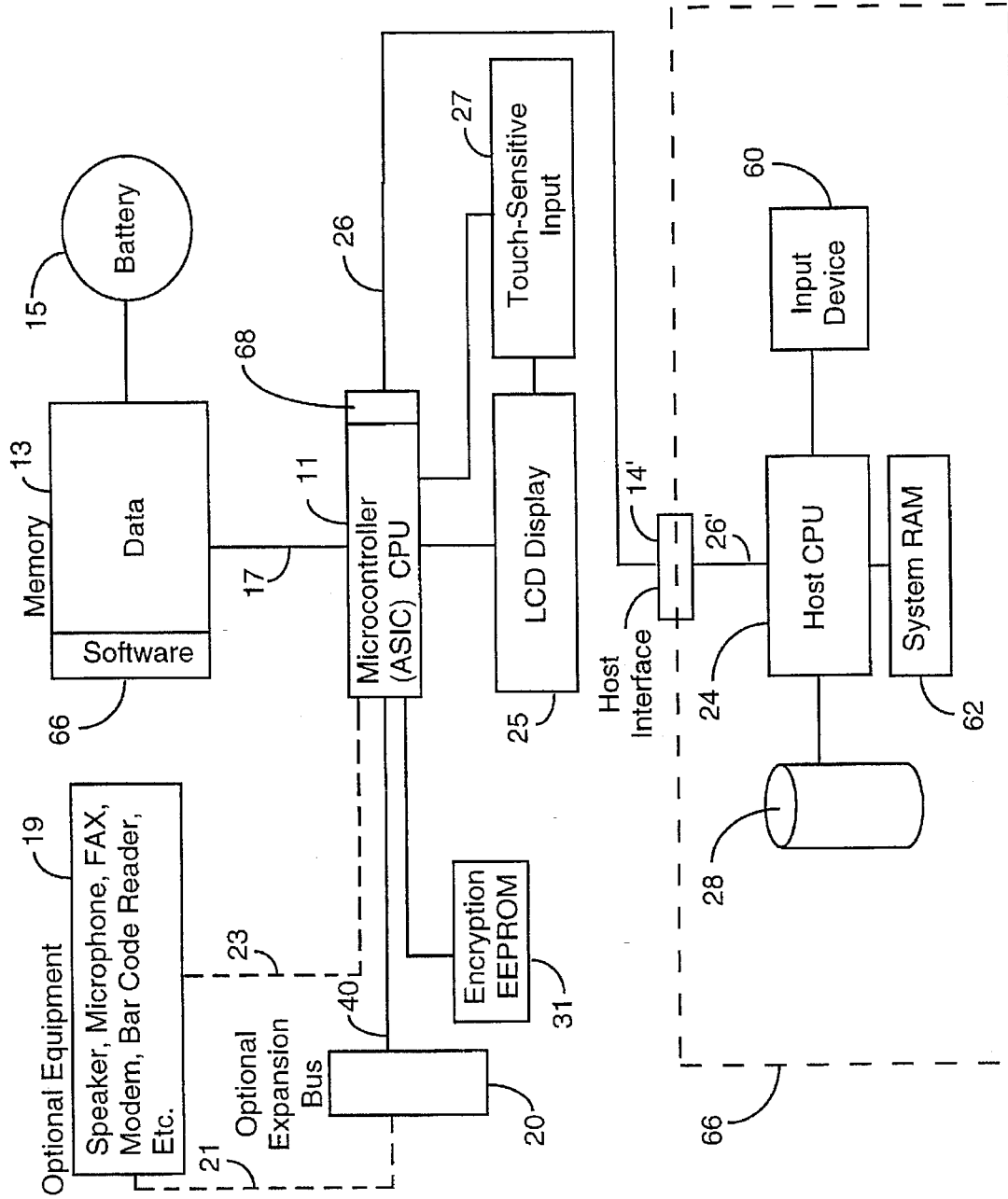
FIG. 6 is a block diagram of a μPDA docked in a docking bay of a host computer according to an embodiment of the present invention.
Figure 7:
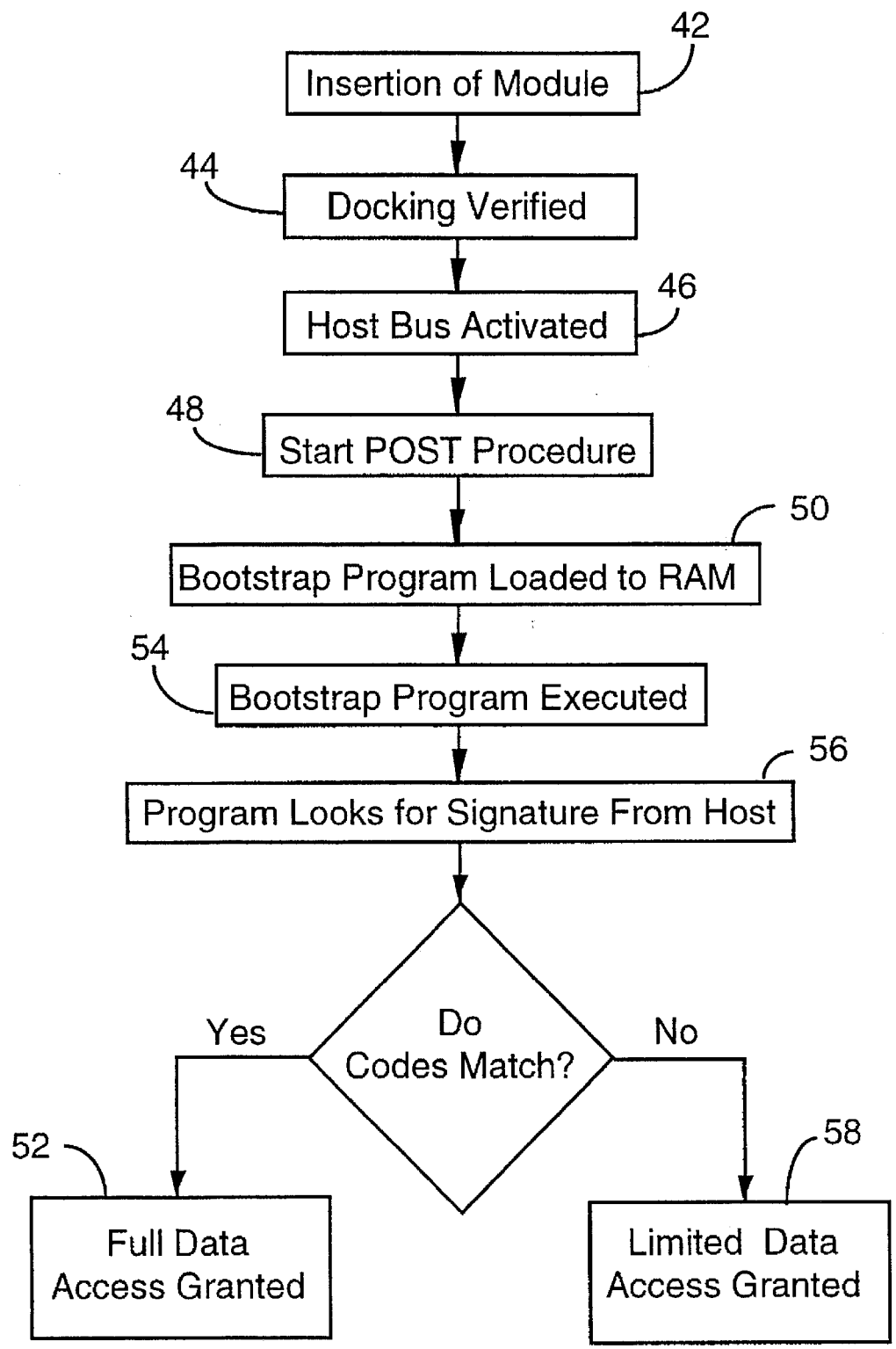
FIG. 7 is a logic flow diagram of the steps in docking a μPDA in a host computer according to an embodiment of the present invention.

FIG. 6 is a simplified block diagram of a µPDA docked in a host computer, and FIG. 7 is a basic logic flow diagram of the steps involved in docking a µPDA in a host computer 66 according to an embodiment of the present invention. Host computer 66 is represented in a mostly generic form, having a host CPU 24, and input device 60, such as a keyboard, a mass storage device 28, such as a hard disk drive, and system RAM 62. It will be apparent to those with skill in the art that many hosts may have a much more sophisticated architecture, and the architecture shown is meant to be illustrative.

When a µPDA unit is docked, connector 14' in FIG. 6 comprises portion 14 shown in FIGS. 1B and 3 and a mating connector portion for engaging portion 14 in port 105 (FIG. 5). The engagement of the separate portions of the connector cause bus 26 in the µPDA and bus 26' in the host to become directly connected. There is then a direct bus path between microcontroller 11 and host CPU 24 (FIG. 6).

As previously described there is a pin configuration (not shown) in connector 14 dedicated to signalling that a module is docked. In FIG. 7, step 42 represents insertion of a µPDA module into the docking port. At step 44 the signalling pin configuration signifies physical docking is accomplished. At step 46 host interface bus 26 is activated, including the mated host bus 26' in the host.

At step 48 (FIG. 7) microcontroller 11 in the µPDA starts a preprogrammed POST procedure. Microcontroller 11 in this embodiment has a page of RAM 68 implemented on the microcontroller chip. In other embodiments RAM say be used at other locations. At step 50, the POST routine loads a bootstrap program to RAM 68, which includes a code or codes for security matching. This code or codes comprise, for example, a serial number.

At step 54 the bootstrap program begins to execute in microcontroller 11, and at step 56 the microcontroller looks for a password from the host on host interface bus 26 (FIG. 6).

The fact of docking, assuming an enabled or dedicated host, also causes a communication routine, which may be accessed from, for example, mass storage device 28 at the host, to display a user interface on monitor screen 104 of the host unit, as partly described above. It is this communication program that sakes a generic host an enabled host.

Assuming an enabled, but not dedicated, host, the user interface will query a user for input of one or more passwords, after successful entry of which the host will pass the input to microcontroller 11 for comparison with the serial number and perhaps other codes accessed from EEPROM 31 in the bootstrap of the μPDA.

According to the codes passed from the host to the docked module, microcontroller 11 will allow full access to memory 31 at function 52, FIG. 7, for the host CPU, or limited access at some level at function 58, defined by received codes (or no matching code at all).

The access protocols and procedures allowing partial or direct access to μPDA memory 13 are relatively well known procedures in the art, such as bus mastering techniques, and need not be reproduced in detail here. In addition to simple comparison of codes, there are other techniques that may be incorporated to improve the integrity of security in the communication between a μPDA and a host. For example, within the limitation of storage capacity of the EEPROM or other nonvolatile source, executable code might also be uploaded to onboard RAM 68, or code keys to be used with executable code from other sources, or relatively simple maps re-allocating memory positions and the like, so each μPDA may be a truly unique device.

There are additional unique features provided in one aspect of the invention as part of the communication routines introduced above. One such feature is automatic updating and cross-referencing of existing files and new files in both computers, under control of the host system, with the host having direct bus access to all memory systems. Auto-updating has various options, such as auto-updating by clock signature only, flagging new files before transfer, and an editing means that allows the user to review both older and newer versions of files before discarding the older in favor of the newer. This automatic or semiautomatic updating of files between the satellite and the host addresses a long-standing problem. The updating routines may also incorporate a backup option to save older files.

Another useful feature in host/μPDA communication is a means for a user to select and compose a mix of executable program files for downloading to a μPDA, either replacing or supplementing those executable routines already resident. A user can have several different program lists for downloading as a batch, conveniently configuring the applicability of a μPDA among a wide variety of expected work environments.

Such applications as databases, spreadsheets, documents, travel files such as currency converters, faxing and other communications programs, time clocks, address and telephone records, and the like, may comprise customized lists of user-preferred applications.

In another embodiment, an undocked μPDA can transfer data via the optional expansion bus 40 (FIG. 3) directly to a host. In the special case of a μPDA user without access to a PCMCIA interface on his host (notebook or desk-top) computer, he or she can connect to a host via an auxiliary port on the host, such as a serial port, via the expansion bus interface. In this case, the μPDA still requests password(s) from the host, and controls access to its on-board memory according to the password(s) received.

The optional expansion interface may also be used in some embodiments while a μPDA is mastered by a host, wherein the host may effectively send data through the bus structures of the μPDA.

ADDITIONAL ASPECTS AND FEATURES

Software Vending Machine

In a further aspect of the invention, a Software Vending Machine with a very large electronic storage capacity is provided, wherein a μPDA user may dock a module and purchase and download software routines compatible with the μPDA environment.

Figure 8:
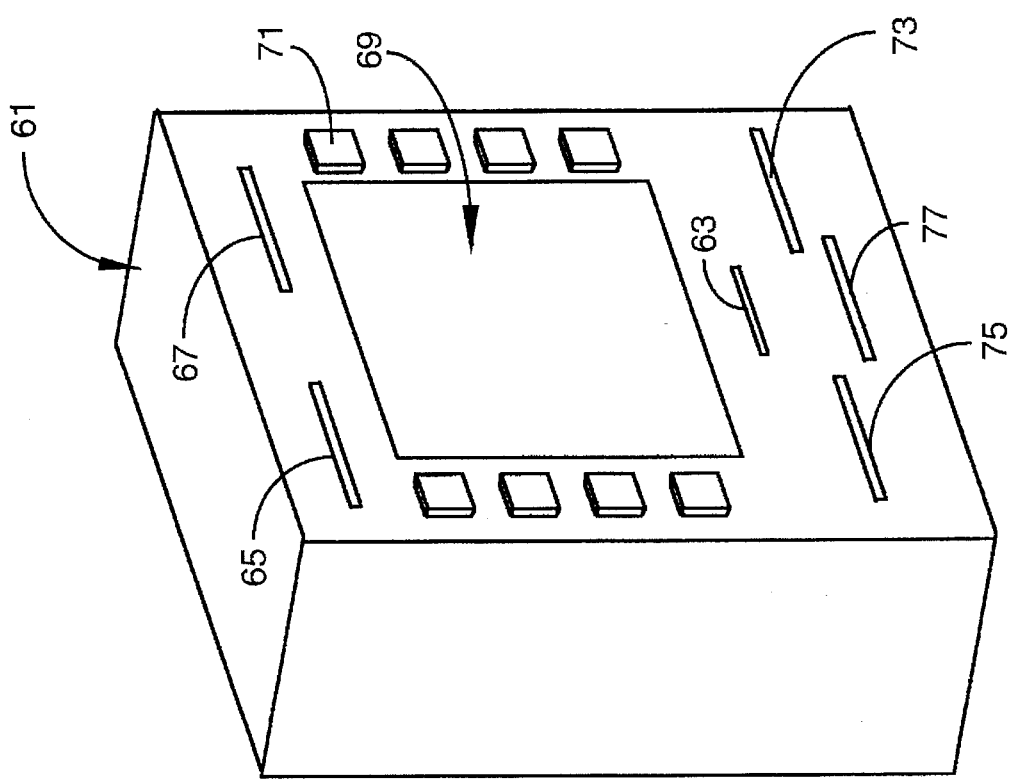
FIG. 8 is an isometric illustration of a μPDA software vending machine in an aspect of the present invention.

FIG. 8 is an isometric view of such a vending machine 61 having a docking bay 63 for a μPDA, a credit card slot 65, and a paper money slot 67. A display 69 provides a user interface for reviewing and purchasing software from the vending machine, along with selector buttons such as button 71 along the sides of the display. In an alternative embodiment the display may also have a touch screen, and may, in some embodiments, emulate the μPDA I/O area on a larger scale.

In operation, a user may, in this embodiment, review software for sale simply by docking his μPDA unit in the vending machine and selecting from a menu on display 69. The menu may allow the user to browse all available applications, or list new applications since entered dates. The user can select certain applications, try them out, at least in simulation, and then select applications to purchase.

The vending machine, once all the requirements are met, such as proper identification and payment, copies the selected application(s) to the memory of the μPDA, or, alternatively, to a floppy disk provided by either the user or the vending machine. In this case there is also a floppy disk drive 73 in the vending machine and a port 75 for dispensing formatted floppies for a customer to use in the disk drive. This mode is useful for the instances where a user's μPDA is loaded beyond capacity to receive the desired software, or the user simply wishes to configure the software mix himself from his or her own host computer.

There may also be provided a backup option so a user may instruct the vending machine to read and copy all or a selection of his files to one or more floppy disks before installing new files or data.

As described above, each user's μPDA includes an EEPROM or other storage uniquely identifying the μPDA by a serial number or other code(s), so the vending machine may be configured in this embodiment to provide the software in one of several modes.

A user may buy for a very nominal price a demo copy of an application, which does not provide full capability of the application, but will give the user an opportunity to test and become familiar with an application before purchase. Also, the user may buy a version of the same application, configured to the ID key of the μPDA to which it is loaded, and operable only on that μPDA. In another embodiment, the software is transferable between a family of keyed μPDAs, or has the ability to "unlock" only a limited number of times. In these cases, the applications would be sold at a lesser price than an unlocked version. The unlocked version works on any μ-PDA and/or host/μPDA system. The higher price for the unlocked version compensates for the likelihood of unauthorized sharing of the vended applications.

The vending machine could also offer a keyed version, customized to operate only on the μPDA docked in the software vending machine, or upon a family of μPDAs. This keyed version is possible because of the individual and unique nature of each μPDA, which has, at a minimum, a unique serial number, and may also have other security programming, as described above, which allows a vending machine to prepare and download a customized copy of an application that will operate only on the particular module for which it is purchased.

There are a number of different means by which unique correspondence might be accomplished, as will be apparent to those with skill in the art. A standard version stored in the memory facility of a vending machine might be recompiled, for example, on downloading, using a unique code from the docked or identified μPDA as a key in the compilation, so only the specific μPDA may run the program by using the same unique key to sequence the instructions while running. The key for scrambling or otherwise customizing an application might also comprise other codes and/or executable code sequences stored uniquely in a μPDA.

In yet another aspect related to the vending machine, there is a printer outlet 77 which prints a hardcopy manual for the user. It is, of course, not necessary that the software vended be specific to the M-PDA. Applications say also be vended for other kinds of machines, and transported in the memory of the μPDA, or by floppy disk, etc. In this embodiment a non-μPDA user can acquire a wide assortment of software.

The software vending machine say also serve as an optional informational display center in such locations as airports, train stations, convention centers, and hotels. Upon inserting a μPDA a user may interface directly and upload current information including, but not limited to, local, national, and world news; stock quotes and financial reports; weather; transportation schedules; road maps; language translators; currency exchange applications; E-mail and other direct on-line services.

A customized vending machine could be tailored to business travelers and allow fast access to pertinent information, allowing the user to download files to send via E-mail. In another aspect of the invention, the vending machines are linked to each other allowing users to send messages to associates travelling through locations of associated vending machines. Such dedicated μPDA E-mail is immediately downloaded to a specific μPDA as it is docked. The sender may have the associate's μPDA unique encoded key as identification, or some other dedicated identifying means for E-mail.

In another embodiment, as each business associate arrives at an airport, he or she may prompt the custom vending machine in that location via an optional installed infrared interface (not shown) in their μPDA. The custom vending machine, also equipped for infrared communication, receives the signal and sends/or receives any messages that are waiting.

Enhanced Display

Figure 9:
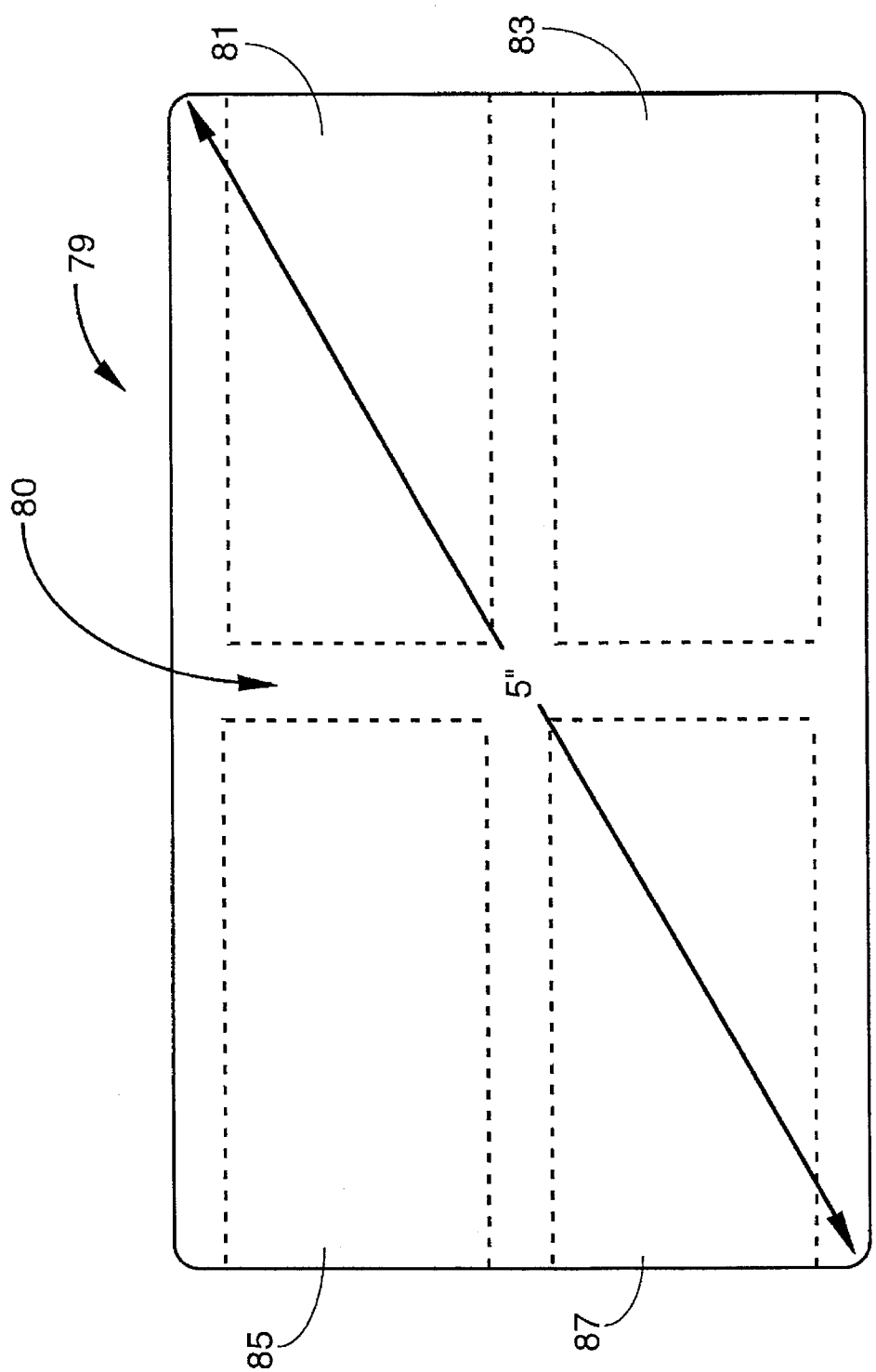
FIG. 9 is a top plan view of a μPDA enhanced user interface according to an embodiment of the present invention.

FIG. 9 is a plan view of an enhanced I/O interface unit 79 according to an aspect of the present invention. Interface unit 79, with about a 5-inch diagonal measurement, comprises a combination LCD display at least partially overlaid by a touch-sensitive input screen, providing an I/O area 80 in much the same manner as in a μPDA. Four docking bays 81, 83, 85, and 87 are provided in the left and right edges of interface unit 79 in this embodiment, and are configured for PCMCIA type II modules. One of these bays may be used for docking a μPDA according to the present invention, and the other three to provide a larger CPU, additional memory, battery power, peripheral devices such as modems, and the like by docking functional PCMCIA modules.

Interface unit 79 is a framework for assembling a specialty computer through docking PCMCIA units, including a μPDA according to the present invention. In other embodiments where the μPDA assumes other form factors, the docking bays may be configured accordingly.

A docked μPDA in this embodiment is configured to produce its I/O display on I/O area 80. The thumbwheel on the M-PDA is accessible while docked and acts as described above in the stand-alone mode in this case. In another aspect, the enhanced display has a re-configured output that enables the user to manipulate the data from the touch-screen alone and/or additional hardware selector buttons and/or a standard keyboard attached to the enhanced display via a dedicated bus port, or even through the expansion port of a docked μPDA. In a further embodiment the enhanced display has a dedicated mouse port and/or a dedicated thumbwheel.

In yet another embodiment, interface unit 79 has an inexpensive, conventional, replaceable battery and/or a rechargeable battery. Also, in another aspect, interface unit 79 may dock two or more individual μPDAs and cross-reference data files between them according to control routines that can manipulate mutually unlocked files. Further still, interface unit 79 may be placed and structurally supported for easy viewing on a dedicated standard or smaller-sized keyboard, connecting to the keyboard as an input device. The keyboard would then automatically serve as the input device.

Interface unit 79 for a μPDA is small and compact enough to slip into a pocket book or briefcase, providing a very portable, yet very powerful, computer.

Microphone/Voicenotes

Figure 10:
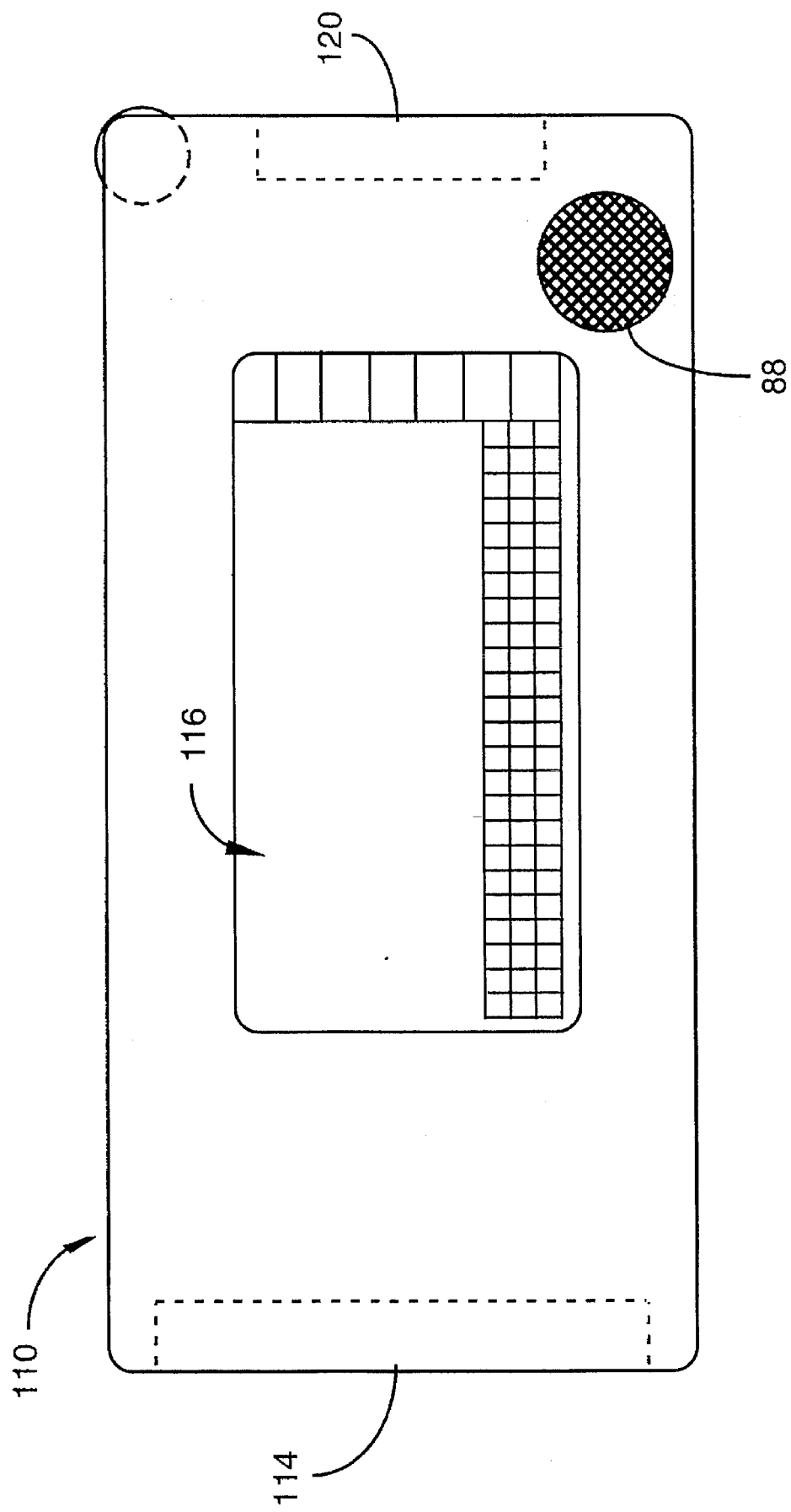
FIG. 10 is a top plan view of a μPDA with a microphone in an embodiment of the present invention.

FIG. 10 is a plan view of a μPDA 110 with an I/O interface 116, an expansion port 120, and a host interface connector 114. μPDA 110 has all the features previously described and additionally a microphone 88. In this embodiment, control routines in the μPDA use a linear pedictive coding (LPC) approach to convert analog input from the microphone to a digital voice recording. This approach uses a minimum of memory, but still is capable of reproducing audio input like the human voice within recognizable limits.

In an alternative embodiment, for better quality voice recording, a two-step integrator may be used in order to separate the analog signal and synthesize a closer digital representation.

With a μPDA so configured, a user's voice notes can be recorded and later uploaded to a host for processing. In future embodiments the digital signals may be converted to text or sent as voicemail on a network. In yet another embodiment, the microphone is integrated with a speaker for editing purposes.

Cellular Telephone Interface

Figure 11:
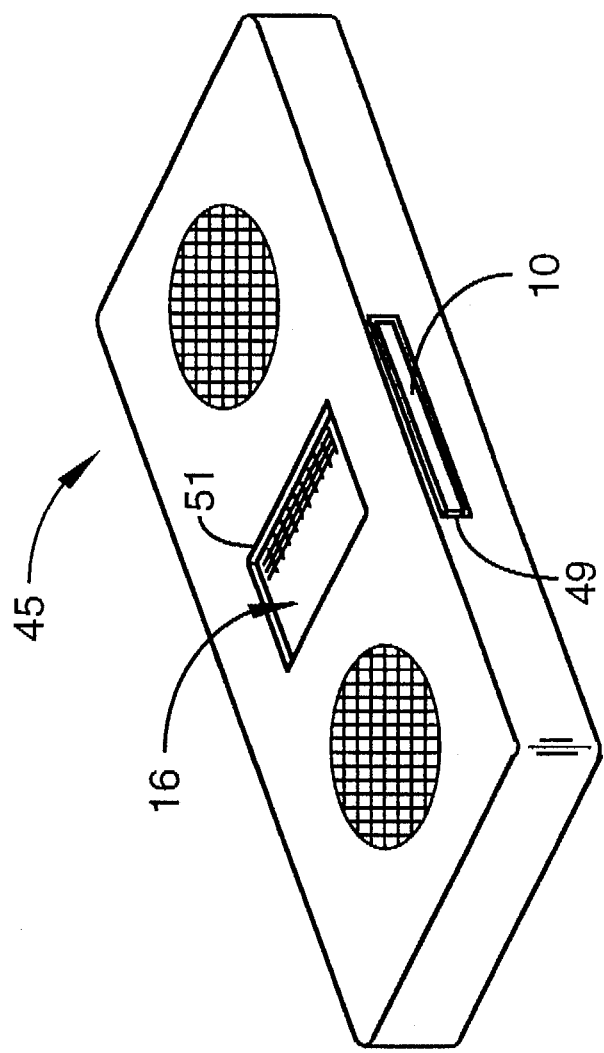
FIG. 11 is an isometric drawing of a μPDA docked in a dedicated cellular or cordless telephone according to an embodiment of the present invention.

FIG. 11 is an isometric view of a μPDA 10 docked in a dedicated cellular telephone 45 according to an embodiment of the present invention. Telephone 45 has a docking port 49 for a μPDA according to the invention. In this embodiment, port 49 is on one side of telephone 45, and there is a window 51 to provide access to I/O interface 16 of the μPDA after it is docked. With the μPDA docked, all of the software and memory of the μPDA is available to the telephone and a user may operate the phone by I/O interface 16.

In this aspect of the invention, unique control routines and display configurations are provided to enhance use of the cellular phone. For example, all of the user's collection of phone numbers, associated credit card numbers, access codes, etc. are readily available and may be quickly and conveniently accessed and used. In one aspect, a simple input displays alphabet letters to select, and once a letter is selected, a partial list of parties that might be called is displayed. One may scroll through the list by touch input or by use of the thumbwheel of the μPDA and select a highlighted entry. It is not required that the telephone numbers be displayed.

Once a party to be called is selected, the μPDA dials the call, including necessary credit card information stored in the memory of the μPDA for this purpose.

In a further embodiment, the calls are timed and time-stamped and a comprehensive log, with areas for notes during and after, is recorded.

In another embodiment, conversations are digitally recorded and filed for processing later. A future embodiment may include a voice compression program at a host or within cellular phone 45. Compressed voice files, such as, for example, messages to be distributed in a voicemail system, may be downloaded into the μPDA or carried in a larger memory format inside the cellular telephone. The μPDA can then send the files via a host or dedicated modem attached at connector portion 20 to the optional expansion bus 40 (FIG. 6).

The cellular telephone may, in this particular embodiment, have a bus port for digital transmission. In this case, the compression algorithm along with voice system control routines are also established at the receiving end of the transmission to uncompress the signal and distribute individual messages.

In a further embodiment, voice messages may be sent in a wireless format from the cellular telephone in uncompressed digital synthesized form, distributing them automatically to dedicated receiving hosts, or semi-automatically by manually prompting individual voicemail systems before each individual message. In a further aspect of wireless transmission, a microphone/voicenote μPDA as in FIG. 10 may send previously stored voicenotes after docking in a cellular telephone interface.

In Europe and Asia a phone system is in use known as CT2, operating on a digital standard and comprising local substations where a party with a compatible cellular phone may access the station simply by being within the active area of the substation. In one aspect of the present invention, a CT2 telephone is provided with a docking bay for a μPDA, and configured to work with the μPDA. In yet another aspect of the invention, in the CT2 telephone system, and applicable to other digital telephone systems, a compression utility as disclosed above is provided to digitally compress messages before transmission on the CT2 telephone system.

It is roughly estimated that a dedicated compression algorithm may compress ten minutes of voice messages into one minute using the existing CT2 technology. This would save on telephone use charges significantly. In this aspect, there needs be a compatible decompression facility at the receiving station, preferably incorporated into a standard μPDA voicemail system for CT2 or other digital transmissions.

In a further embodiment, control routines are provided to enable the microphone/voicenote μPDA as illustrated in FIG. 10 to carry digital voicenotes, either compressed or uncompressed. When docked in a CT2-compatible μPDA cellular telephone, the μPDA in this embodiment can transmit the digital voicenotes in compressed form.

Sneaker/Pager

Figure 12:
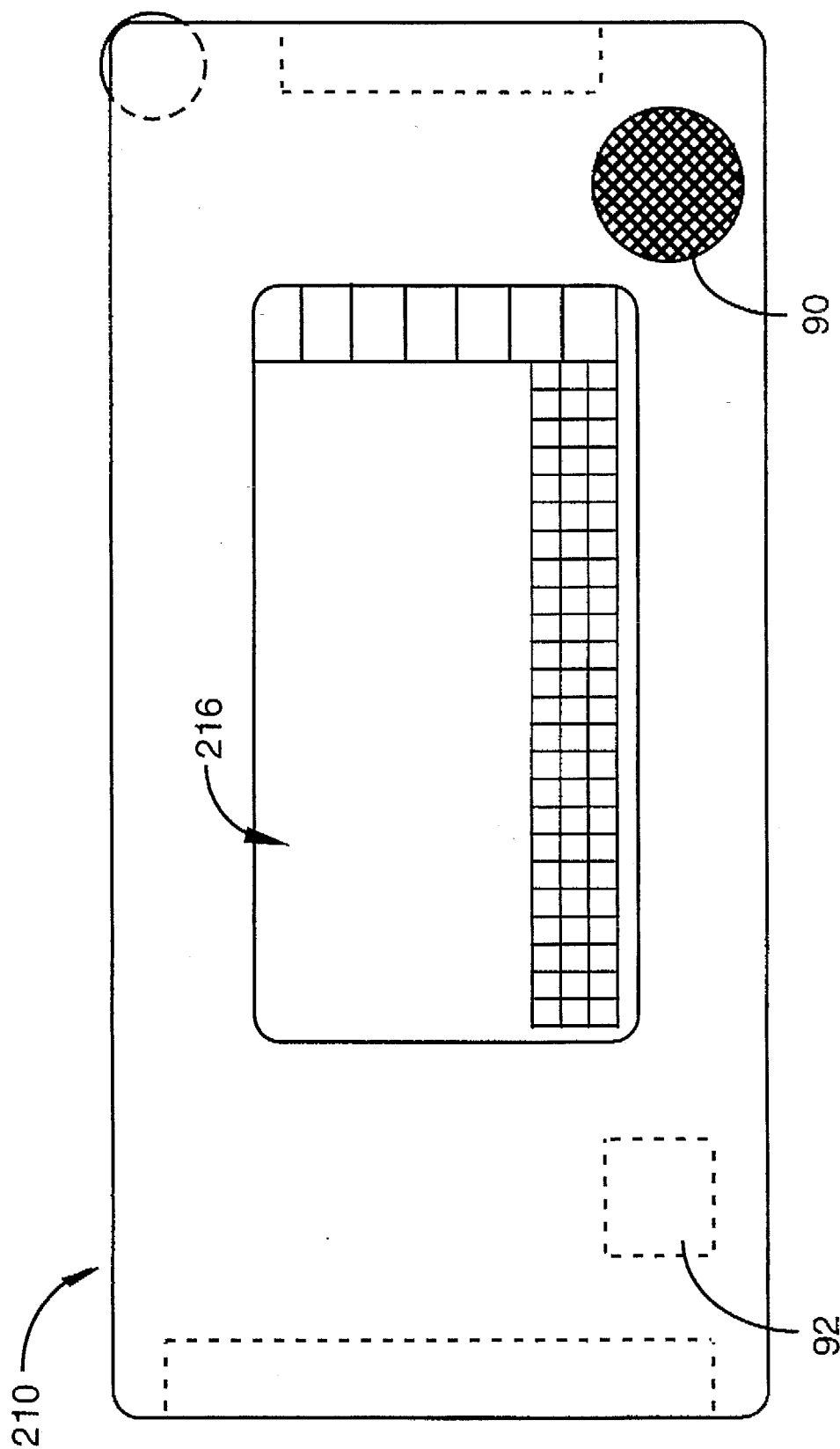
FIG. 12 is a plan view of a μPDA with a speaker and pager interface according to an embodiment of the present invention.

FIG. 12 is a plan view of a μPDA 210 with a microphone/speaker area 90 and a pager interface 92 according to an embodiment of the present invention. This μPDA has the ability to act as a standard pager, picking up pager signals with installed pager interface 92 and alerting a user through microphone/speaker 90. Once the signals are received, μPDA 210 can be docked in a compatible cellular telephone as illustrated in FIG. 11 and the μPDA will automatically dial the caller's telephone number. All other aspects are as described in the docked mode in the cellular telephone.

In another embodiment, the speaker/pager μPDA can be prompted to generate DTMF tones. The DTMF tones are generated from a caller's telephone number.

The speaker/pager μPDA can store pager requests in its onboard memory. It can also display all pager requests including time and date stamps, identification of the caller, if known, and other related information, on I/O interface 216. In this particular embodiment, a user can receive a page, respond immediately in digital voicenotes on the μPDA via speaker/microphone 90, and then send the response from a dedicated μPDA-compatible cellular telephone or conventional telephone.

Wireless Infrared Interface

Figure 13:
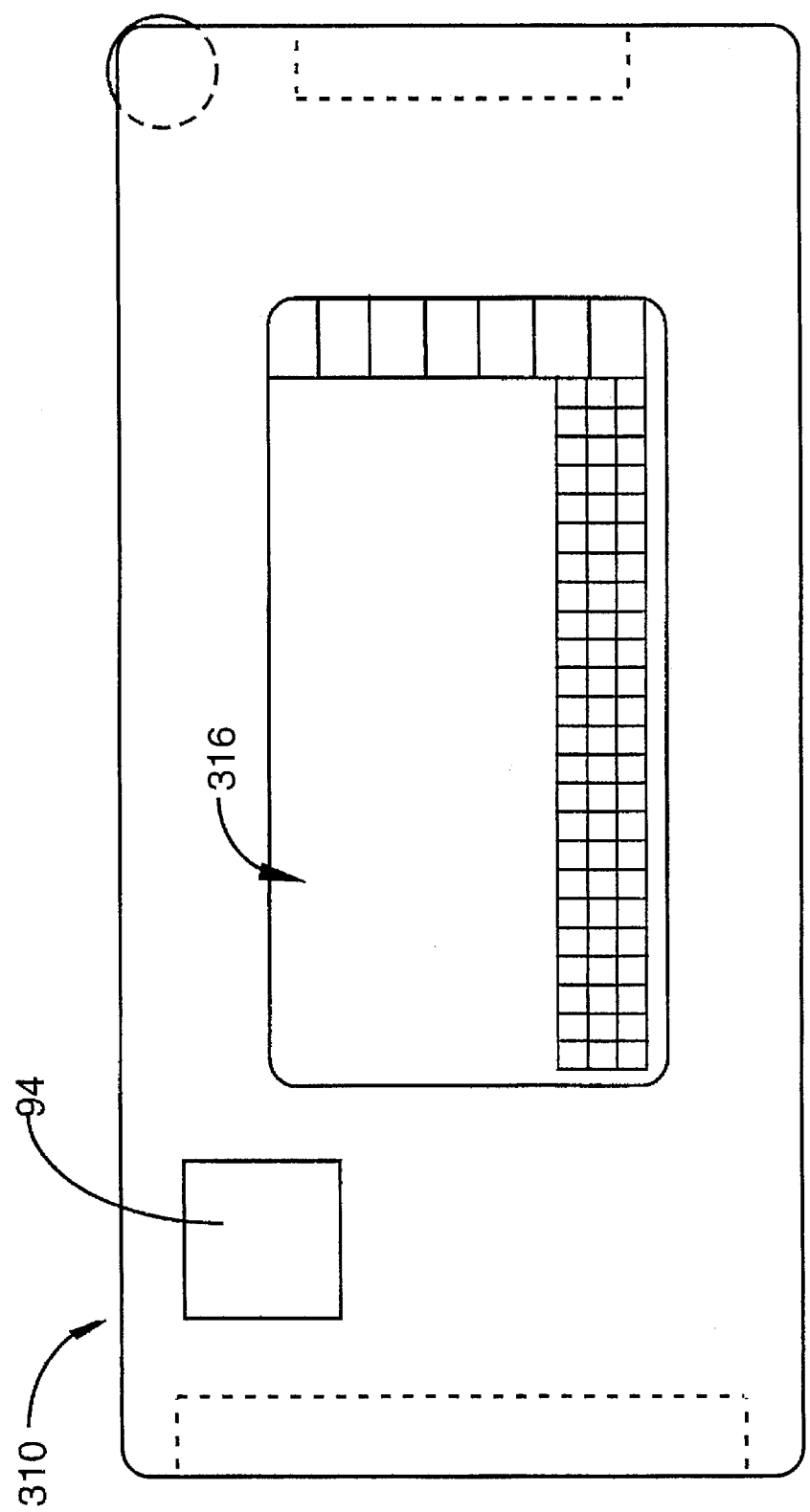
FIG. 13 is a plan view of a μPDA with an infrared communication interface according to an embodiment of the present invention.

FIG. 13 is a plan view of a μPDA 310 with an IR interface 94 according to an embodiment of the present invention. In this embodiment the μPDA may communicate with an array of conventional appliances in the home or office for providing remote control. Unique signals for the appliances are programmed into the μPDA in a learning/receive mode, and filed with user password protection. Once a correct password in entered, an icon-based menu is displayed on I/O area 316 in a user-friendly format. A master routine first queries a user for which device to access. For example, in a residential application, icons are displayed for such things as overhead garage doors, security systems, automatic gates, VCRs, television, and stereos.

In another aspect of the invention, a receiving station such as a host computer or peripheral interface has IR capabilities to communicate data directly from a nearby μPDA with an infrared interface. In a further embodiment the μPDA may interface in a cellular network and act as a wireless modem.

PERIPHERALS

A μPDA may serve as the platform for various peripheral attachments via expansion port 20 (FIG. 1B and others). Upon attachment to a peripheral, a dedicated pin or pins within expansion port 20 signal microcontroller 11, and a peripheral boot-strap application is executed. Interfacing control routines, which may reside in the peripheral or in the memory of the μPDA, are then executed, and the μPDA I/O interface displays the related menu-driven options after the linking is complete.

Scanner

Figure 14:
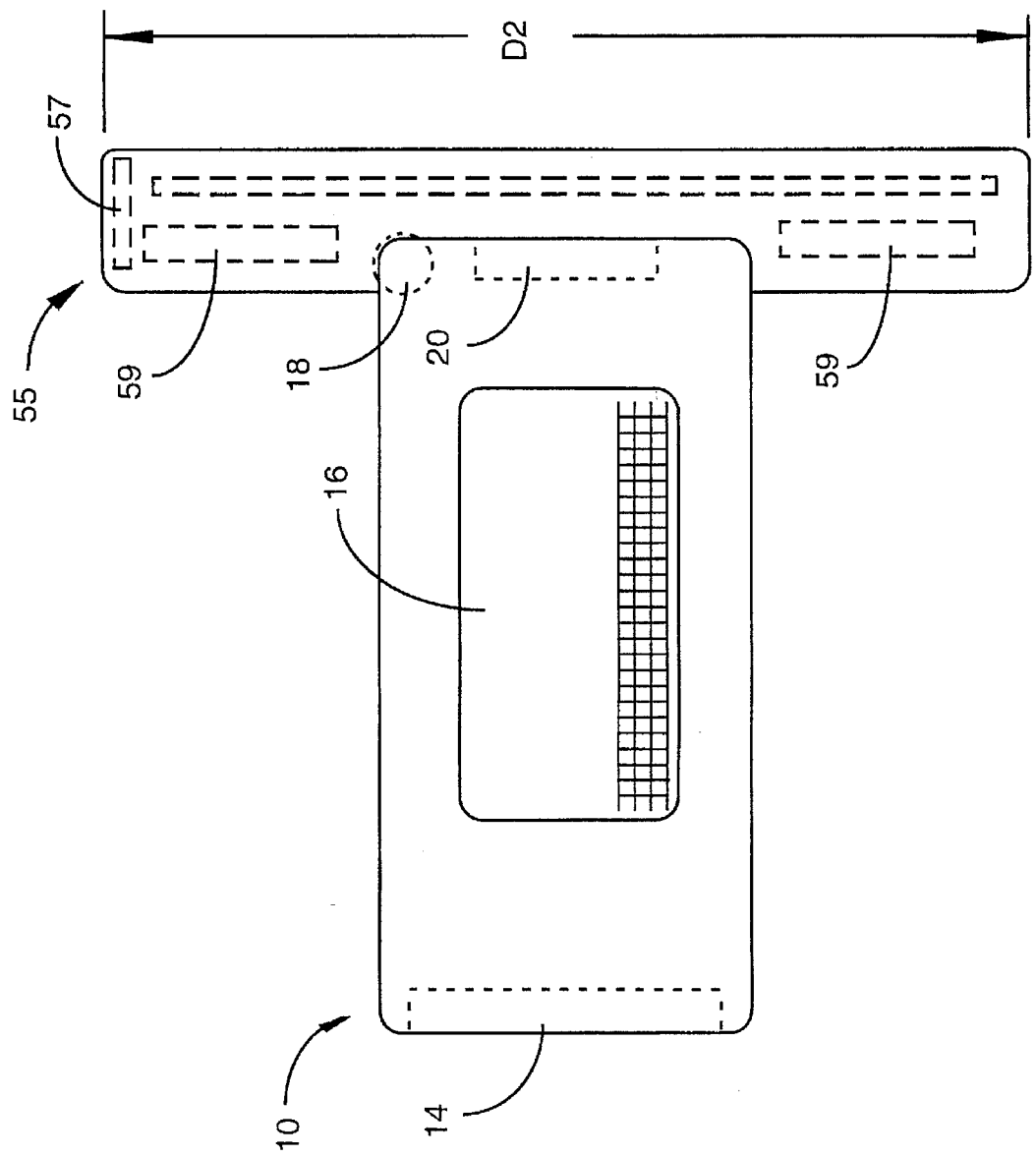
FIG. 14 is a plan view of a μPDA with a scanner attachment according to an embodiment of the present invention.

FIG. 14 is a plan view of a μPDA 10 with a scanner attachment 55 according to an embodiment of the present invention. The scanner attachment is assembled to the µPDA, making electrical connection via expansion port 20. In this embodiment the physical interface of the scanner is shaped to securely attach to the µPDA. Scanner attachment 55 has a roller wheel 57 or other translation sensor, which interfaces with wheel 18 of the µPDA, providing translation sensing in operation for the resulting hand-held scanner. In another aspect, scanner attachment 55 has a translation device which transmits the proper signal through expansion port 20. The scanner bar is on the underside, and one or more batteries 59 are provided within the scanner attachment to provide the extra power needed for light generation.

In the scanner aspect of the invention, scanner attachments 55 of different width D2 may be provided for different purposes. The bar may be no wider than the µPDA, or may be eight inches or more in width to scan the full width of U.S. letter size documents, or documents on international A4 paper. Unique control routines display operating information on the µPDA's I/O area 16 for scanning, providing a user interface for setup of various options, such as the width of the scanner bar, and providing identification for files created in the µPDA memory as a result of scan passes. Scanned data stored in the µPDA memory may be quickly transferred to the host via host interface 14 when the µPDA is docked. Unique routines may be provided to automate the process, so the user does not have to search for files and initiate all of the transfer processes.

Facsimile Option

Figure 15:
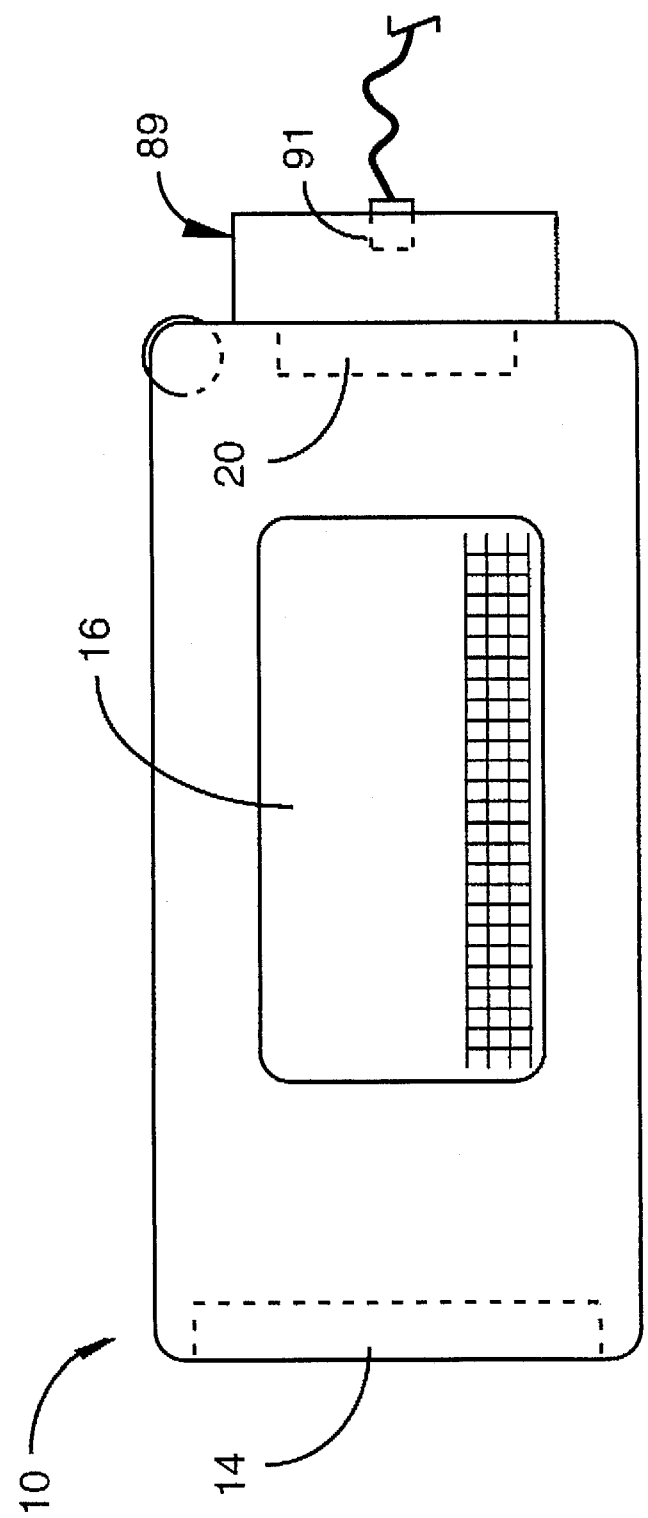
FIG. 15 is a plan view of a μPDA with a fax-modem attached according to an embodiment of the present invention.

FIG. 15 is a plan view of a µPDA with a fax-modem module 89 attached according to an embodiment of the present invention. A fax and telecommunication capability is provided via conventional telephone lines to the µPDA by fax-modem 89 interfacing to expansion bus interface 20. The fax-modem has internal circuitry for translating from the bus states of the expansion bus to the fax protocol, and a phone plug interface 91. In another aspect, the µPDA can be docked in a host and be used in combination with fax-modem 89 to provide faxing and file transfers of both host and µPDA data files. In this case, the fax-modem routines are displayed on the host monitor.

Printer

Figure 16:
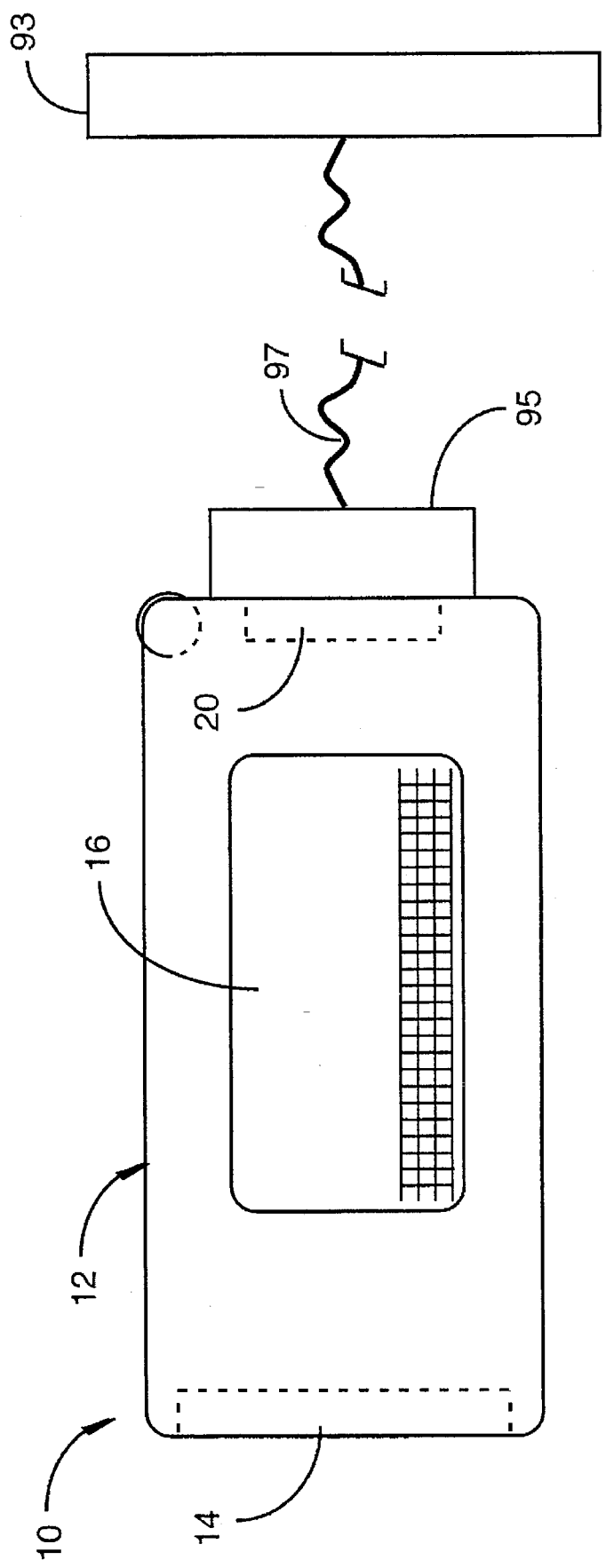
FIG. 16 is a plan view of a μPDA with a printer adapter interface according to an embodiment of the present invention.

FIG. 16 is a plan view of a µPDA with a Centronics adapter interface according to an embodiment of the present invention. A printer connector 93 engages expansion interface 20 by a connector 95 through a cable 97. Translation capability resides in circuitry in connector 93, which is configured physically as a Centronics connector to engage a standard port on a printer.

Barcode Reader and Data Acquisition Peripheral

Figure 17:
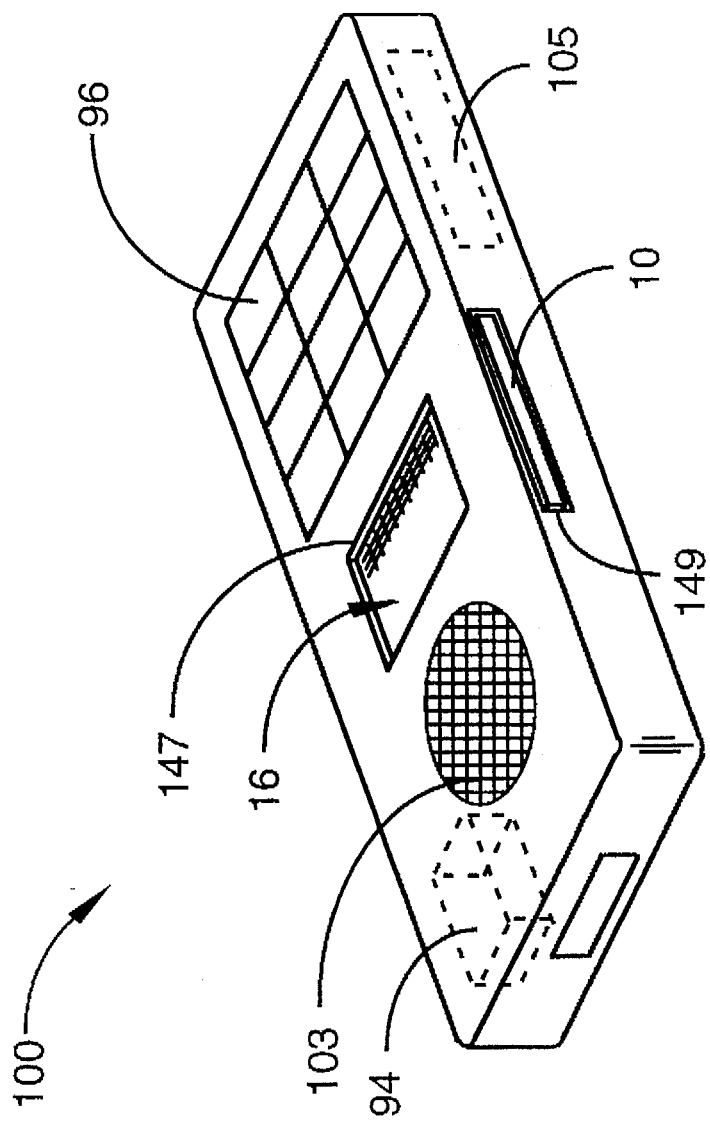
FIG. 17 is an isometric drawing of a μPDA docked in a barcode reader providing a data acquisition peripheral according to an embodiment of the present invention.

FIG. 17 is an isometric view of a µPDA 10 docked in a barcode reader and acquisition peripheral 100 according to an embodiment of the present invention. µPDA 10 is docked in docking bay 149. I/O interface 16 displays information through opening 147 according to specialized data acquisition applications. In this particular embodiment peripheral 100 has an IR interface 94, a microphone 103, a scanner port 101 (not shown), battery pack 105, and a numeric keypad pad 96 implemented as a touch-sensitive array.

Application routines enable the data acquisition peripheral to operate as, for example, a mobile inventory management device. The user may scan barcode labels with scanner 101 and enter information, such as counts, on keypad 96 or by voice input via microphone 103. Since applications of peripheral 100 are very specialized, only a limited voice recognition system is needed. The voice recognition system may prompt other command routines within the master applications as well.

As inventories are collected, the database may be displayed and also manipulated directly via I/O area 16 in open bay 147, or information may be downloaded at a prompt to a nearby host via IR interface 94.

Alternatively to frequent data transmission, data may be stored or an auxiliary option memory location in peripheral 100.

In another aspect, the data acquisition peripheral may be interfaced to the analog output of a monitoring device, such as a strip chart recorder, and may digitize and store the incoming analog signals.

Solar Charger

Figure 18:
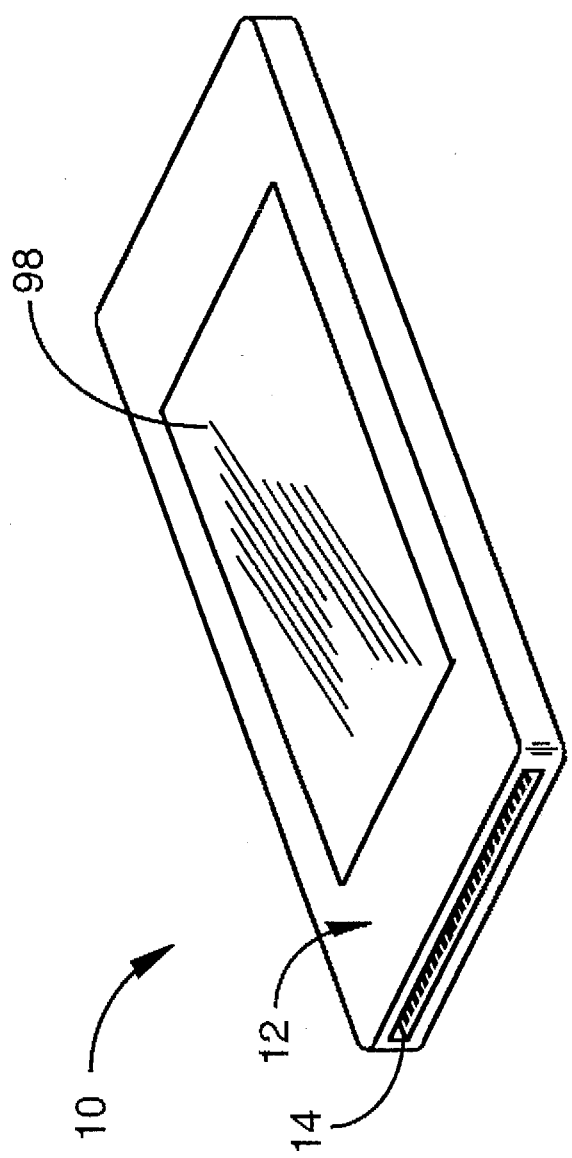
FIG. 18 is an isometric view of a μPDA with a solar charger according to an embodiment of the present invention.

FIG. 18 is an isometric view of the side of a µPDA 10 opposite the I/O interface with a solar charger panel 98 according to an embodiment of the present invention. Panel 98 is positioned so that when µPDA 10 is in strong light, such as sunlight, the solar charger absorbs the solar energy and converts it to electricity to recharger battery 15 inside the µPDA. Solar charger 98 may be permanently wired to the circuitry of the µPDA or attached by other means and connected to a dedicated electrical port or the expansion port. The solar charger is placed so that the µPDA can be fully docked in a docking port with the panel in place. In another aspect, a detachable solar charger may be unplugged before docking the µPDA, and the detachable charger may then be of a larger surface area.

Games/Conference Center

Figure 19:
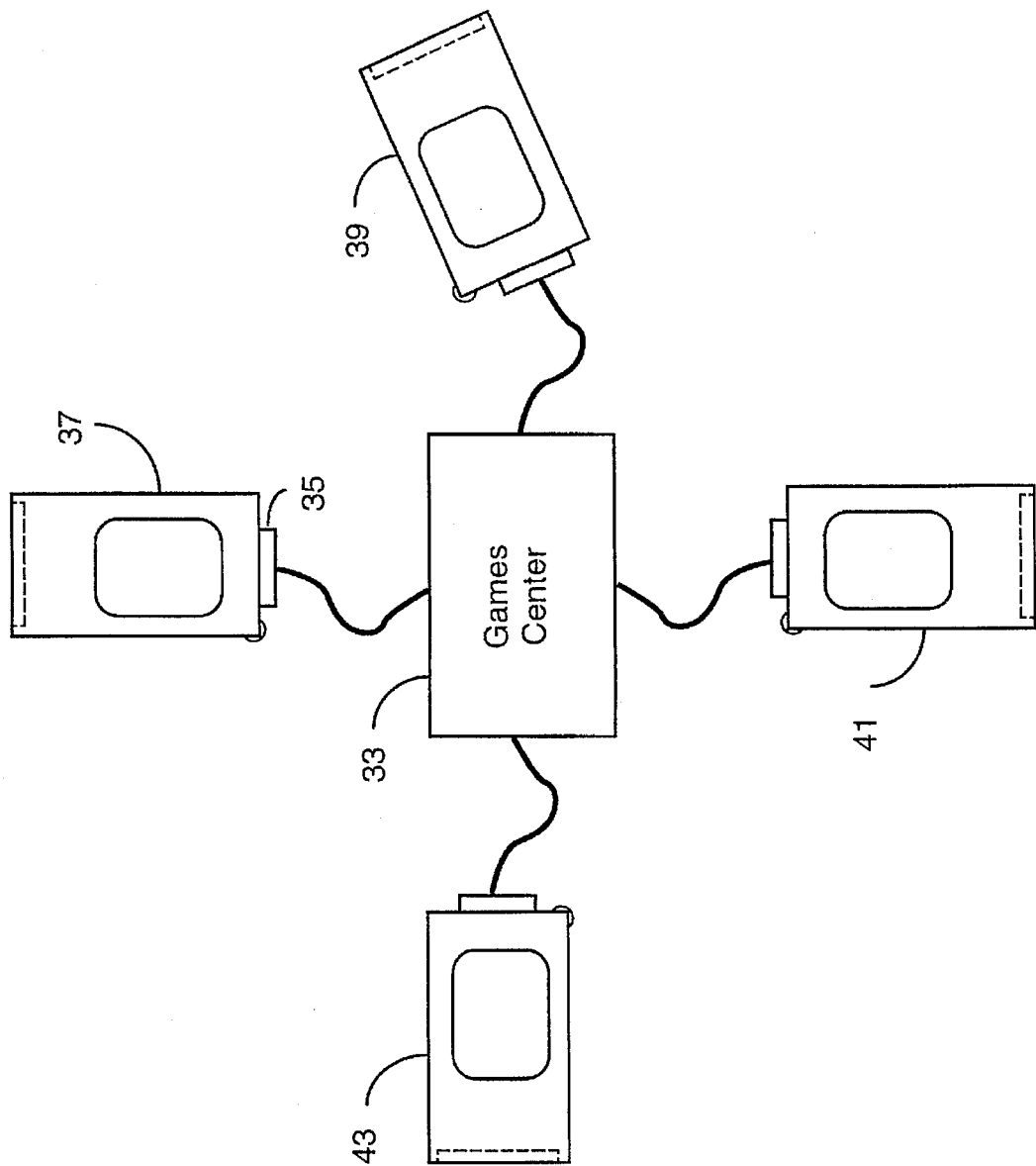
FIG. 19 is a plan view of four μPDAs interfaced to a dedicated network console providing inter-PDA communication according to an embodiment of the present invention.

FIG. 19 is a largely diagrammatic representation of a Games Center unit 33 according to an aspect of the invention for connecting several µPDA units (37, 39, 41, and 43) together to allow competitive and interactive games by more than one µPDA user. Games Center unit 33 is controlled by an 80486 CPU in this particular embodiment. µPDAs may be connected to the central unit by cable connection via the expansion bus or the host interface of each µPDA, through a connector such as connector 35. The drawing shows four connectors, but there could be as few as two, and any convenient number greater than two.

As a further aspect of the present invention, the gaming center may serve as a conference center where a number of µPDAs may exchange information. In this way, for example through custom routines stored and executable in central unit 33, a manager may update a number of salespeoples' µPDAs, including but not limited to merchandise databases, spreadsheets, price sheets, work assignments, customer profiles, address books, telephone books, travel itineraries, and other related business information while in conference.

Standard Keyboard

Figure 20:
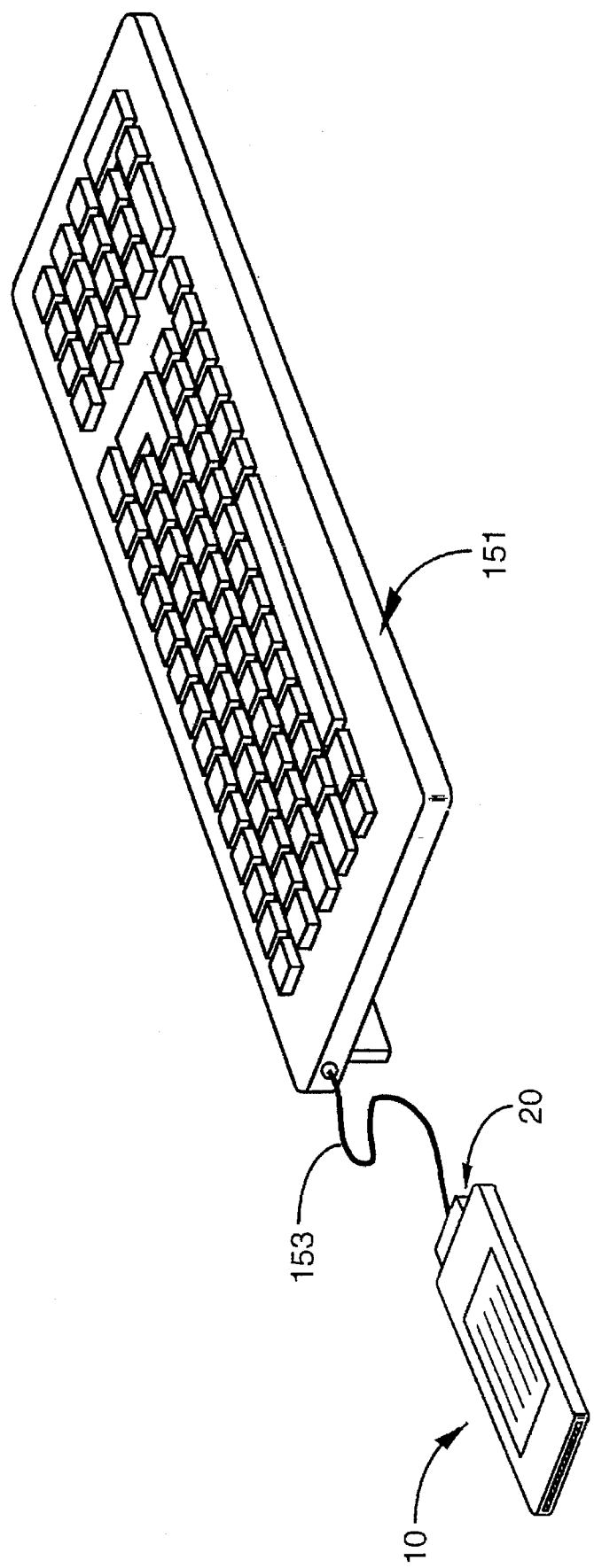
FIG. 20 is an isometric view of a μPDA according to the invention connected by the expansion port to a standard-sized keyboard.

FIG. 20 is an isometric view of a keyboard 151 connected by a cord and connector 153 to a µPDA 10 via the expansion port 20. In this example, the keyboard is a mechanical keyboard having a full-size standard key array and an on-board controller and interface for communicating with the µPDA. In other embodiments the keyboard may take many other forms, including a two-layer, flexible, roll-up keyboard as taught in U.S. Pat. No. 5,220,521.

In addition to keyboards, other input devices, such as writing tablets and the like may also be interfaced to a µPDA via expansion port 20.

There are numerous additional ways to combine different embodiments of the μPDA for useful functions. For example, an IR-equipped μPDA attached to scanner 55 may transfer large graphic files in near real time to a host computer. If the files were of text, the host may further process the files automatically through an optical character recognition (OCR) application and send the greatly reduced ASCI files back to the μPDA. As discussed above, the μPDA family of devices establishes a protocol of software security and distribution as well as having the ability to be bus mastered by a host computer system for numerous applications.

An Electroluminescent Display

A μPDA according to the invention, in a preferred embodiment, has a combination I/O device 16 (FIG. 1A and 1B) a part of which is a flat-panel display 25. Display 25 described above is an LCD display. Further, a host system according to an embodiment of the invention, for docking a μPDA, may also have a flat-panel display, such as display 104 in FIG. 5. Still further, an enhanced user interface is disclosed and described above with reference to FIG. 9, and that interface incorporates also a flat-panel display. Further yet, a display larger than the display incorporated in a μPDA according to the present invention, for example, along the lines of the display shown in FIG. 9, but without an overlaid touch-sensitive input, may be provided, and used with a separate input device, such as a flexible keyboard, which may be attached to the display device by a cable, or may communicate in a cordless fashion, such as by inductive coupling.

Although the displays described thus far are primarily LCD displays, there are other types of displays useful in various embodiments of the invention. The present section of this disclosure, termed "An Electroluminescent Display" describes in detail just such a display, which is the subject of U.S. Pat. No. 5,239,227, owned commonly with the rights to the present application. The electroluminescent display described herein, may be provided in various embodiments in any combination for the various displays disclosed and discussed.

An electronic display is provided according to the present invention with a viewing surface having a plurality of electroluminescent cells arranged in a dot matrix array. An excitation system is connected to the cells for selectively exciting them electrically to provide images. Each cell in the array has an elongated structure of electroluminescent material wherein the length, orthogonal to the viewing surface, is at least five times the extent of any dimension parallel to the viewing surface.

Each cell also has a first electrode along one side for substantially the length, and a second electrode electrically isolated from and opposite the first, also along substantially the length. Each of the electrodes comprises an area of conductive material in contact with the electroluminescent material, which is substantially contained between the areas of the electrodes.

A preferable arrangement has the cells in a rectangular array of rows and columns, and the excitation system has row traces adjacent rows of cells with connections in each row between the row trace and the first electrode of each cell in the adjacent row of cells. There are also in this preferable arrangement column traces adjacent columns of cells, with connections in each column between the column trace and the second electrode of each cell in the adjacent column of cells.

The electroluminescent cell according to the present invention, by having a length several times longer than any dimension at right angles to the length, the length being at right angles to the viewing surface, is able to project light more efficiently toward a viewer of the display than is possible with displays of the prior art.

By forming electrodes for electrically exciting the cells across the smaller dimension rather than across the full length, the cell operates at a substantially lower voltage than is possible with displays of the prior art, as well. The result is that the display of the present invention provides substantially better intensity and contrast at less voltage and power than has heretofore been possible.

Also in the present invention unique methods are provided for constructing the display of the invention, both with thin film and with thick film techniques.

Figure 21:
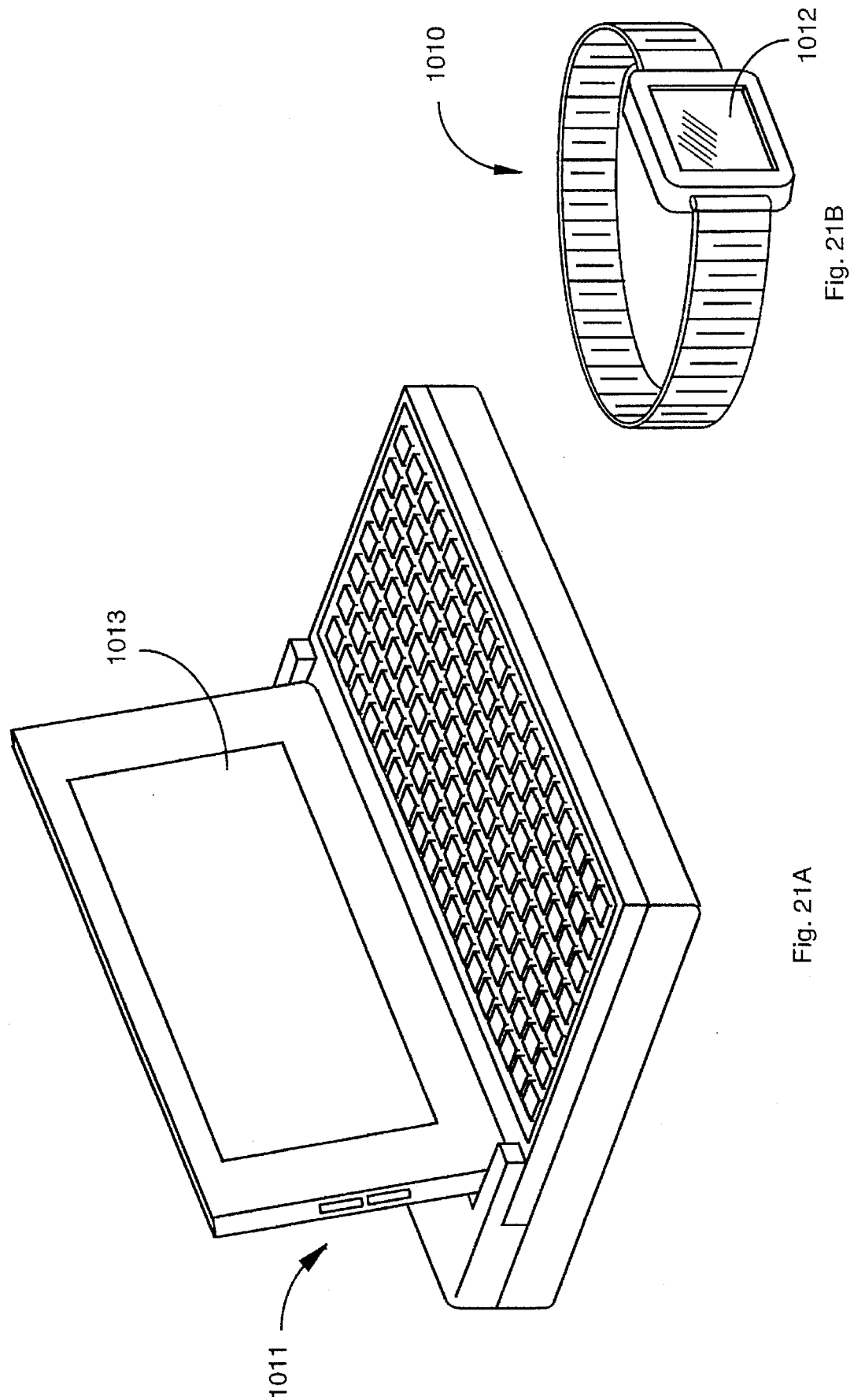
FIG. 21A is an isometric view of a portable computer having a display according to the present invention.
FIG. 21B is an isometric view of a "wristwatch" TV according to the present invention.

FIG. 21A is an isometric view of a notebook computer system 1011 with a flat panel display 1013 according to the present invention. The computer system is conventional, and could as well be a desktop system, a workstation, or some other type of computer system for which such a display would be useful.

FIG. 21B shows a "wristwatch" TV 10 with a display 1012 according to the present invention. The area of display 1012 is about 400 square mm.

FIGS. 21A and 21B are representative of applications for flat panel displays, and are preferred applications for the invention. It will be apparent to persons with skill in the art that there are many other applications for displays for which the present invention will be useful and advantageous, such as displays for instrument control systems and the like. Displays for personal digital assistants and devices to be used with personal digital assistants are another likely application.

Displays 1012 and 1013, and other displays according to the present invention, are based on a substantially flat sheet with light-emitting cells constructed in a manner to produce more light with less power and voltage than conventional displays. The description below of display 1013 of the notebook computer is meant to apply as well to "wristwatch" TV display 1012 and other displays that may be applications for the display of the present invention.

The image mechanics of displays, such as the familiar CRT, are all similar in some degree, in that they are all based on images comprising arrangements of points of light, or dots, on the screen. In a CRT display, the points are illuminated by the action of an electron beam striking a screen having one or more layers of materials that emit light when struck by an electron beam, typically phosphor materials.

Often the smallest point (or dot) that a system is capable of displaying is smaller than the basic element that is actually displayed. One reason this is so is that it is often economic to limit the resolution of a display even though a higher resolution could be attained. Higher resolution generally requires more computer memory to store data for the display, more sophisticated software capability, and even higher processing speed.

The basic display element, often made up of several dots, is called a pixel in the art, which is a shortening of the term "picture element". In a CRT display, the dots are not an inherent function of the structure of the screen, but of the movement of an electron beam and the timing of bursts of power to the beam. The beam is "swept" across the screen at different levels, defining lines, and activated a specific number of times for each sweep. For example, as already described above, one of the operating modes of the popular VGA video adapter provides 640 pixels per line and 480 lines. This is a total for the screen of 307,200 pixels. This is about 6 pixels per square mm for a screen of about 200 ms by 250 mm. and provides a spacing between pixels of about 300 microns.

The display in the present invention comprises a fixed array of light-emitting structures, so the dot density is a function of the physical implementation of the display. In some displays, such as CRT displays, the density is not a function of the physical design of the display.

Figure 22:
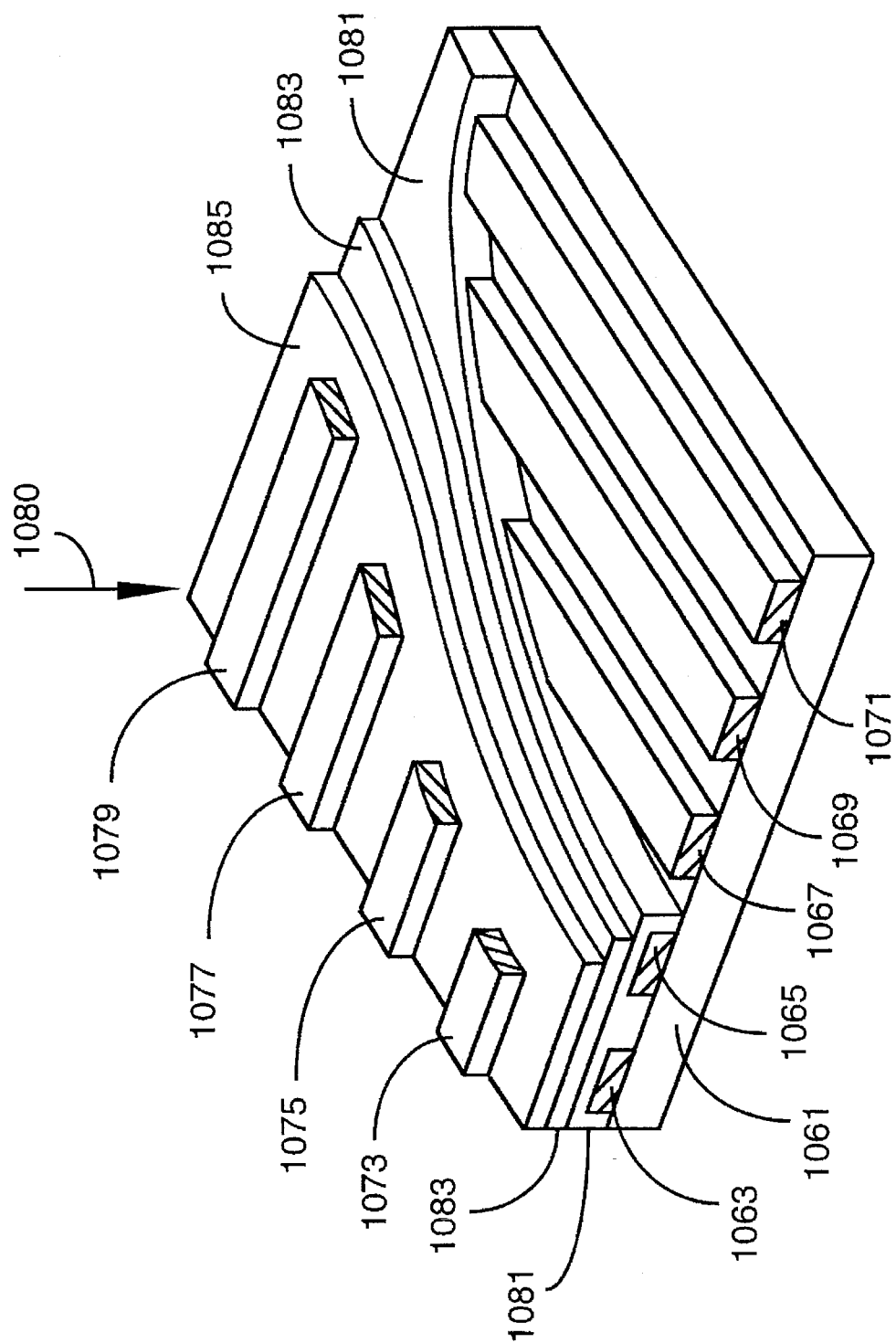
FIG. 22 is an isometric view in partial section of an electroluminescent display according to the prior art.

FIG. 22 is an isometric view of a thin film electroluminescent display of the prior art, partially cut away to show the internal organization. The display of FIG. 22 is implemented on a glass plate 1061, and consists essentially of two series of electrodes with an electroluminescent material between them. The viewing direction is the direction of arrow 1080.

One series of parallel electrodes may be called row electrodes and the other series of parallel electrodes may be called column electrodes. It is arbitrary which is called which. Electrically conductive elements 1063, 1065, 1067, 1069, and 1071 in this example are the column electrodes, and electrically conductive elements 1073, 1075, 1077, and 1079 are the row electrodes.

In general terms of construction, after the column electrodes are formed on glass plate 1061, a layer of electrically insulative material 1081 is deposited over them. One suitable insulator is silicon dioxide. There are other insulators that might be used.

A layer of electroluminescent material 1083, such as zinc sulfide doped with manganese, is then deposited over insulative layer 1081. Layer 1083 provides the active material that emits light in response to an applied electrical field. Another layer 1085 of insulative material is deposited over the light-emitting material of layer 1083, and this layer must be transparent, because if it were not transparent, it would block light from the display. After insulative layer 1085 is deposited, the row electrodes are formed on top of layer 1085, substantially at right angles to the column electrodes. The row electrodes must also be transparent, because otherwise they would block light from the display.

The active areas in this display are the areas where a row electrode passes over a column electrode in a spaced-apart relationship. At each of these points one of each electrode comes into close proximity with the electroluminescent material in between. That is, at the intersection of a row and a column electrode, there is a local cell formed with electroluminescent material in between the two electrodes. The active area is the area of the intersection. If the two electrodes are connected to driver circuitry so that a voltage of about 150 to 200 volts (usually alternating current) is imposed between them, and across the depth of the electroluminescent material, the electroluminescent material emits light. Because of the geometry it is generally necessary that the row electrodes (1073, 1075, 1077, and 1079 in FIG. 22) and insulating layer 1085 be transparent. One useful material for the row electrodes is Indium-Tin Oxide (ITO), because this material is transparent, electrically conductive, and may be readily deposited. The electrodes shown are merely representative of much larger arrays, which may comprise thousands of electrodes.

Driving circuitry for such electroluminescent displays of the prior art has been developed, and is similar in some respects to such circuitry used for other kinds of what are known in the art as dot matrix displays. In general, row and column electrodes are all switchable, with one connectable to a power source and the other usually connected to a common line to which the opposite pole of the power source is also connected. To activate a single dot in the display, both the row and column electrode must be "active", so a voltage is imposed across a small region of electroluminescent material. Drive circuitry is typically multiplexed (scanned) to activate the dots in the display.

FIG. 23A is an idealized illustration of a single light-emitting cell 1015 according to the present invention, providing a single controllable dot in an array. In the cell shown in FIG. 23A, an elongated structure 1017 is formed of a material that produces light under the influence of an electrical field, such as zinc sulfide doped with a rare earth material. Dimensions D10 and D11 are preferably about equal in this embodiment, and vary from about 1 to about 2 microns, with the smaller dimension preferred. In the actual cell the cross-sectional shape will not necessarily be a perfect square as shown in the idealized structure. Dimension D3 is from 5 to 10 times dimension D10 or D11. For example, for a D10 and a D11 of 1 micron, D3 is preferably from 5 to 10 microns. For a D10 and a D11 of 2 microns, D3 will be preferably from 10 to 20 microns.

The reason for the high length to width ratio is to take advantage of the waveguide phenomena associated with elongated structures. Light produced within or guided into a structure of the sort shown in FIG. 23A, that is, having a length several times greater than dimensions at right angles to the length, will tend to be transmitted preferably along the length of the structure, partly because of reflection and diffraction characteristics of the closer sidewalls, and will be preferably emitted from the small ends, as shown by arrow 1023. Light from the opposite small end is partly reflected and blocked from being emitted, as that end is against an opaque surface in a finished display. Arrow 1023 is also in direction an orthogonal to the surface of the screen, opposite in direction to the viewing direction. The ratio of light energy emitted from the small end to light emitted from the sidewalls will be about the ratio of D3 to D10 or D11. In this case from about 5:1 to about 10:1. This is an application of the principles responsible for the success of fiber optic transmission.

Provision of discrete light-emitting structures, and elongation of the light-emitting structures, is partially responsible for greater efficiency for the present invention compared to conventional displays. Another feature that increases the efficiency of the cell of the invention is the geometry of the application of the electrical field. The display of the prior art, as shown in FIG. 22, applies the driving potential across the thickness of the electroluminescent layer, and the layer has to have a thickness sufficient to provide adequate material to emit a desired amount of light.

In the present invention, electrically conductive material is formed on two sides of the length of structure 1017, providing electrodes 1019 and 1021, with electrical contact being made to conductive traces 1025 and 1027 respectively to supply electrical potential for the electrical field to excite light output from structure 1017. In FIG. 23A, each electrode is shown as a contiguous part of a conductive trace, although this need not be so, as long as electrical contact is made.

The advantage of applying the electrical field across the short dimension of elongated structure 1017 is that the light produced is proportional not to the voltage, but to the field strength, which is measured in volts/unit length. In devices of the prior art, as already pointed out, voltage applied must be as high as 200 volts. The structure shown as prior art in FIG. 22, and the 200 volt requirement, are both taken from Microprocessor Based Design, by Michael Slater, pp 367, Copyright 1989 by Prentice-Hall, Inc., a division of Simon and Schuster.

In the present invention, an electrical field strength equivalent to that of the prior art can be achieved with only about 20 to 40 volts, because of the relatively short dimension between electrodes. The much lower voltage, coupled with the effect of elongated structures to direct more light in the needed direction, that is, substantially orthogonal to the plane surface of the display screen, provides up to ten times the light with one tenth the voltage, an advantage in light intensity vs voltage of about 100:1, compared to the prior art.

The lower voltage necessary to drive the display of the present invention also provides a display compatible with low-power CMOS technology, and cuts heat generation as well.

Figure 23B:
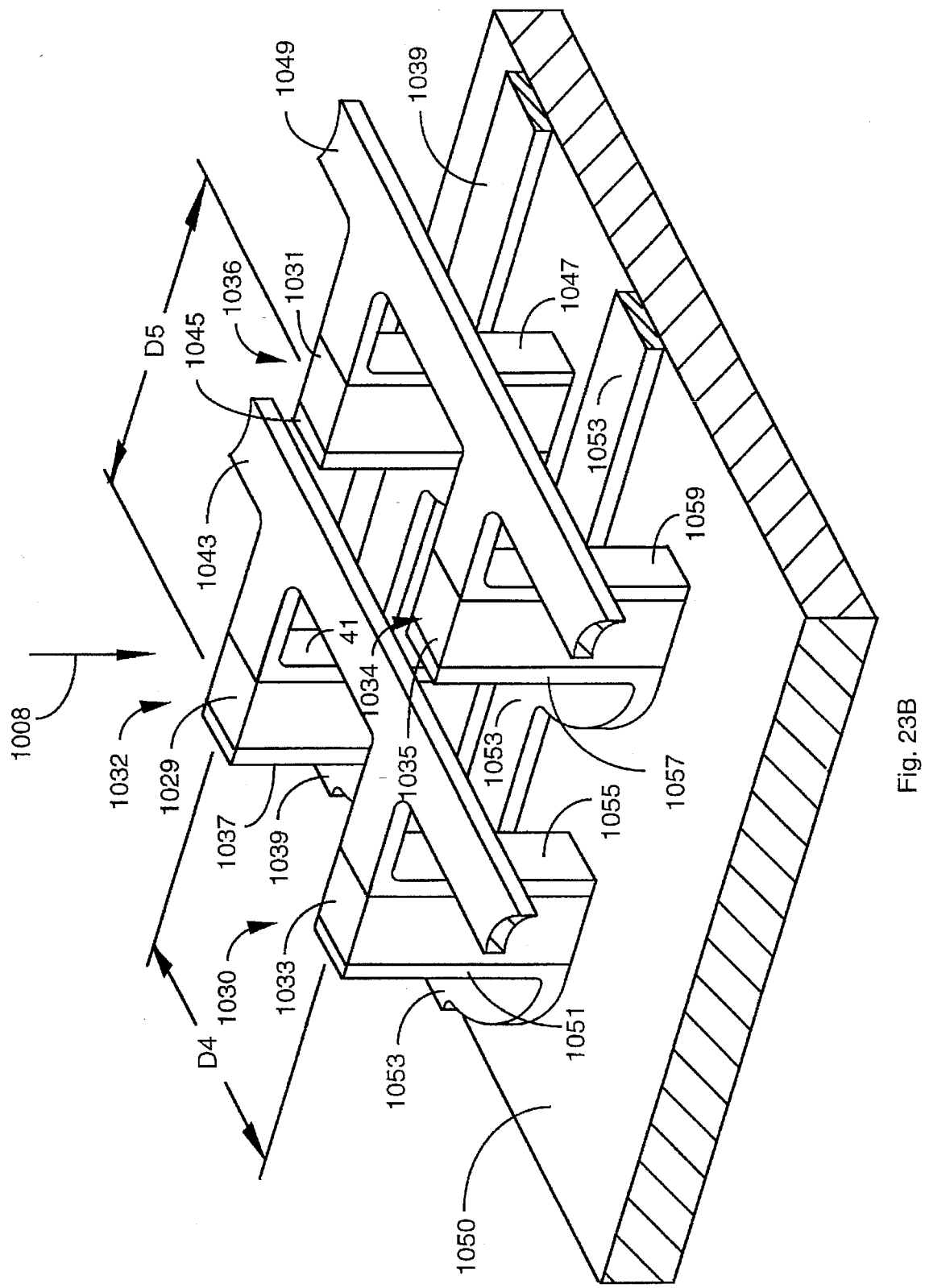
FIG. 23B is an isometric view of a grouping of four electroluminescent cells according to the present invention connected to conductive traces.
Figure 23C:
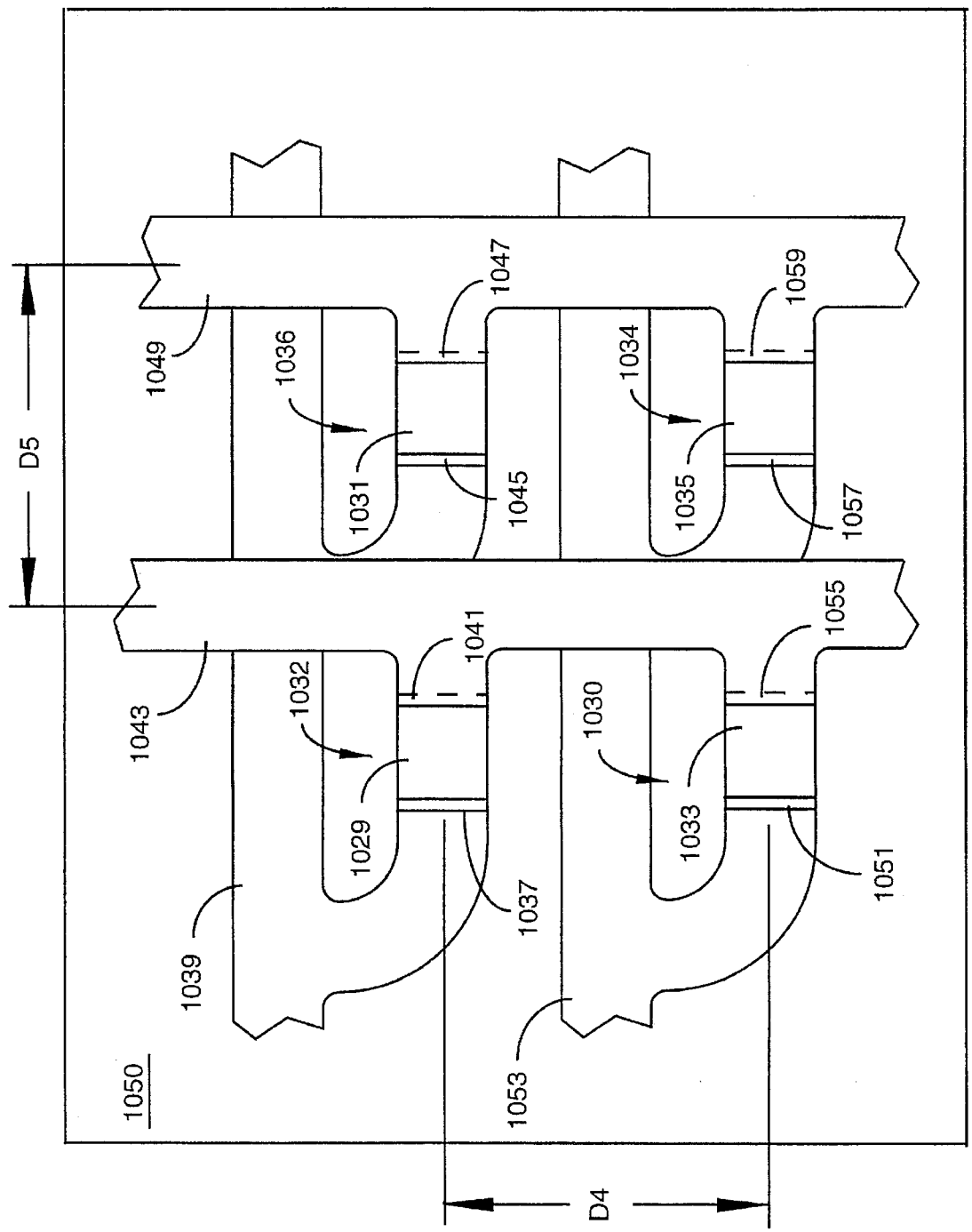
FIG. 23C is a plan view of the grouping of cells shown in FIG. 23B.

FIG. 23B is an isometric view showing four light-emitting cells 1030, 1032, 1034, and 1036, comprising idealized light-emitting structures 1029, 1031, 1033, and 1035, along with electrodes, according to the present invention, in a square array. The viewing direction is the direction of arrow 1008. FIG. 23C shows the same four cells in plan view. The four cells shown are representative of a much larger cartesian array of cells in the embodiment described. Each of the four light-emitting cells shown in FIG. 23B and FIG. 23C comprises two electrodes, one on each of opposite vertical walls.

In FIGS. 23B and 23C cell 1032 with structure 1029 has an electrode 1037 connected to conductive trace 1039, and an electrode 1041 connected to conductive trace 1043. Cell 1036 with structure 1031 has an electrode 1045 connected to trace 1039 and an electrode 1047 connected to conductive trace 1049. Cell 1030 with structure 1033 has an electrode 1051 connected to conductive trace 1053, and an electrode 1055 connected to conductive trace 1043. Cell 1034 with structure 1035 has an electrode 1057 connected to conductive trace 1053, and an electrode 1059 connected to conductive trace 1049. Although only four idealized cells are shown in FIG. 23B, they are sufficient to illustrate the square array structure and connection scheme.

As mentioned above, the four cells shown are merely illustrative of a much larger array, comprising thousands of cells. Connection of electrodes for cells is in rows and columns. For example, trace 1053, which may be considered a row trace, connects all electrodes on one side of a row of cells. Cells 1030 and 34 with electrodes 1051 and 1057 respectively, represent a row of cells connected to one side by trace 1053. Similarly, trace 1039, parallel to trace 1053, and at the same "level" in the three-dimensional structure, connects to electrodes 1037 and 1045 on cells 1032 and 1036.

Electrodes on the other side of each cell connect to column traces generally at right angles to the row traces. For example, electrodes 1059 and 1047, serving cells 1034 and 1036 respectively, connect to trace 1049, a column trace, and cells 1034 and 1036 represent a column of cells. Similarly, electrodes 1055 and 1041, serving cells 1030 and 1032 connect to column trace 1043, so cells 1030 and 1032 represent a column of cells parallel to the column formed by cells 1034 and 1036.

Each row trace is connected to one terminal of a power source through a switching circuit, so each row can be individually activated. Similarly, each column trace is connected to the opposite terminal of the same power source through a switching circuit, so each column trace may be individually activated. Thus, to activate a cell imposing the voltage of the power source across the cell, causing it to emit light, one row and one column trace must be switched Referring still to FIG. 23B, to switch "on" cell 1030, it is necessary to activate both trace 1043 and trace 1053. This applies a voltage across structure 1033 between electrodes 1051 and 1055. Although activating traces 1043 and 1053 also connects electrode 1041 of cell 1032 to the side of the power source connected to trace 1043, and electrode 1057 of cell 1034 to the same side of the power source connected to trace 1053, cell 1030 is the only cell to have both electrodes connected across the power source, hence is the only cell in the array to be switched on to emit light.

In FIG. 23B the elements are shown as free-standing structures upon a plate 1050, which may be one of a number of materials. Glass is a suitable material, and other materials, such as quartz and monocrystalline silicon may also be used. The volume surrounding the various elements shown is, in the actual implementation, an insulative deposited material, such as silicon dioxide. This material is not shown in FIGS. 23B and 23C so the structural details may be better seen and understood. Also in FIG. 23B, the row traces and the column traces are shown at widely separated levels in the overall structure. Column traces 1043 and 1049 are shown at the "upper" level, that is, at or near the surface on the viewing side of the display, while row traces 1039 and 1053 are shown "buried" at the surface of plate 1050. This is a result of the idealized illustration, and is not necessarily required for the invention. Relative to position in the structure, it is required for the invention that the traces not suffer electrical short to one another. Keeping them separated at different levels in the structure helps to accomplish this purpose.

In the electroluminescent display of the prior art described with the aid of FIG. 22, electrodes 1073–1079 are necessarily transparent. If they were not, the light emitted could not be seen, because one of the electrodes crosses every "dot" in the display. In the display according to the present invention, the upper traces on the viewing side of the display need not be transparent, because they do not overlie the light-emitting structure. The upper electrodes in the invention can therefore be implemented in a broader choice of materials. Aluminum, for example, which is commonly used for such conductive traces in the manufacture of integrated circuits.

In the array shown in FIGS. 23B and 23C dimensions D4 and D5 are about equal (square array), and may be as small as about 10 microns. It is not strictly required that the array be square, nor even that the light-emitting "dots" be arranged in a square or rectangular matrix. Such a matrix, however, is preferred, as it is a convenience in manufacturing and operation.

The "dot density" with a 10 micron square array is $10^4$ dots per square millimeter. This compares with the pixel density of a common VGA video mode of about 6 dots per square millimeter. Clearly the dot density of the display according to the present invention is capable of providing resolution beyond that of any other available technology. This extremely high physical resolution makes the display of the present invention suitable for high resolution, small displays, like "wristwatch" televisions, for example. In the "wristwatch" TV of FIG. 21B, having a screen area of about 400 mm as described above, the potential density of $10^4$ dots per square me will result in 4 million light-emitting dots for the small TV screen. In the example above of a popular VGA mode for a computer display, there were about 300,000 pixels in the display, so the display of the present invention could have more than 12 times the resolution of the VGA display. It is not required that the light-emitting structures in the present invention be as close as 10 microns, and the actual matrix spacing is a function of the application for the display, and in some cases of the manufacturing technique used.

It is seen that in the array of the present embodiment, each light-emitting structure in a horizontal row is connected to a common conductive trace, and each light-emitting structure in a vertical column of the array is connected to a common conductive trace. There are existing drive technologies for driving matrix displays of this sort, and these are commonly used for such as LCD matrix displays, plasma dot matrix displays, and dot matrix electroluminescent displays as described above with the aid of FIG. 22. The display of the present invention may be driven with a wiring matrix of this conventional sort, but generally at a lower voltage.

There are a number of techniques usable in the manufacture of the display according to the present invention. For very high dot density, such as for a dot array spaced on about 10 micron centers, tested and proven techniques used in the manufacture of integrated circuits are preferred, together with unique arrangements developed for specific purposes for the invention. These IC manufacturing techniques are generally termed thin film techniques. In some other embodiments, there are unique techniques developed for manufacturing, which are described below, and generally termed thick film techniques.

Figure 24A:
FIG. 24A is an elevation section view of a base plate for a display according to the present invention.

FIG. 24A shows a section of a substrate 1087 upon which a display according to the present invention is to be fabricated. This substrate is the equivalent of plate 1050 in FIGS. 23B and 23C, and may be a glass plate or a slice of monocrystalline silicon of the sort upon which integrated circuits are made. There are other suitable materials as well.

Figure 24B:
FIG. 24B is a section showing a polysilicon layer applied to the base of FIG. 24A.

FIG. 24B shows the substrate after deposition of a layer 1089 of polysilicon, which acts as an intermediary and adhesion layer for a next layer of electroluminescent material to be deposited.

Figure 24C:
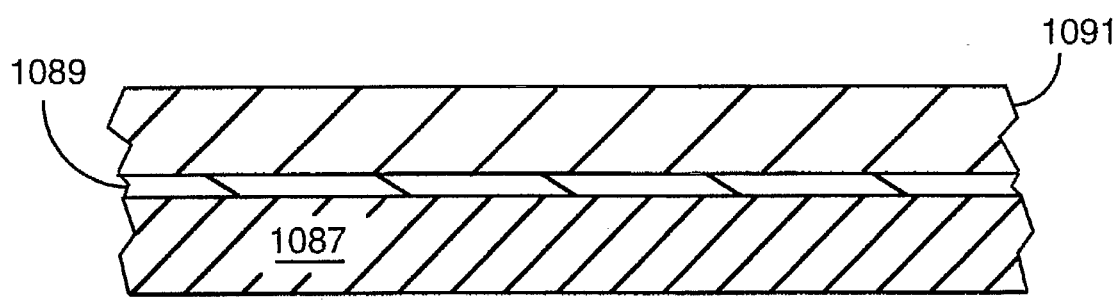
FIG. 24C is a section showing another step in construction with a layer of electroluminescent material deposited over the layer of polysilicon material shown in FIG. 24B.

FIG. 24C shows a cross section of the developing display after deposition of a layer 1091 of an electroluminescent material to a thickness of about 10 microns in this particular embodiment. The relative thicknesses of the substrate, the polysilicon material and the layer of electroluminescent material are not to scale. Substrate 1087 is of a sufficient thickness to provide structural rigidity, such as about 1 cm., so the substrate is about $10^3$ times the thickness of the electroluminescent layer 1091 in this embodiment. Physical sputtering is a technique that may be used for the deposition of the electroluminescent material, using a composite sputtering target. There are other deposition techniques as well.

Figure 24D:
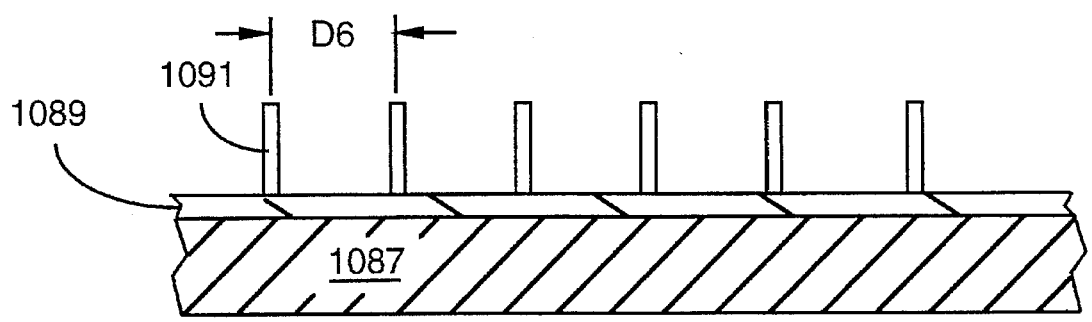
FIG. 24D is a section showing the result of etching the electroluminescent material of FIG. 24C to provide vertically oriented structures.

After deposition of electroluminescent layer 1091, the surface is patterned and etched by conventional techniques producing an array of vertically oriented structures of electroluminescent material, preferably having a height to width ratio of from 5:1 to 10:1. FIG. 24D is a section through the array and shows a single row of structures of layer 1091. The array is on centers preferably of about 10 microns, so dimension D6 is about 10 microns. Dry etching is a preferred technique because dry etching works well for etching relatively deep patterns.

Figure 24E:
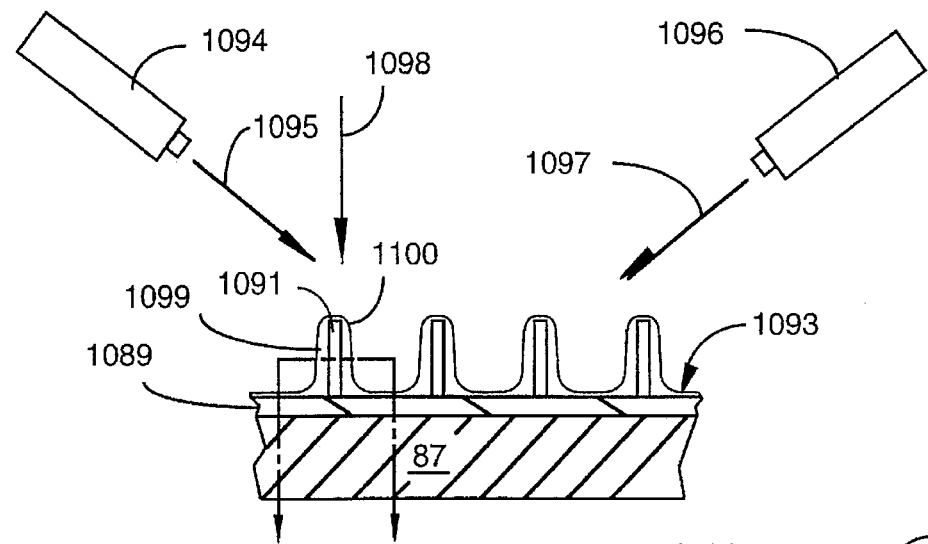
FIG. 24E shows an arrangement of deposition sources to preferentially deposit electrically conductive material on the structures shown in FIG. 24D.

FIG. 24E shows the result of a subsequent step in the fabrication wherein a layer 1093 of electrically conductive material is deposited over the vertically oriented structures of electroluminescent material of layer 1091. In this step a unique variation in a known technique is practiced to control the thickness of the conductive material of layer 1093 deposited in preferred areas. The technique used is molecular beam deposition.

Molecular beam source 1094 emits metal vapor in a highly directional manner substantially in the direction of arrow 1095. A preferable material is aluminum, commonly used for electrical interconnection in IC fabrication. Source 1094 represents a plurality of such sources arranged generally in a group such that the additive area of metal flux will encompass all of the area of the developing display. The sources 1094 are all aimed at substantially the same angle, although the angle may change somewhat.

A similar group of highly directional sources represented by source 1096 are aimed from the opposite side to deposit in the general direction of arrow 1097 on the other side of each of the structures in layer 1091. The result of the deposition is that the electroluminescent structures of layer 1091 are coated with conductive material of layer 1093 preferentially on two opposite sides.

Figure 24F:
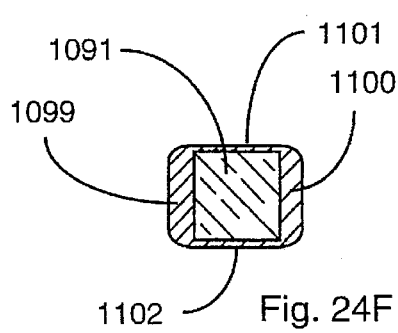
FIG. 24F is a section of one structure after deposition of electrically conductive material illustrating the result of preferential deposition.

FIG. 24F is a magnified section view of one of the structures of layer 1091 taken at line 4F—4F of FIG. 24E. This section shows approximately the relative thicknesses of the metal coating on the four sides of each idealized structure after the directed deposition of layer 1093. Areas 1099 and 1100, shown in both FIGS. 24E and 24F are areas of preferential deposition. Areas 1101 and 1102 are the sides at ninety degrees to the preferentially coated sides, and are areas of minimum deposition, being generally parallel to the line of arrival of coating material. The coating on areas 1099 and 1100 is several times thicker than the coating on areas 1101 and 1102.

Conductive material is also coated on the "floor" of the developing structure, that is, upon layer 1089 between the vertically oriented structures of layer 1091, but the thickness of conductive material in these areas will be relatively thin compared to the preferential deposition shown for areas 1099 and 1100 in FIGS. 24E and 24F. So after deposition of layer 1093 of conductive material, there is an uneven, but unbroken, coating of conductive material over the entire surface of the developing display.

After coating with the electrically conducting material to make layer 1093, the partially completed display is etched to leave electrically conductive material from layer 1093 only in the areas 1099 and 1100, which are then the two electrodes associated with each electroluminescent structure, to provide a light-emitting cell. Part of this etching process is a dry plasma process, which removes material from layer 1093 at an approximately even rate, except the upper tips of the vertical structures etch somewhat faster because of a tendency for the electrical potential over the display surface to be higher at these points.

After a selected period of etching at a known rate, electrically conductive material is removed completely from the areas of relatively lesser original thickness, such as areas 1101 and 1102 in FIG. 24F and the areas on layer 1089, and from the tips of the vertical structures, and electrically conductive material remains, at a somewhat lesser thickness than originally deposited, only on two sides of each of the vertical electroluminescent structures. These newly isolated areas of electrically conductive material become the electrodes described with the aid of FIG. 23B and FIG. 23C. For example, electrodes 1037 and 1041 on electroluminescent structure 1029.

Figure 24G:
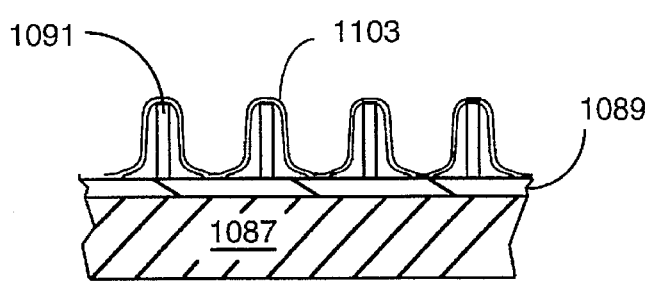
FIG. 24G is a section showing the result of depositing a thin film of insulative material over the structures shown in FIG. 24E after separating areas of conductive material.

In a next step a relatively thin electrically insulative layer 1103 is deposited. FIG. 24G shows a cross section view after the etching process described above to provide the electrodes on each of the electroluminescent structures, and after deposition of insulative material to provide layer 1103 to a thickness of a few hundred angstroms.

Figure 24H:
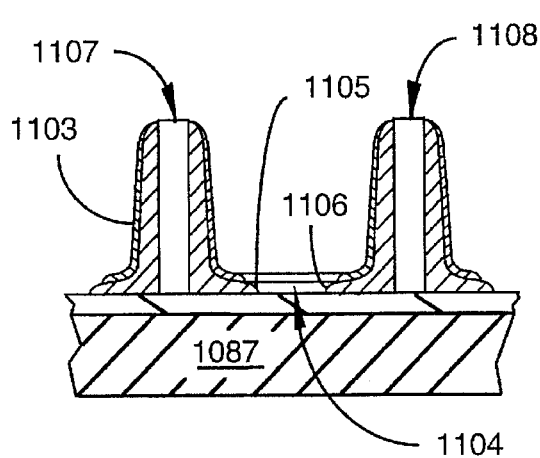
FIG. 24H shows the structures of FIG. 24G in section after etching a window for making electrical connection.

After the deposition of insulative material 1103 shown in FIG. 24G, "windows" for electrical connection are opened between cell structures. FIG. 24H is a section view showing one window 1104 between two adjacent cell structures 1107 and 1108. This is a process of masking, lithography, and etching as is well known in the art, and results in lower ends, such as ends 1105 and 1106, of electrodes on adjacent cell structures being exposed in each window.

Figure 24I:
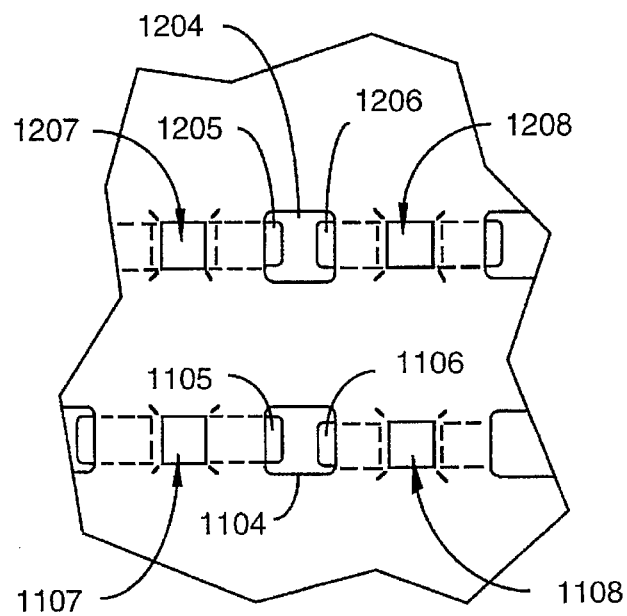
FIG. 24I is a plan view of the structure shown in FIG. 24H and another adjacent structure, to better illustrate the construction.

FIG. 24I is a plan view showing four cell structures 1107, 1108, 1207, and 1208, and two "windows" 1104 and 1204 opened between the cell structures. The electrodes proceeding from cells 1107 and 1108 are shown in dotted outline, ending in window 1104 with exposed ends 1105 and 1106. Similarly, the electrodes proceeding from cells 1207 and 208 are shown in dotted outline, ending in window 1204 with exposed ends 1205 and 1206.

The windows are about two microns square, easily attainable in etching processes in the art. What remains from this point to complete the display is connection of electrodes for rows and columns of cells in the manner described above with reference to FIGS. 23A and 23B, so that for each cell there is a connection from one electrode to a row trace, and from the other electrode to a column trace. This part of the process is conventional, and accomplished by successive deposition and etching of preferably aluminum as is known and commonly practiced in the art of integrated circuit fabrication.

After connection of electrodes to row and column traces, the display is complete. In some embodiments a further deposition may be done to overlay the display with a transparent protective material. In other embodiments the display is assembled with a flat glass or transparent plastic panel over the top surface, to protect the display cells and connections.

Thin film equipment is commercially available to process substrates of about 25 cm. in diameter, which allows for displays for many applications. Equipment for larger areas can be built. The present invention is not limited in area by equipment capacity, however, because there are alternative ways the display may be fabricated. The display may be implemented on a glass panel, for example, and can be done by additive thick-film techniques as well as by the subtractive thin-film techniques described above.

In a thick film process, early steps of which are shown in isometric view in FIG. 25A, a first layer of polysilicon 1107 is preferably applied to a glass plate 1108, as is done for the thin film process described above, to serve as an adhesion and intermediary layer. Then row traces of conductive material are formed over the polysilicon layer to connect to electroluminescent structures to be subsequently deposited. Two traces 1109 and 1110 are shown. In the actual display there are thousands of such traces.

There are a number of alternative ways the conductive row traces such as traces 1109 and 1110 may be formed. Silkscreening, using a conductive paint-type material, usually copper or aluminum filled, is one way. Another alternative is deposition of a layer of conductive material, such as by sputtering, then using conventional lithography and etching techniques to remove part of the film to leave the traces, after which the thickness may be increased by electroplating. There are still other ways known in the art. The distance D7 between row traces is preferably about 30 to 50 microns in this process, to allow working room for following process steps. The depth D8 is preferably about 10 microns, and the width D9 may vary widely, from a few microns to as much as 20 or thirty microns. Dimension D9 depends to a large extent on the nature of the process step used to form the traces.

FIG. 25B shows four structures 1111, 1112, 1113, and 1114 of electroluminescent material, such as zinc sulfide doped with manganese, deposited in contact with traces 1109 and 1110 by a unique plasma spray process.

FIG. 25C is an elevation view of FIG. 25B in the direction of arrow 1210 showing how the electroluminescent structures are deposited. A deposition mask 1115 with openings such as openings 1116 and 1117 on center dimensions desired for the center distance between electroluminescent structures is positioned over the arrangement of FIG. 25A. To deposit the electroluminescent structures, an array of plasma spray devices (represented by devices 1118 and 1119) is positioned over mask 1115, and vapor 18 directed in vacuum toward the mask. The deposition devices are positioned to provide a relatively even material flux, and in some cases, relative movement between the spray devices 1118 and 1119 and the mask is used to provide even material flux. In the case of such relative movement, there must be no movement between the mask and the surface upon which deposition is directed.

Material is intercepted by the mask except at the openings, where material passes through and solidifies forming the structures, such as structures 1111 and 1114, adjacent to the traces first formed on the display surface. Electroluminescent structures 1111 and 1114, as well as others formed through openings in mask 1115, are substantially rectangular in cross section orthogonal to the length, and the dimensions of the cross section do not exceed two microns. The length of the electroluminescent structures, substantially the same as the height of row traces 1109 and 1110, is about ten microns, so the ratio of the length to any dimension at right angles to the length is from 5:1 to 10:1.

The size and spacing of the plasma spray devices is not represented to scale relative to the elements of the forming display in FIG. 25C, because the disparity in size is too great to show all details in one view to scale.

After deposition of the electroluminescent structures, resulting in the stage of completion shown by FIG. 25B, the mask is plasma etched to remove the intercepted material in readiness for the next deposition. Masking and deposition is performed in vacuum, and may be done in a single station machine or a system having multiple stations and transport devices. A multiple station machine may also be served by one or more load-locks to facilitate loading and unloading.

The fact of the original conductive traces such as trace 1109 and 1110 being about the depth of the electroluminescent structures such as structures 1111, 1112, 1113, and 1114, and the electroluminescent structures being deposited adjacent to (and in contact with) the traces, allows the traces to act also as electrode areas described in the thin film process detailed above.

Figure 25D:
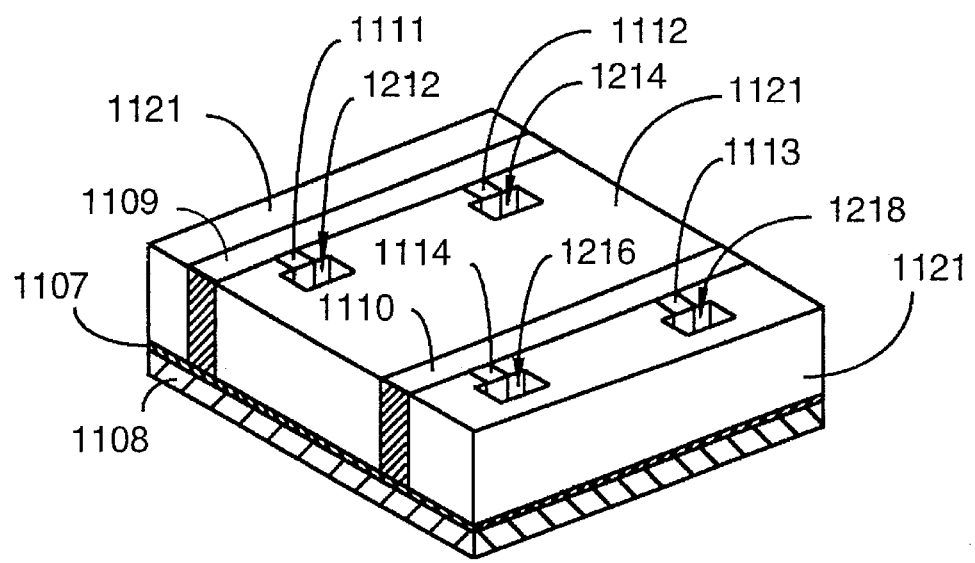
FIG. 25D is an isometric view showing the structures of FIG. 25C with photoresist deposited and holes opened to form second electrodes.

After deposition of electroluminescent structures 1111, 1112, 1113, and 1114, the display is covered with photoresist material and exposed through a lithography mask (not shown) that shadows areas immediately adjacent to the electroluminescent structures on the side opposite to the original conductive traces. After the curing of photoresist through a mask, the uncured material is removed by solvent. FIG. 25D is a view similar to FIG. 25B showing also photoresist layer 1121, and four openings 1212, 1214, 1216, and 1218 which are opened adjacent to electroluminescent structures 1111, 1112, 1113, and 1114 by washing with solvent after the photoresist material is cured.

After forming openings 1212, 1214, 1216 and 1218 the final requirement to form a usable display according to the present invention is to fill openings 1212, 1214, 1216, and 1218 with conductive material to form the second electrode for each of the cells, and to connect these second electrodes to conductive column traces to complete the selective circuitry of the display.

Figure 25E:
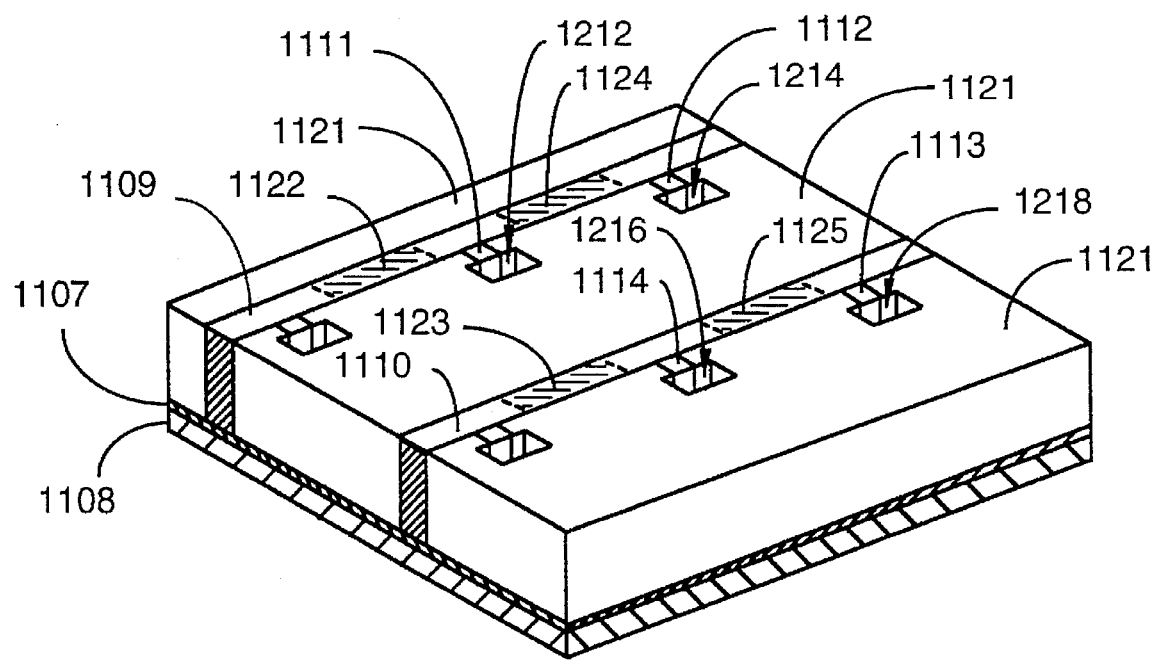
FIG. 25E is an isometric view illustrating critical areas to be protected before constructing column traces crossing row traces.

The row and column schematic of the traces is conveniently accomplished by having the column traces at generally right angles to the row traces. To do this, it is necessary that the traces do not make electrical contact where they cross. FIG. 25E is a somewhat expanded view similar to FIG. 25D showing critical areas 1122, 1123, 1124, and 1125, where conductive traces 1109 and 1110 need to be protected by an insulative cover to avoid shorting to column traces to be applied.

There are several alternative ways the separation of the traces to avoid shorting may be accomplished. One is to cover the traces in the step described above to apply photoresist layer 1121, and to cure the photoresist through a mask that allows later removal of photoresist not only at the openings such as opening 1212, 1214, 1216, and 1218, but also over each of the electroluminescent structures, so light from an activated structure will not be blocked by photoresist. This leaves areas 1122, 1123, 1124, and 1125 covered with photoresist which will insulate between traces 1109 and 1110, and subsequent crossing traces. This a preferable method because it avoids additional deposition and etching steps.

Another way to insulate for the crossing traces is to deposit insulative material over areas 1122, 1123, 1124, and 1125 in a subsequent step.

Figure 25F:
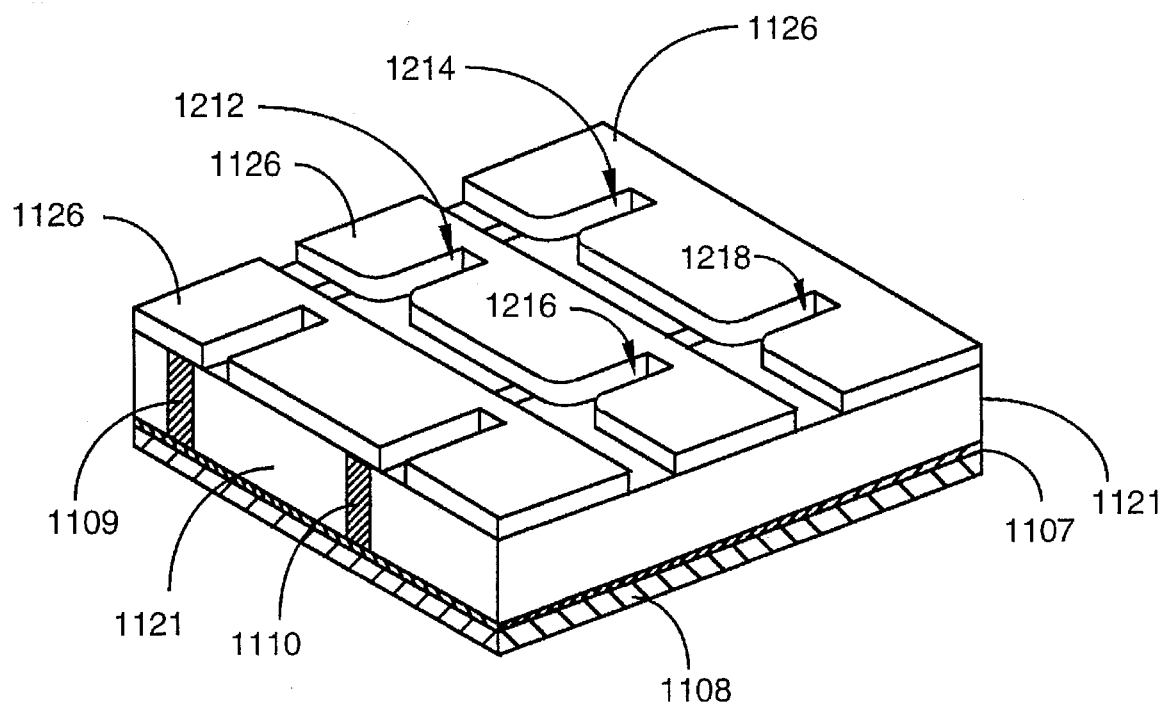
FIG. 25F shows a silkscreen mask positioned to construct electrodes and column traces for the display.

FIG. 25F is an isometric view of a portion of a silk screen mask 1126 registered to and applied over the developing display to apply the final electrodes by filling openings 2112, 1214, 1216, and 1218 (FIG. 25D), and to apply the column traces in the same step. Openings 1212, 1214, 1216, and 1218 are below mask 1126 in this view.

Figure 25G:
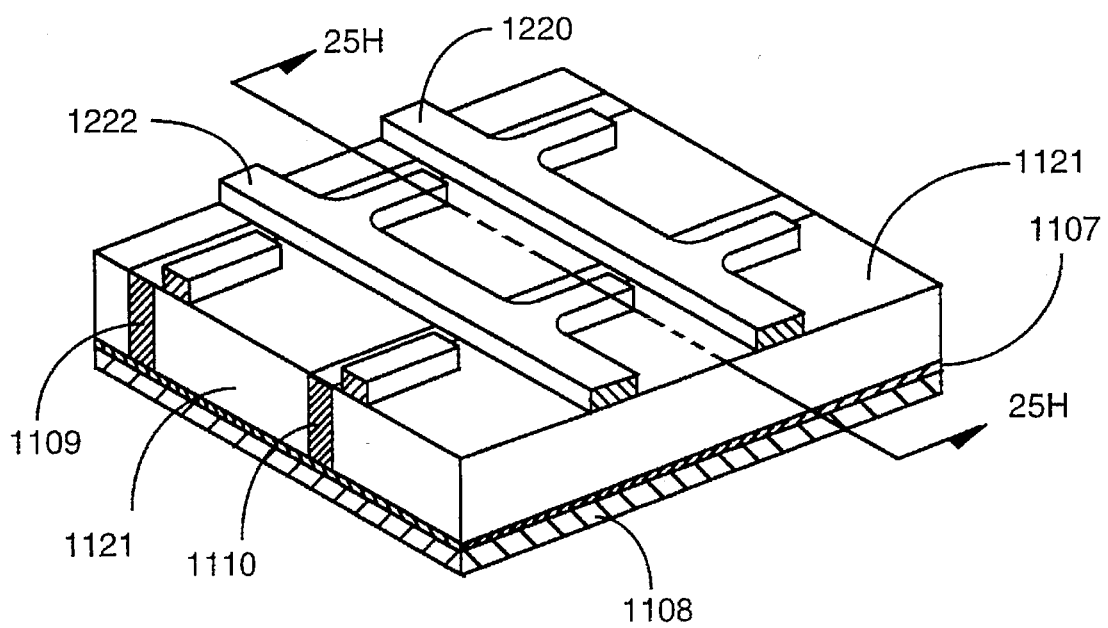
FIG. 25G shows the result of applying column traces with the silkscreen mask of FIG. 25F.

FIG. 25G is a view similar to FIG. 25F, except a paste-type silkscreen material filled with conductive material has been applied over the mask and cured, and mask 1126 has been removed. The conductive silkscreen material has been urged into openings 1212, 1214, 1216, and 1218 to form electrodes against electroluminescent structures 1111, 1112, 1113, and 1114 (FIG. 25B), and leaves conductive traces 1220 and 1222 connected to the newly formed electrodes.

Figure 25H:
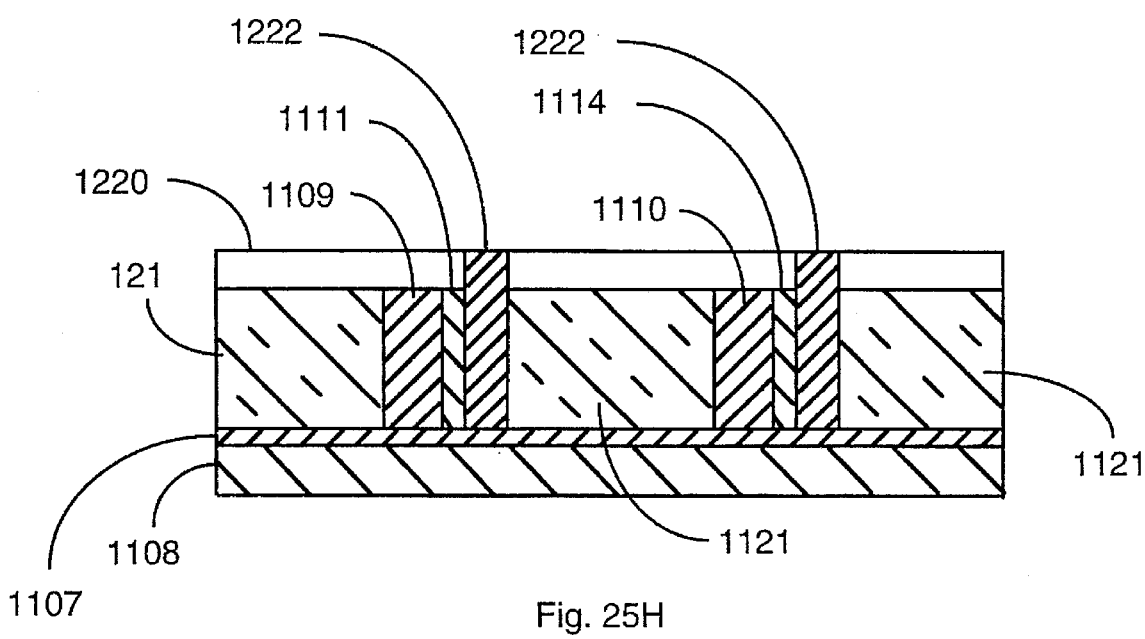
FIG. 25H is a section view taken on section line 25H—25H of FIG. 25G.
Figure 5I:
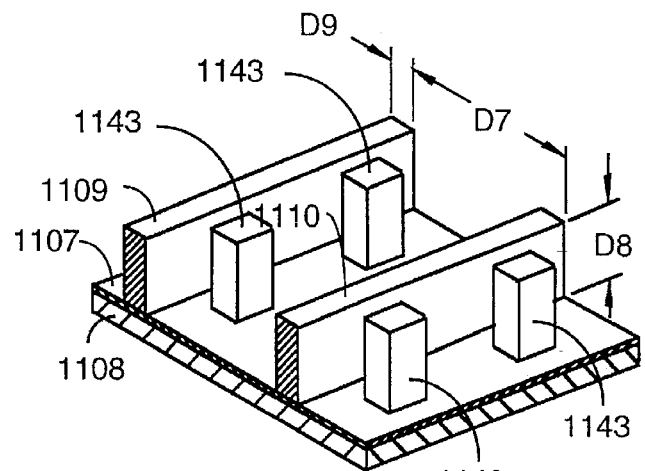

FIG. 25H is a section view taken along section line 25H—25H of FIG. 25G. Electroluminescent structure 1111 now has conductive material from trace 1109 on one side and conductive material from trace 1222 on the other. These two regions of conductive material are the electrodes for the electroluminescent cell based on structure 1111. Similarly, structure 1114 now has trace 1110 on one side and trace 1222 on the other, and these are the electrodes for the cell based on structure 1114. Similarly, all the cells in the display now have electrodes on each of two opposite sides, and the electrodes are a part of row and column traces.

A top layer of transparent material may be applied for protection of the traces and other elements, or the display may be assembled to a flat glass or plastic panel, as described above for displays formed by thin film manufacturing techniques. Connecting the row and column traces to drive circuitry renders the finished display usable for displaying images by illuminating individual electroluminescent structures.

In the thick film process for manufacturing a display according to the invention illustrated by FIGS. 25A through 25H and described in considerable detail above, there are a number of alternative ways to accomplish the structures. One deviation in the process described that is desirable in an alternative embodiment is to provide both electrodes for the electroluminescent structures in conjunction with the early step of forming row traces over the initial layer of polysilicon material. To do so requires forming islands of conductive material spaced apart from and alongside the row traces of conductive material.

FIG. 25I shows the result of forming islands 1143 as the row traces are formed. Four islands are shown. Just as the row traces perform as the first electrodes for cells, islands 1143 subsequently perform as the second electrodes. There are many thousands of such islands in addition to the four exemplary elements shown.

Figure 25J:
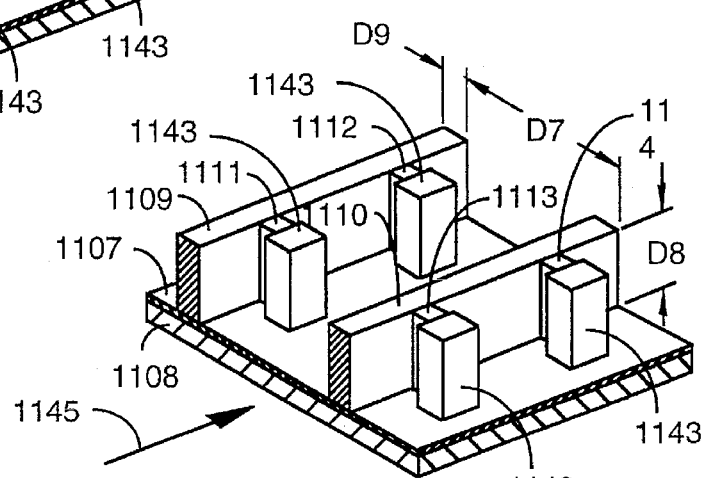
FIG. 25J is an isometric view showing a subsequent step in the construction technique according to the embodiment of FIG. 25I.

FIG. 25J shows the result of deposition of electroluminescent material to form light-emitting structures 1111, 1112, 1113, and 1114, which are, in this embodiment, "sandwiched" between the row traces and the island structures 1143.

Figure 25K:
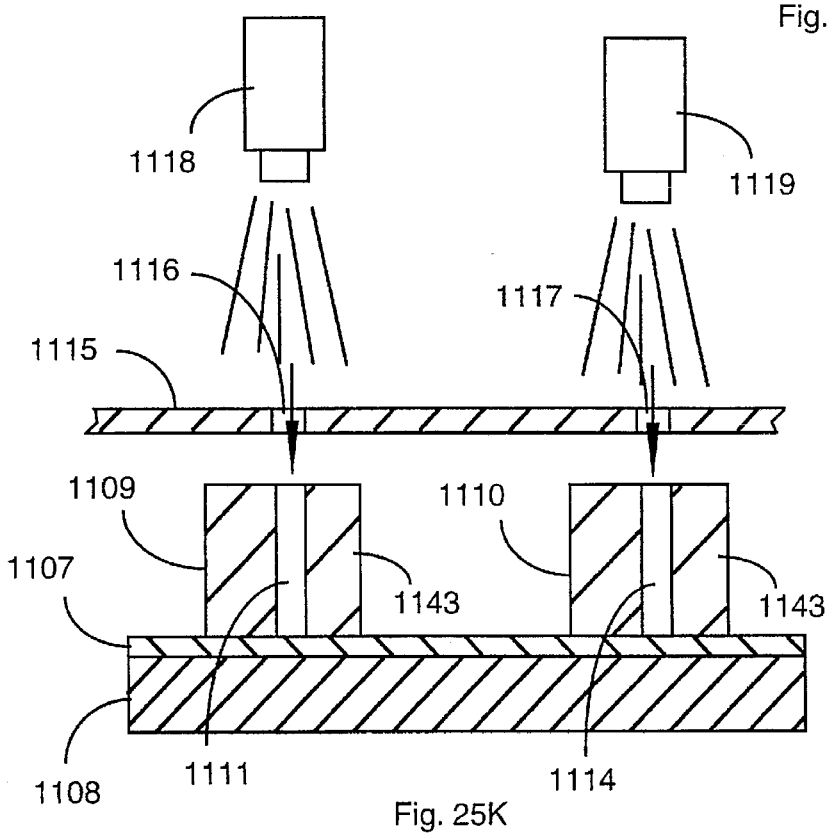
FIG. 25K is an elevation view showing the plasma spray process used to form electroluminescent structures in the embodiment illustrated by FIGS. 25I and 25J.

FIG. 25K, similar to FIG. 25C, shows the unique plasma spray deposition method in operation, taken in the direction of arrow 1145 of FIG. 25J. Electroluminescent structures such as structure 1111 and 1114 are formed between each island structure and the adjacent row trace. The island structure and the row trace in contact with an electroluminescent structure are then the two electrodes for applying an electrical potential across the short dimension of the electroluminescent structure.

A further advantage of the process in the embodiment presently described, with both electrodes formed in an early step before plasma spraying the electroluminescent structures, is that it is now not necessary to form holes for the second electrodes by photoresist and lithographic technique, as was described above with the aid of FIG. 25D. A layer of non conductive material is still useful to protect the conductive elements from shorting to one another, and to provide for insulation where column traces to be applied will cross row traces, as was described above with the aid of FIG. 25E.

Figure 25L:
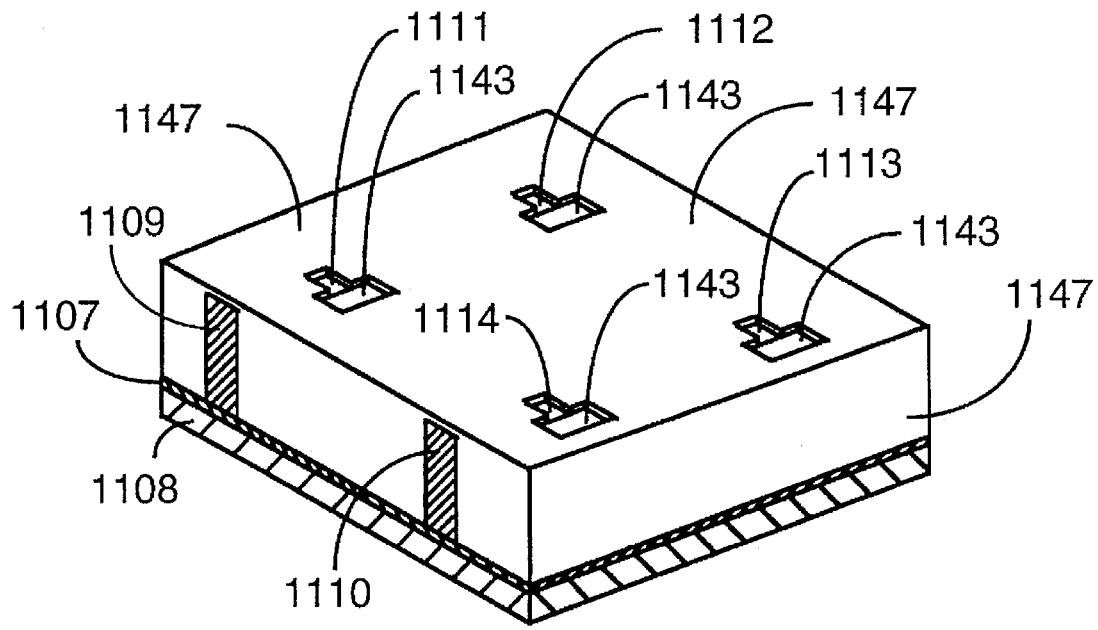
FIG. 25L is an isometric view showing the structure of FIG. 25J with an electrically insulating layer added.

FIG. 25L, similar to FIG. 25D, shows the display in the state of completion shown by FIG. 25J, with electrically insulative layer 1147 added. In FIG. 25L insulative layer 1147 is still photoresist, and has been applied to a depth sufficient to cover all of the structure applied thus far, then cured through a mask leaving the area above islands 1143 and structures 1111, 1112, 1113, and 1114 uncured. By washing away these uncured areas with a solvent, islands 1143 and the upper ends of structures 1111, 1112, 1113, and 1114 are exposed again.

To complete the display in this alternative embodiment, the steps are the same as previously described above for the first-described thick film process, involving applying a silk screen mask, and forming column traces generally at right angles to the row traces, with each column trace connecting all of the conductive island structures 1143 immediately adjacent to each column trace. This is the same step as described above for forming the column traces, except now it is not necessary to force the conductive silk screen material into deep holes to form the second electrodes for the electroluminescent cells.

Figure 25M:
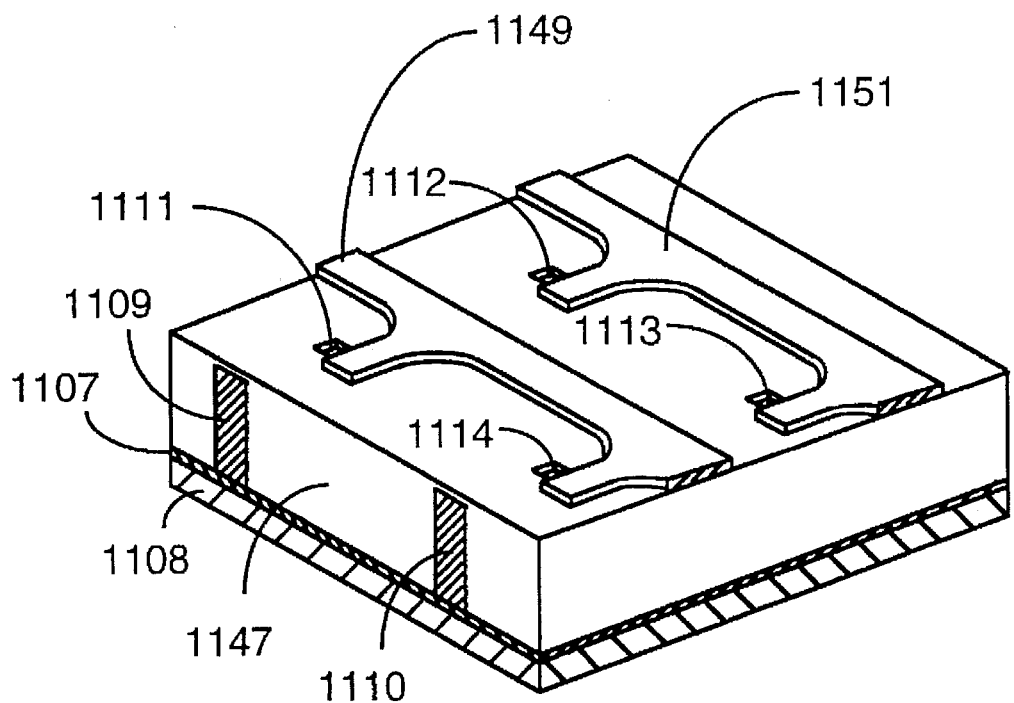
FIG. 25M is an isometric view showing the structure of FIG. 25L with electrically conductive column traces added.

FIG. 25M shows the elements in the state of construction shown by FIG. 25L with column traces 1149 and 1151 added. Silkscreening is a preferred method, but not required. The column traces also might be done by blanket deposition and subtractive technique (etching) as is known in the art of IC manufacture, or by other known methods of connective technology.

An alternative way that relatively large extent displays may be provided by the present invention is by arranging several smaller displays side-by-side to provide a display of a larger area, wherein the smaller displays are connected to be individually driven, or connected so that rows of adjacent smaller displays are commonly connected, and columns of adjacent displays are also commonly connected, so that the larger display may be driven by a single set of driver circuitry.

Figure 26:
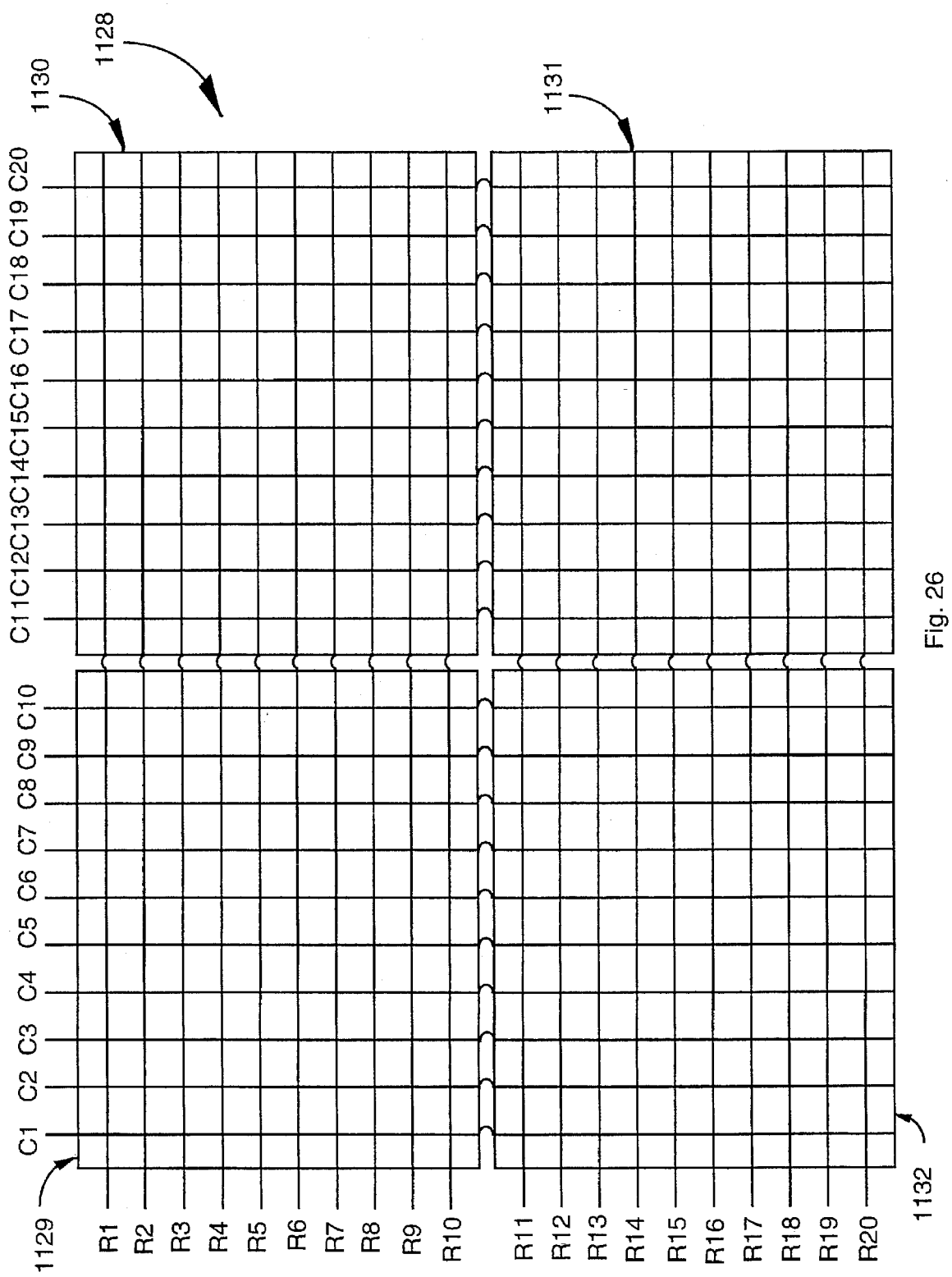
FIG. 26 is a plan view showing a connective scheme for driving a composite display made up of several displays according to the present invention.

FIG. 26 shows an exemplary composite display 1128 according to the present invention having four smaller rectangular display panels 1129, 1130, 1131, and 1132, each of which has 10 rows and 10 columns. The row traces of panels 1129 and 1130 and of panels 1132 and 1131 are connected together, and the column traces of panels 1129 and 1132 and of panels 1130 and 1131 are connected together, so the assembly of four panels may be controlled as though it were a single panel with twenty row traces R1–R20 and 20 column traces, C1–C20. In a like manner composite displays of greater extent may be constructed and operated as a single panel. Alternatively, separate panels may be separately driven, with each panel displaying a part of an overall image. It will be apparent to one with skill in the art that a limitation on the size of a single panel will not be a necessary limitation on the overall size of a display that may be constructed.

The color of a display according to the present invention is a function of the electroluminescent material that is used for the light-emitting structures. For example, zinc sulfide doped with manganese produces a yellow color. There are other material combinations for producing other colors, and the primary colors (red, green, and blue) can be produced in a display according to the invention.

Because of the high dot density capability for a display according to the present invention, and also because of the separate and electrically isolated nature of the individual light-emitting structures, a display according to the present invention can be constructed to produce images in color. The inherent ability to vary the intensity of the light by varying the voltage supplied also contributes to color generation, as well as gray scale display.

Figure 27:
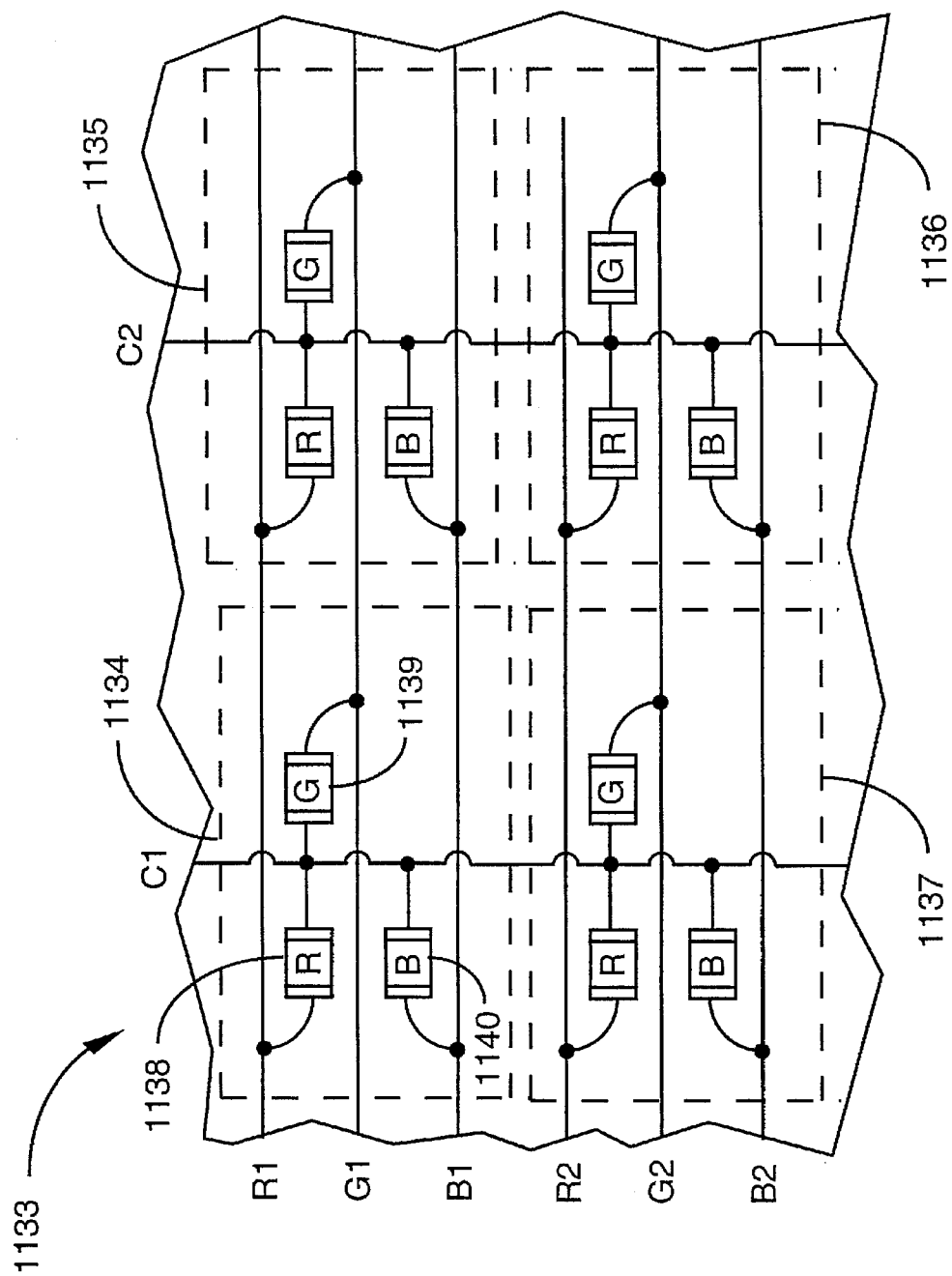
FIG. 27 is a plan view showing an arrangement of cells to provide a display in color according to the present invention.

FIG. 27 shows a plan view of a portion 1133 of a display panel according to the invention for producing images in color. Four distinct color groups 1134, 1135, 1136, and 1137 are shown, and each has three light-emitting cells, one red, one green, and one blue. For example, group 1134 has a light-emitting cell 1138 for red, a cell 1139 for green, and a cell 1140 for blue.

Each color group, such as group 1134, has three row traces for driving the three color component light-emitting cells in this example, one trace per cell. These are labeled R1, G1, and B1 for group 1134 and group 1135. Traces R2, G2, and B2 serve groups 1137 and 1136. The color component cells in each group have a common column trace. For example, trace C1 serves the cells in groups 1134 and 1137, and trace C2 serves the cells in groups 1135 and 1136.

As described above, the light-emitting structures of the invention may be driven at a much lower voltage than is necessary for a convention electroluminescent panel display. The reason is that the electrodes are not so far apart in the display of the invention as they are in conventional displays. The conventional panel requires from 150 to 200 volts, while the individual structures of the invention may be driven at about 20 volts. Moreover, varying the voltage varies the intensity of the light output. This phenomenon allows grey scale display for a single-color panel according to the present invention, and allows many colors to be displayed by varying the intensity of the red, green, and blue components of individual color groups.

There are a number of different ways that red, green, and blue light-emitting structures may be arranged to provide a color group, and a number of different routings for providing connective traces.

It will be apparent to one skilled in the art that there are a relatively large number of changes that may be made in the display embodiments described without departing from the spirit and scope of the present invention. Many alternatives have already been mentioned above. For example, the elements of a display according to embodiments of the present invention may be produced by thin film techniques and by thick film techniques, as described above, but there are other manufacturing techniques that may be used as well. As another example, displays may be produced according to the invention in a wide variety of sizes. Similarly, there are a wide variety of suitable materials for light-emitting structures and for other elements of displays according to embodiments of the invention. The base material can be silicon, for example, or glass, or even plastic materials. Such changes in detail are within the spirit and scope of the invention.

modular Portable Computer

FIG. 5 and accompanying description above relates a µPDA 10 according to an embodiment of the present invention to a docking port 105 (also docking bay) in a notebook computer 172. In that description port 105 is described as a PCMCIA-configured port. It is convenient, but not required, that the docking bay be designed for PCMCIA. Other designs may be useful in the invention as well. Moreover, such docking bays may be provided in computer equipment other than notebook computers as depicted in FIG. 5.

This section of the present disclosure, tilted "Modular Portable Computer" provides a more detailed description of notebook and palmtop computers as examples of hosts that may be configured for use with µPDAs according to the present invention. µPDAs according to the present invention may be function modules in various embodiments along with the function modules described in more detail below.

General Description

Figure 28A:
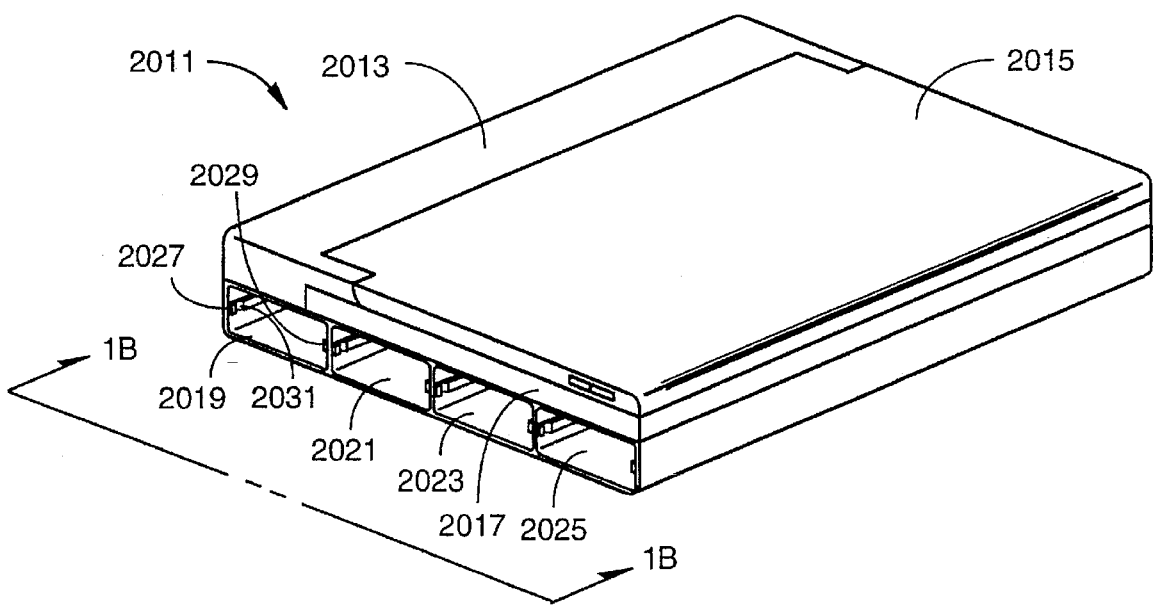
FIG. 28A is an isometric view of a modular notebook computer framework according to an embodiment of the present invention.

FIG. 28A is an isometric drawing of a notebook computer framework 2011 according to the invention. Framework 2011 comprises a back housing 2013, a tilt-up flat panel display 2015, shown closed, a keyboard 2017, and a plurality of module bays for plugging in function modules. Back housing 2013 includes a power unit for converting electrical input on a wide variety of standards to the form required by the computer. For example, there is a port (not shown) for connecting to a standard household outlet, rated at 120 V., 60 Hz, alternating current. The power unit will convert the input to outputs as needed by the computer bus and functional modules. There are also input ports for 6 V. DC, 12 V. DC, 9 V. DC, and others, and the power unit in one embodiment of the present invention is capable of recognizing the input characteristics by sampling, and switching to proper on-board circuitry to utilize the input.

In the embodiment shown by FIG. 28A four module bays 2019, 21, 23, and 25 are shown along one side of the framework. There are four more module bays along the other side of the framework opposite the module bays shown. There could be more or fewer module bays, but eight is convenient and a good balance between the need to stay small and simple, and to also have adequate versatility.

Figure 28B:
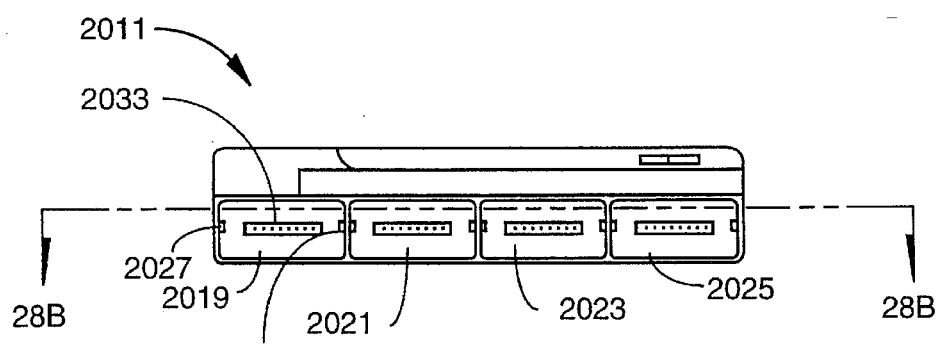
FIG. 28B is a view of the computer framework of FIG. 28A from one side from the vantage of line 28B—28B on FIG. 28A.

FIG. 28B is an end view of the notebook computer framework of FIG. 28A in the direction of arrows 28B—28B of FIG. 28A. Each of the module bays has a set of guide and positioning rails such as rails 2027 and 2029 in bay 2019. The rails are to position and guide a function module inserted into the module bay. Each rail in a set has a detent such as detent 2031 for latching a module when the module is fully inserted in the bay. Each bay also has a connector such as connector 2033 in bay 2019. The connectors are for coupling to a mating connector on a function module inserted in a bay. It will be apparent to a person with skill in the art that there are a number of equivalent ways guide rails, detents, and coupling may be accomplished.

Figure 29:
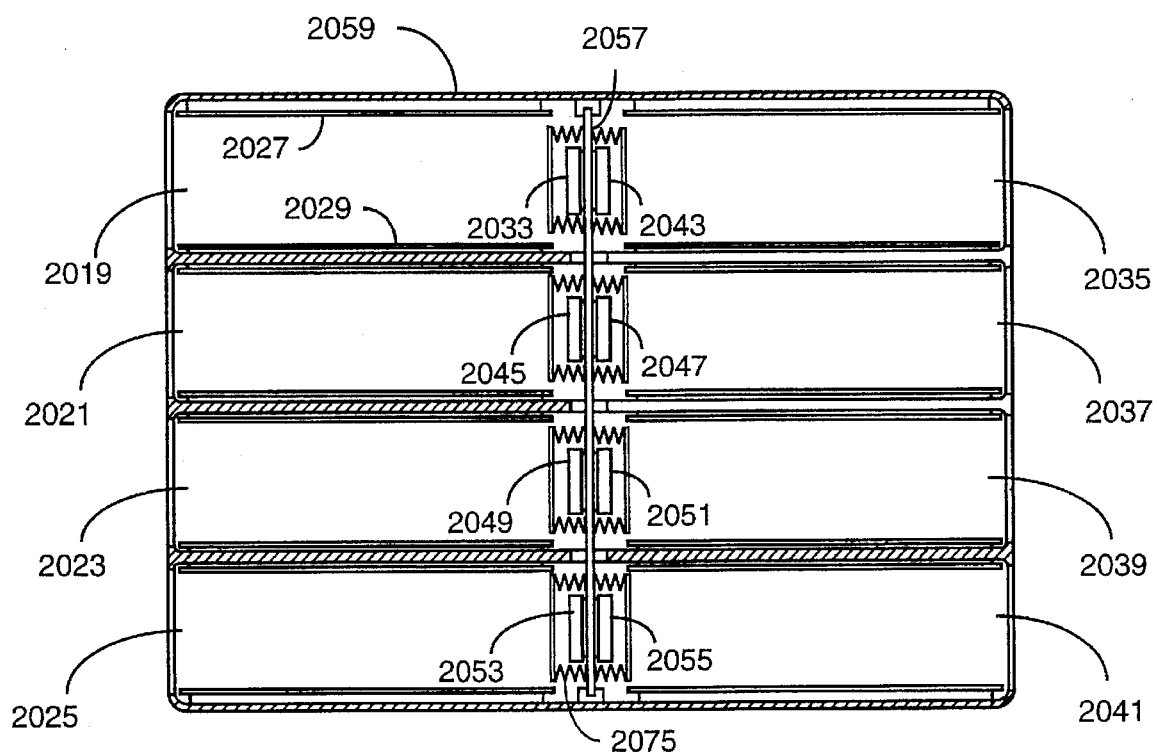
FIG. 29 is a sectioned plan view of the computer framework of FIG. 28A taken according to section line 29—29 of FIG. 28B.

FIG. 29 is a plan section view just above the module bays taken along section line 29—29 of FIG. 28B. Bays 2019, 2021, 2023, and 2025 are shown on one side of the section view, and bays 2035, 2037, 2039, and 2041 along the opposite side. A printed circuit board structure 2057 is fastened in a substantially vertical position down the center of frame 2059, and connectors 2033, 2043, 2045, 2047, 2049, 2051, 2053, and 2055 are connected to the printed circuit board structure and present their pin structure outward toward the respective bay areas. In the presently described embodiment the internal connectors are male connectors, but this is not a requirement of the invention.

As also shown in FIG. 28A, each module bay has a pair of opposed rails located vertically at about the midpoint of the height of the module bay. Rails 2027 and 2029 serve module bay 2019, and similar rails are located in each of the other module bays.

Figure 30:
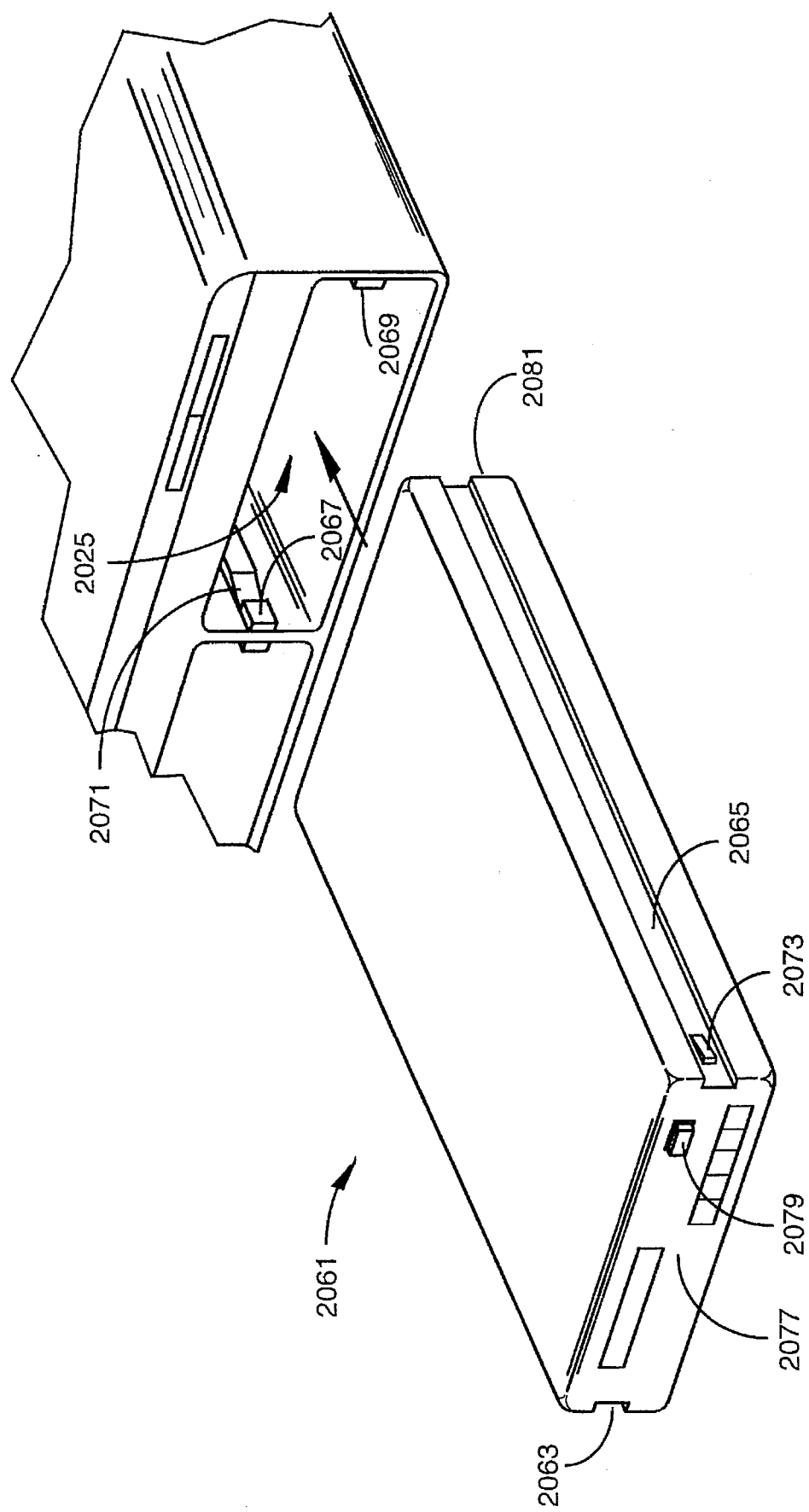
FIG. 30 is an isometric illustration showing a function module according to the present invention associated with a docking bay of the framework of FIG. 28A.

FIG. 30 is an isometric view of a function module 2061 according to the invention aligned with module bay 2025 of framework 2011. Module 2061 includes guides 2063 and 2065 on opposite sides for engaging rails 2067 and 2069 when module 2061 is inserted into bay 2025. The module has two spring-loaded detent levers (lever 2073 is shown) for engaging detents in guide rails 2067 and 2069 when the module is fully inserted. Detent 2071 is shown in rail 2067 in FIG. 30.

Each module bay has a compression spring mechanism engaged by a function module as the module nears full insertion, so there is an outward force on the module when the detent levers engage the detents. Mechanism 2075 (FIG. 29) is exemplary. To insert a module one aligns the guides in the module with the guide rails and pushes the module into the module bay until the detents engage. Button 2079 on front face 2077 of the module is for retracting the detent levers of the module, in which case the spring mechanism ejects the module, much as is the case with some floppy disk drives.

Figure 31:
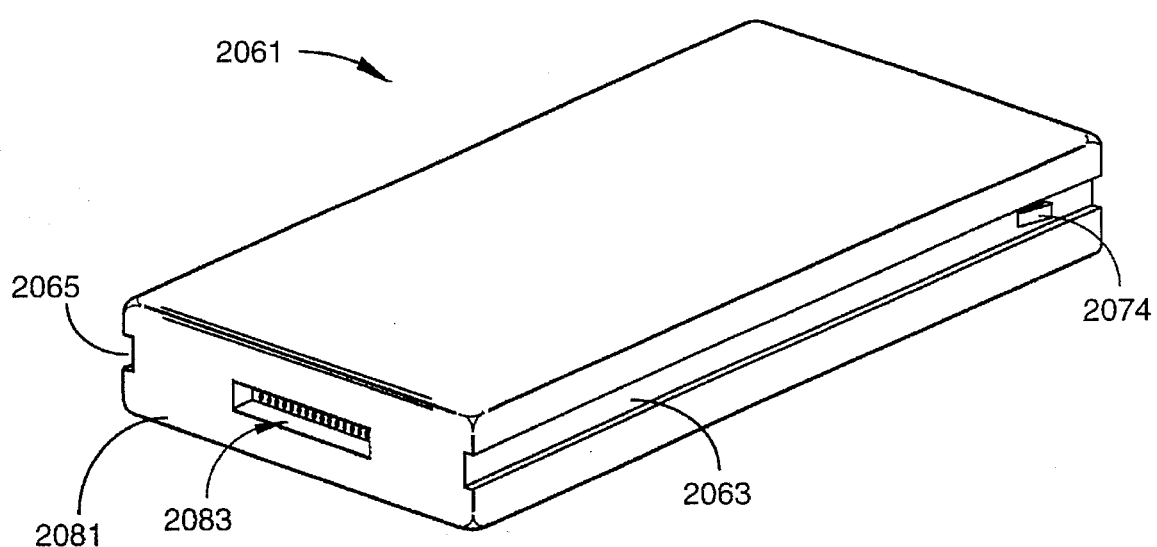
FIG. 31 is another view of a function module according to the present invention.

FIG. 31 is an isometric view of function module 2061, showing back face 2081 opposite front face 2077. The back face includes a recessed female connector receptacle 2083 in the preferred embodiment, for mating with male connectors positioned in each pod bay, such as connector 2033 in FIG. 28B and FIG. 29. A second detent lever 2074 is opposite lever 2073 of FIG. 30.

In the embodiment described above, and in many other embodiments, the notebook computer framework of the present invention comprises a frame with module bays and connectors as described above for "plugging in" function modules, power supply units, and other peripheral devices. The framework also comprises display 2015, keyboard 2017, and an internal bus structure hereinafter termed the Notebus, which is described in additional detail below, in the section titled "Notebus Bus Structure".

The function modules, as represented by module 2061 in FIG. 30 and FIG. 31, are provided in a wide variety of different models capable of a wide variety of different functions. For example, framework 2011 has no "on-board" CPU, battery power, or system memory. These functions and all other functions are provided by different models of function modules which may be inserted in any one or a combination of the available module bays. Other kinds of function modules that may be inserted include floppy-disk drives, hard-disk drives, "flashcard" memory modules, LAN and modem adapters, Fax modules, specialty modules such as data acquisition modules adapted to specific equipment, and more. The function modules are also described in more detail in the section below titled "Function Modules".

Electronic Architecture

Figure 32:
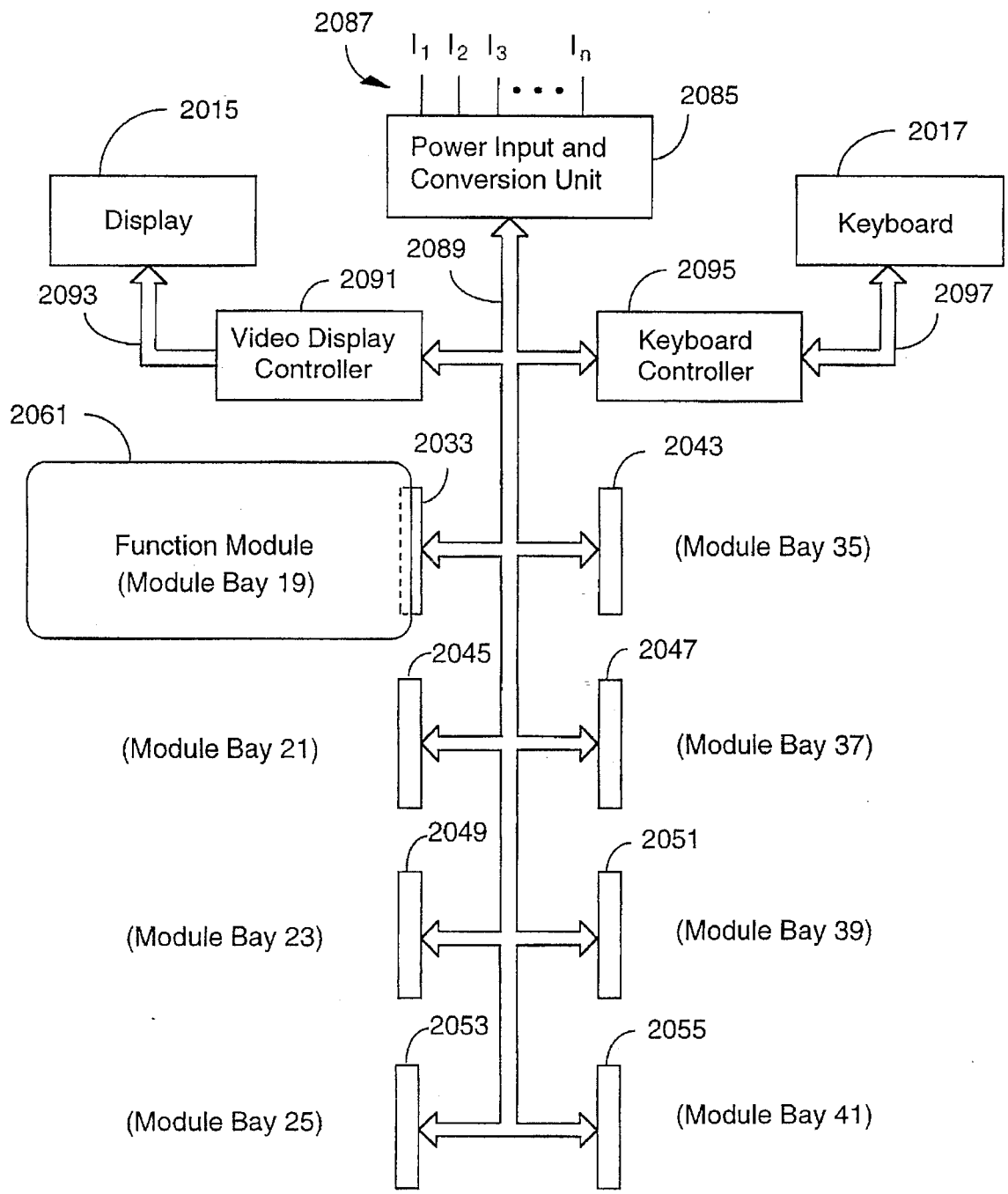
FIG. 32 is a block diagram of a compressed bus and connection to docking bays in a computer framework according to an embodiment of the present invention.

FIG. 32 is a block diagram showing internal elements of Notebook computer framework 2011, connected to show the electronic architecture of the notebook computer according to the invention. Power input and conversion unit 2085 is housed in back housing 2013 (FIG. 28A) and has ports 2087 for power inputs. Unit 2085 senses the input conditions and selects appropriate circuitry to convert the input to the voltages needed to power the other elements of the system. Output from the conversion unit is to Notebus 2089, which comprises paths for power as well as for digital information such as data and addresses.

Because there are a wide variety of function modules, as indicated above and described in more detail below, there needs typically to be more than one power line in the Notebus. For example, the notebook computer of the invention comprises hard disk drive modules, and these modules are preferably provided without their own "on board" power source. The motor drive for the hard disk requires a different power (voltage and current) than does a CPU, for example, so there are parallel power lines of differing size and voltage level in the notebus. A typical Notebus will have, for example, a line for 24 V DC, another for 12 V DC, and yet another for 5 V DC, as well as multiple ground lines.

Notebus 2089 connects to a video display controller 2091 including Video Random Access Memory (VRAM) which both powers and controls display 2015, which in the preferred embodiment is a flat panel display driven by analog driver lines on analog bus 2093. Notebus 2089 also connects to a keyboard controller 2095 which powers and controls keyboard 2017 over link 2097, accepting keystroke input and converting the input to digital data for transmission on Notebus 2089. The keyboard controller may be physically mounted in the keyboard or in framework 2011.

Notebus 2089 also connects as illustrated in FIG. 32 to each of the module bays, such as bay 2019, through connectors, such as connector 2033. When a function module, such as module 2061, is inserted into a module bay, the mating connector in the back of the function module mates with the connector from the Notebus, and circuitry inside the function module is then connected to the Notebus.

Notebus Bus Structure

The Notebus comprises, as stated above, both power and data paths. The digital lines are capable of carrying 2032 addresses and conveying data in 32 bit word length. To minimize pin count and routing complexity, addresses and data are multiplexed on a single set of 32 traces in the overall bus structure. One with skill in the art will recognize that this type of bus is what is known in the art as a low-pin-count or compressed bus. In this kind of bus different types of signals, such as address and data signals, share signal paths through multiplexing. For example, the same set of data lines are used to carry both 32-bit addresses and data words of 32-bit length.

In the Notebus of the present invention, some control signals, such as interrupt arbitration signals, may also share the data lines. Typical examples of buses that are exemplary as usable for the Notebus (with the exception of power supply analog lines in the Notebus) are the "S-Bus" implemented by Sun Microsystems, the "Turbochannel" Bus from Digital Equipment Corporation, and buses compatible with the IEEE-488 standard.

The Notebus is a high-speed backplane bus for interconnecting processor, memory and peripheral device modules. The Notebus also supplies standard operating and standby power supply voltages and electrical ground to all module bays.

Function Modules

FIG. 30 and FIG. 31 show, as described above, two different views of a function module according to the present invention. Also as stated above, function modules may have many different functions. There are as many different functions, in fact, as there are possibilities for discrete peripheral devices, plus power and CPU modules. An individual function module is provided for each function, and in each case the function module has a physical size and form compatible with the bays, guide rails, and connectors for "plugging in" to framework 2011.

The "face" of a function module, being the exposed face when the module is "plugged in" (see face 2077 in FIG. 30) may have elements specific to the type of module. For example, a CPU module may have no indicators or other elements on the front face, while a floppy disc module will typically have an opening for inserting a floppy disk and a "key" or button for releasing and ejecting the floppy disk.

A unique feature of the present invention is that the CPU for the notebook computer is provided as a CPU function module. This provides an ability for a user to tailor the CPU power to the other modules and application for the notebook computer, and an easy upgrade to more powerful CPUs.

Figure 33:
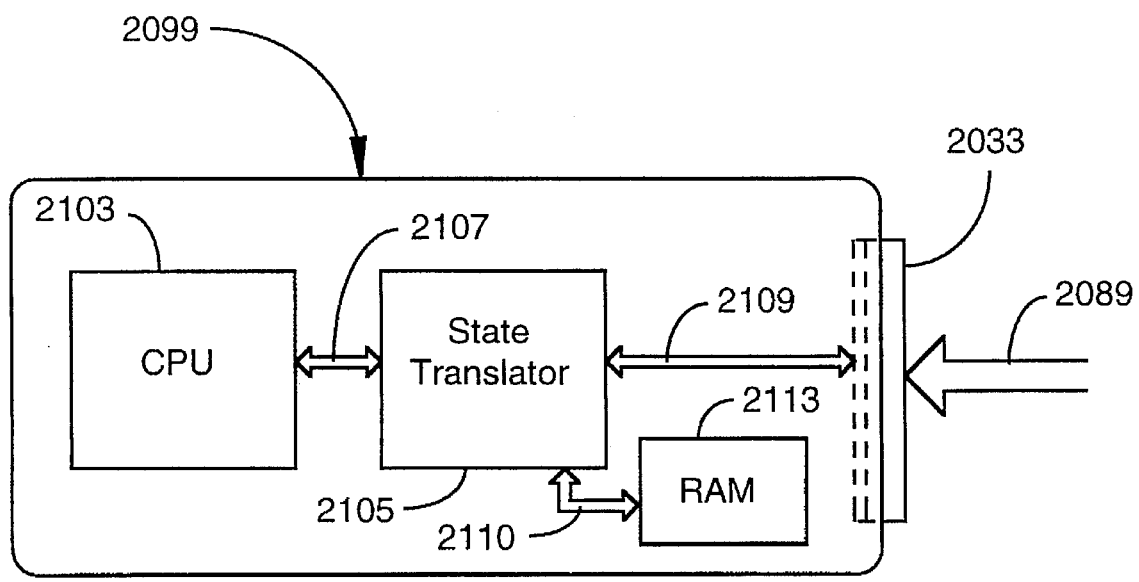
FIG. 33 is a block diagram of a CPU function module according to an embodiment of the present invention.

FIG. 33 is a diagram of a CPU module 2099 plugged into a bay in a notebook computer according to the present invention. In this case (referring to FIG. 29) the module is plugged into bay 2019 having connector 2033. This is exemplary, as the module could just as well be plugged into any open bay of framework 2011. By virtue of being plugged into connector 2033 or another module connector, internal elements of the CPU module are connected to Notebus 2089.

The internal elements for module 2099 comprise CPU 2103, a state translator 2105, and RAM memory 2113. CPU 2103 may be any of a wide variety of CPUs (also called in some cases MPUs) available in the art, for example Intel 80386 or 80486 models, MIPS, RISC implementations, and many others. CPU 2103 communicates with State Translator 2105 over paths 2107, and State Translator 2105 communicates with connector 2033, hence Notebus 2089, over bus 2109 internal to the module, which is an extension of bus 2089 when the module is plugged into bus 2089.

State translator 2105 is a chip or chip set designed to translate commands and requests of the CPU to commands and requests compatible with the Notebus. It was mentioned above that CPU 2103 may be one of a wide variety of CPUs, and that Notebus 2089 may be any one of a wide variety of compressed buses. It will be apparent to one with skill in the art that there may be an even wider variety of state translators 2105 for translating between the CPU and the Notebus. The state translator is theoretically a different device for each possible combination of CPU and Notebus.

RAM memory module 2113 comprises conventional RAM chips mounted on a PCB as is known in the art, and connectable to state translator 2105 by a plug or connector interface, such as an edge connector. The purpose of having a RAM module "on board" the CPU module is to provide for rapid memory access, which will be much slower if the RAM is made available in a separate module at one of the other module bays. Memory at another module bay is on the Notebus, and will be subject to bus contention and wait states. The plug-in nature of the RAM unit relative to the CPU module allows different amounts of memory to be provided with a CPU module in the notebook computer of the present invention.

As described above, Notebus 2089 comprises not only the shared data and address lines, but also power and ground connections for the modules plugged into the various bays. Paths 2109 and 2107 therefore comprise power and ground lines for CPU 2103 and Translator 2105.

If, for example, CPU 2103 is an INTEL 80486 microprocessor, State Translator 2105 will be a translator for accommodating the state machine of the 80486 to the state machine of the Notebus, which may be any one of the buses described above for bus 2089, or another compressed bus. There are many equivalent ways a translator may be implemented for the specific case. Given the manufacturers available design information for the CPU and the equivalent information for bus 2089, it is within the skill of workers in the art without undue experimentation to implement the translator and the required connections. This is conventional technology. The implementation of the translator on a module with a CPU to plug into a module bay in the notebook computer is unique to the present invention.

In the invention, state translators may be implemented in a single chip set or circuitry set to be capable of translating between a number of CPUs and a number of different bus possibilities. One might, for example, design and implement a translator with the necessary circuitry and intelligence to translate between three different CPUs and three different compressed buses. The state translator could be made hardware or software programmable to select one CPU and one bus from the available selections at some convenient time in the manufacturing cycle, or even at the time of selection of modules to make up a notebook computer.

As an example of a hardware programmable translator, a translator could be built to have certain traces cut as a near final step in manufacture as a way of selecting the CPU and bus pair. Translators could also be programmable by virtue of on-board EPROM or EEPROM devices. As an example of software programmability, translators could be implemented with microprocessor technology and software programmable. A CPU module could be plugged into a connector on a special programming unit, for example, before installation in a notebook computer according to the present invention, and be sent certain commands to set up on board software to translate between the desired CPU and bus. It will be apparent to one with skill in the art that there are many possible variations in the implementation of the translators.

Figure 34:
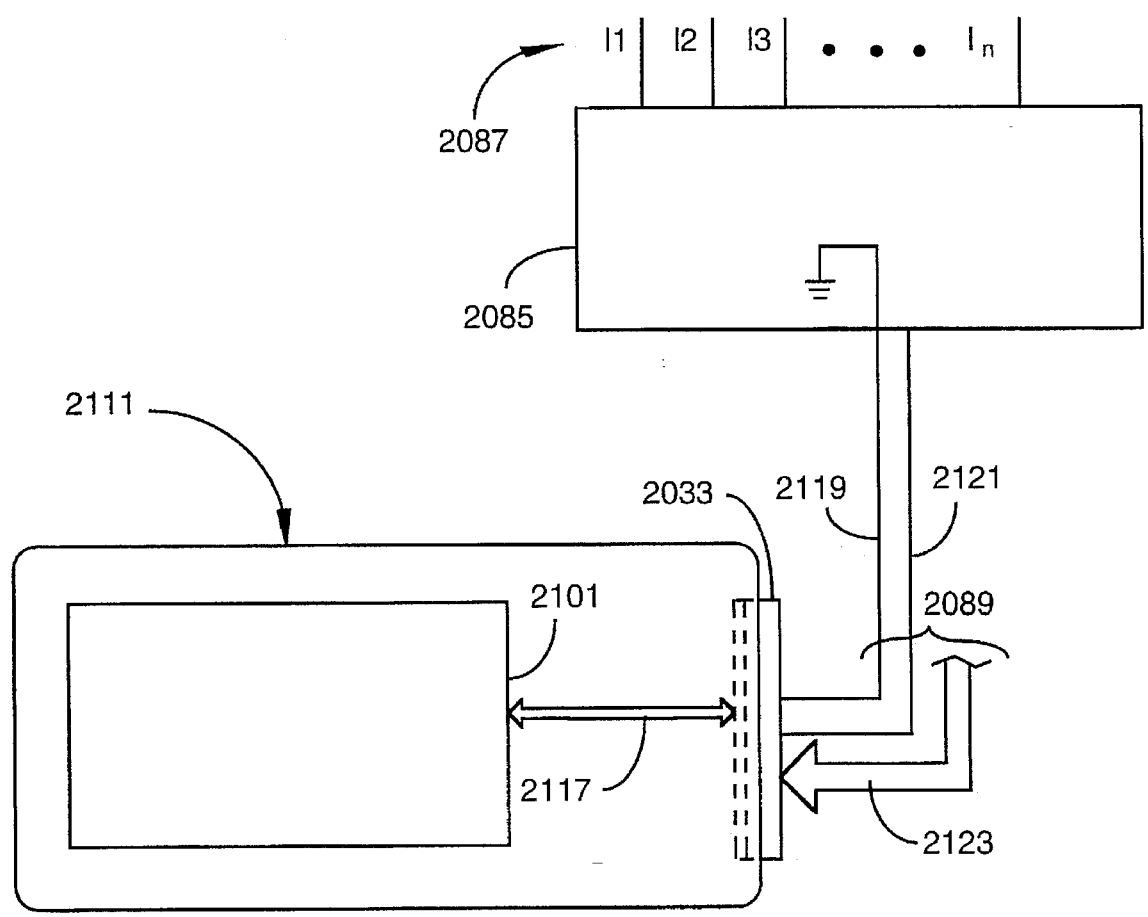
FIG. 34 is a block diagram of a power supply function module according to an embodiment of the present invention, with indication of connections to the internal bus structure and power conversion unit of the computer.

FIG. 34 shows a power module 2111 plugged into a bay in the notebook computer according to an embodiment of the present invention. The purpose of a power module is to provide a source of power for the computer, which includes any modules plugged into the module bays. As is common in notebook computers in the art, there may be a battery, typically rechargeable, in framework 2011, and the battery may also be replaceable and rechargeable through power input lines 2087. In the case of an on-board battery pack, there is the option of using all module bays for other than power packs.

Preferably framework 2011, sans function modules, has no power capability other than power plugged into one of input lines 2087, which may be converted to the power characteristics needed by the computer and distributed on the power lines of the Notebus. For portability, power is typically supplied by one (or more) power modules 2111 plugged into one or more of the module bays.

Module 2111 has a battery pack 2101 which is connected via lines 2117 to (in this case for example) connector 2033, and hence to Notebus 2089. Because there are several supply lines in the Notebus for supplying power to function modules at different voltage and with different current capability, the power lines in the Notebus for connecting a power module 2111 are not the same as the lines for supplying power to a module. There is instead a separate sat of power lines to pins on the module bay connectors, such as connector 2033, which connect as input to power input and conversion unit 2085, much as do input ports 2087.

In FIG. 34, lines 2119 and 2121 connect power module 2011 to conversion unit 2085, where the power input from the power module is sensed and treated as a power source, much as is done for power input lines 2087. This power is converted to the needed voltages and current capabilities, and put back out on the power supply output lines to the module bays. In FIG. 34 line 2119 is ground, and arrow 2123 represents all of the data/address, control, and power output lines to the module bays. Lines represented by arrow 2123, plus lines 2119 and 2121 are Notebus 2089. Although not shown in FIG. 34, there are connections for line 2119 and for line 2121 to each of the module bay connectors.

Power modules such as module 2111 may be plugged into a connector on a charging module separate from the notebook computer, using the same connector used for plugging into the Notebus via a module bay of framework 2011, and recharged for later use with a modular notebook computer according to the invention. This allows a user to keep spare power modules ready for use, and to recharge modules without connecting the computer itself to a charging unit. Moreover, the provision of power modules allows a user to provide more or less portable time to the notebook computer by using one or more than one power module.

Figure 35:
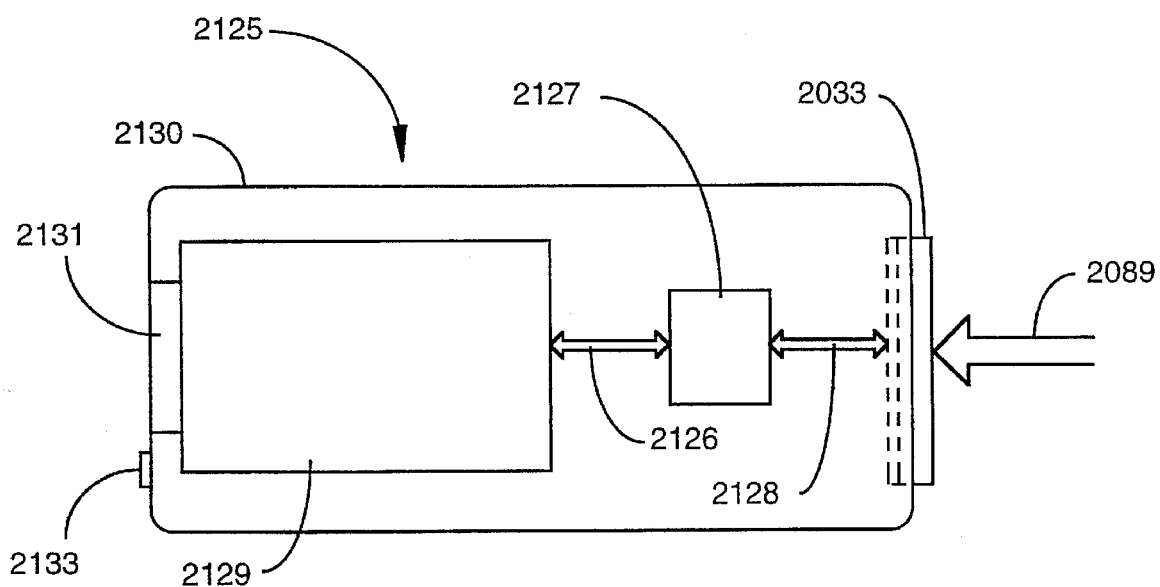
FIG. 35 is a block diagram of a floppy disk drive function module used in the invention.

FIG. 35 shows a floppy disk drive (FDD) module 2125 plugged into a module bay in a notebook computer according to an embodiment of the present invention. Module 2125 comprises a conventional FDD unit 2129 for nominal 3.5 inch disks with conventional circuitry mounted in a case 2130 to provide a module with guides, latches, and a connector matable with connector 2035 to be able to plug into a module bay in the notebook computer of the present invention. The case comprises an opening 2131 for inserting and withdrawing a floppy disk, and an eject button 2133 for ejecting a floppy disk.

A controller 2127 communicates with unit 2129 over lines 2126 and with connector 2033 (hence Notebus 2089) over lines 2128. The unit also derives power from the appropriate pins on connector 2033, but these pins and lines are not shown. Controller 2127 is an ASIC chip or chip set for translating between the notebus and the FDD unit. Given the data storage standards of the FDD unit and the characteristics of bus 2089, it is within the scope of workers with ordinary skill in the art to implement controller 2127 without undo experimentation.

Figure 36:
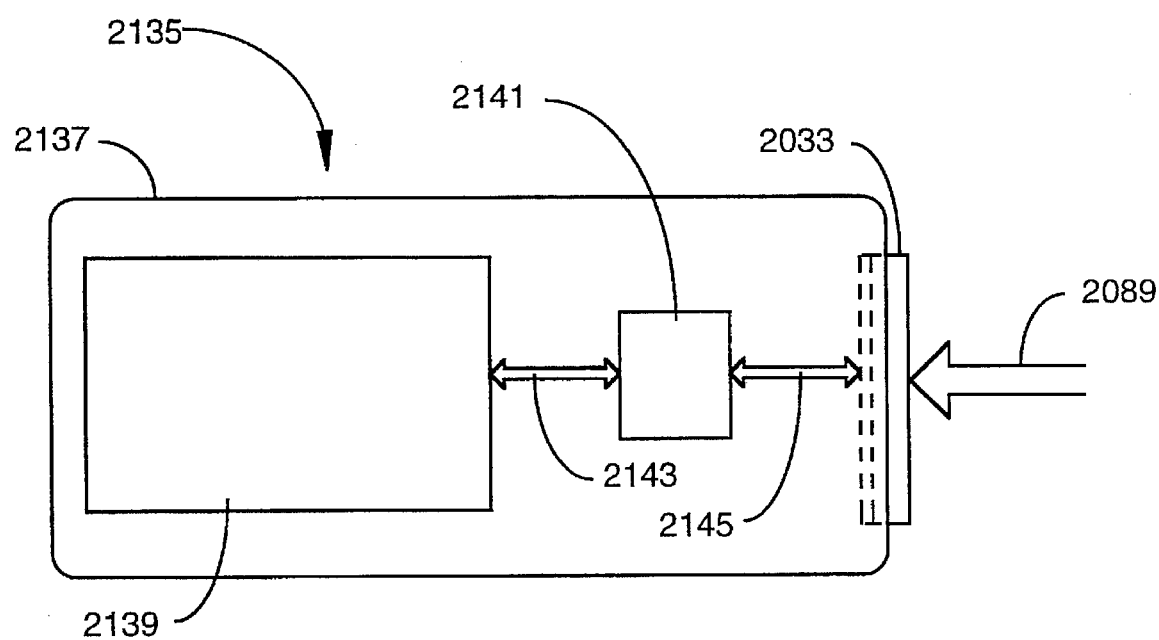
FIG. 36 is a block diagram of a hard disk drive module used in an embodiment of the invention.

FIG. 36 shows a hard disk drive (HDD) module 2135 according to an embodiment of the present invention plugged into bus 2089 in a module bay of framework 2011. HDD module 2135 comprises a conventional HDD unit 2139 mounted in a case 2137 to be compatible with plugging into a notebook computer according to the present invention. As in the case of the FDD module described above, a controller 2141 is provided to translate between Notebus 2089 and the HDD unit. Controller 2141 communicates with HDD unit 2139 over lines 2143, and with connector 2033 over lines 2145. Connector 2033 is exemplary of any one of the module connectors in the notebook computer.

Given the characteristics of HDD unit 2139 and of Notebus 2089, it is within the skill of workers in the art to implement controller 2141 without undue experimentation. Power line connections are not shown. In implementing controller 2141 there are several protocols that may be used. One is the ST506 standard known in the art. Another is the IDE standard known in the art. Yet another is an enhanced IDE, called EIDE, known to the inventors, and the subject of a separate patent application to be filed. In the EIDE protocol, there may be multiple IDE devices daisy-chained and addressed as secondary IDE devices with an additional select number.

Figure 37:
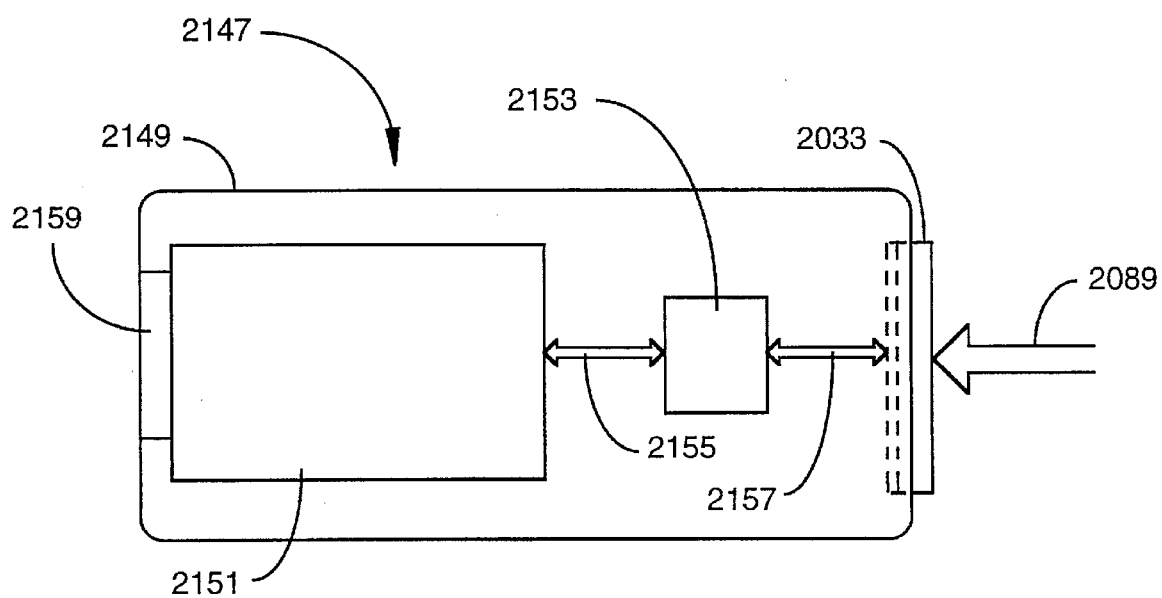
FIG. 37 is a block diagram of a "flash card" memory module according to an embodiment of the present invention.

FIG. 37 shows a "flash card" memory module 2147 plugged into connector 2033 of the notebook computer of the invention. "Flash cards" are RAM memory cards known in the art pluggable into typically parallel ports to make connection with internal bus structures of a computer. Module 2147 comprises a conventional "flash card" 2151 mounted in a case 2149 compatible with the module bay of a notebook computer according to the present invention.

As in cases described above, a controller 2153 is needed to accomplish communication between the memory structure of the "flash card" and bus 2089. Controller 2153 communicates with "flash card" unit 2151 over lines 2155 and with connector 2033 over lines 2157. There may optionally be an opening 2159 in case 2149 and a connector (not shown) within unit 2151 for inserting and withdrawing flash cards, so relatively large collections of data may be plugged in as desired. Alternatively the interface may be the modular interface afforded by the plug-in module 2147. Again, given the known characteristics of the flash card and of bus 2089, implementation of the controller is a matter within the skill of workers in the art.

Figure 38:
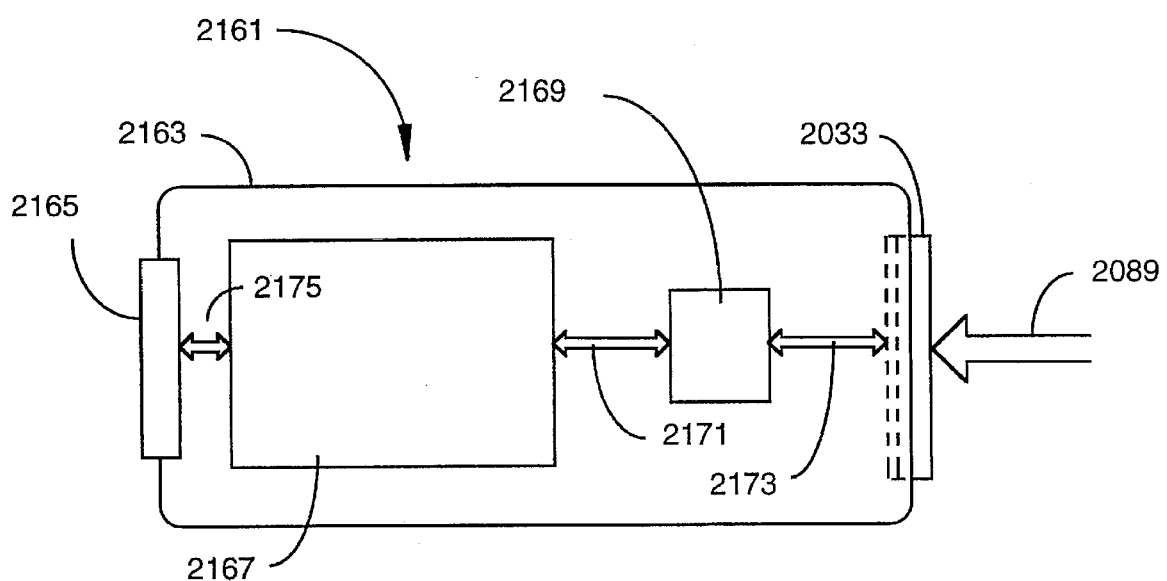
FIG. 38 is a block diagram of a LAN module according to an embodiment of the present invention.

FIG. 38 shows a LAN module 2161 plugged into connector 2033 of a notebook computer according to an embodiment of the present invention. In the embodiment shown in FIG. 38 a conventional LAN card, such as an Ethernet card, is mounted in a case 2163 to be compatible with plugging into a module bay of a notebook computer according to an embodiment of the present invention.

LAN card 2167 communicates with a conventional connector 2165 in the face of the case of module 2161 that is exposed when the module is plugged into a bay. This is a conventional connector of the sort known in the art for connecting computers on a network.

Within module 2161, in a first alternative, conventional LAN card 2167 interfaces to a controller 2169 communicating over lines 2171 and 2173, and the controller translates between bus 2089 and the conventional LAN card. In a second alternatives a LAN card is provided with the translation built in, so no separate controller is needed. The first alternative is preferable.

Figure 39:
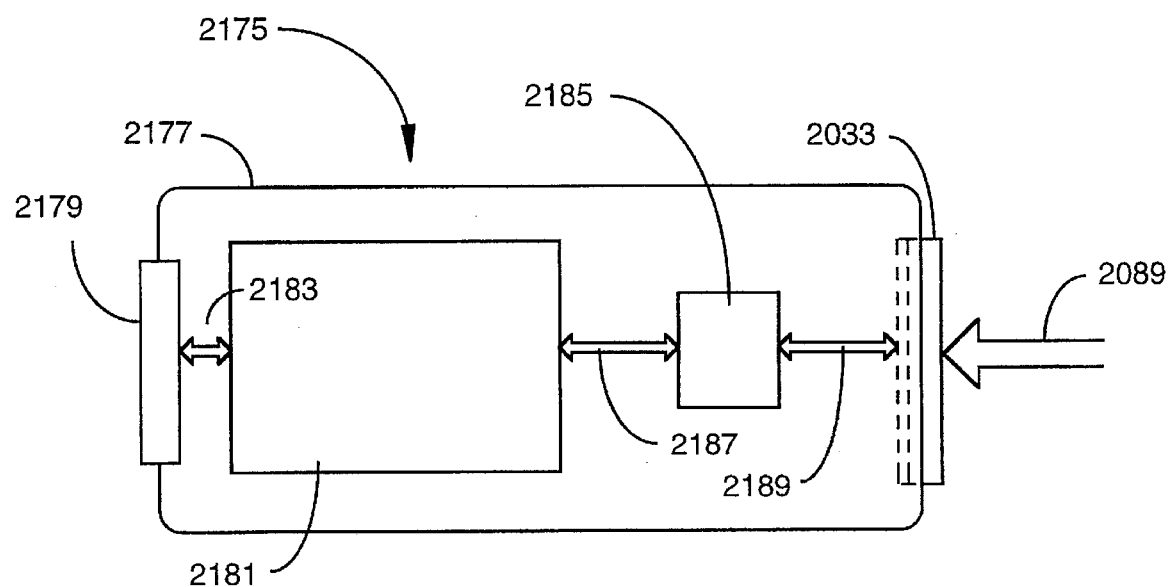
FIG. 39 is a block diagram of a modem module according to an embodiment of the present invention.

FIG. 39 shows a modem module 2175 plugged into connector 2033 in a bay of a notebook computer according to an embodiment of the present invention. Modem module 2175 comprises a conventional modem card 2181 mounted in a case 2177 to be compatible with plugging into a module bay. In this case, and other cases above, where the term "conventional" is used in conjunction with a card or units it is meant that the circuitry and function is conventional. The size may be adjusted to be compatible with a module case for plugging into a bay of a notebook computer according to the present invention.

Modem card 2181 connects over lines 2183 to a telephone interface 2179, which may comprise more than one "jack" so a hand set may also be connected. Card 2181 communicates to Notebus 2089 over lines 2187 and 2189 through controller 2185, which translates between the conventional card and the compressed bus. Alternatively, the translation components may be implemented on a single card along with the modem circuitry.

Figure 40:
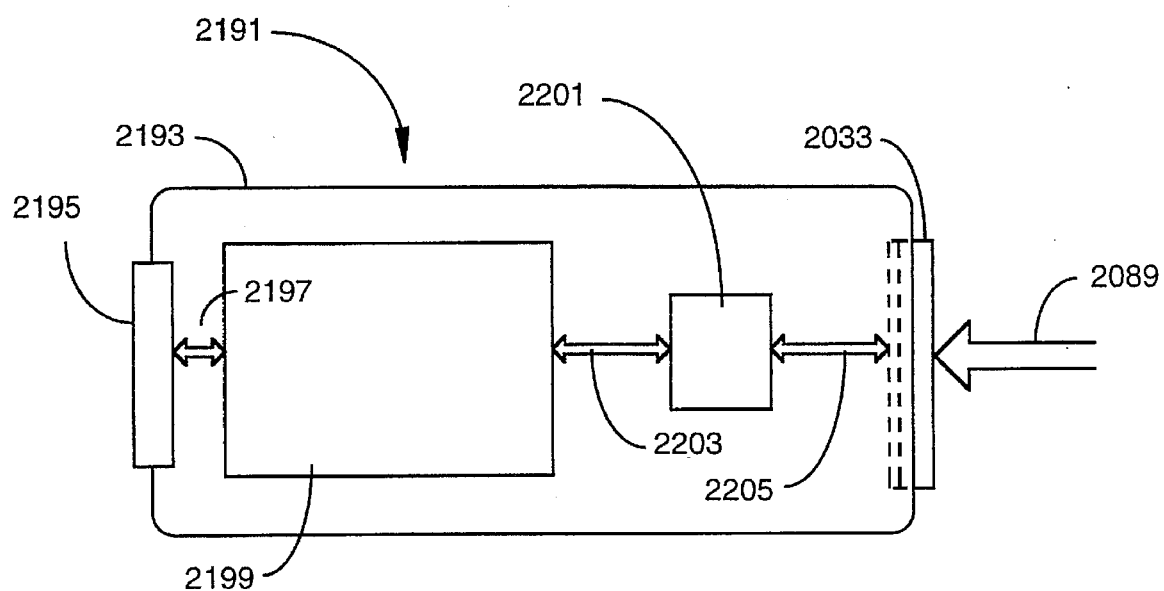
FIG. 40 is a block diagram of a FAX module according to an embodiment of the present invention.

FIG. 40 shows a FAX module 2191 plugged into connector 2033 of a module bay in an embodiment of the present invention. Module 2191 comprises a conventional FAX card 2199 mounted in a case 2193 to be compatible with plugging into a module bay in the present invention. Fax card 2199 communicates over lines 2197 with a telephone interface 2195, which may, as in the case of the modem module described above, have more than a single telephone "jack".

A controller 2201 provides an interface for the conventional FAX card between the card and Notebus 2089 over lines 2203 and 2205. Alternatively, the controller may be implemented on the same card as the FAX circuitry. In yet another alternative, the FAX capability and the modem capability described above may be implemented into a single module.

Figure 41:
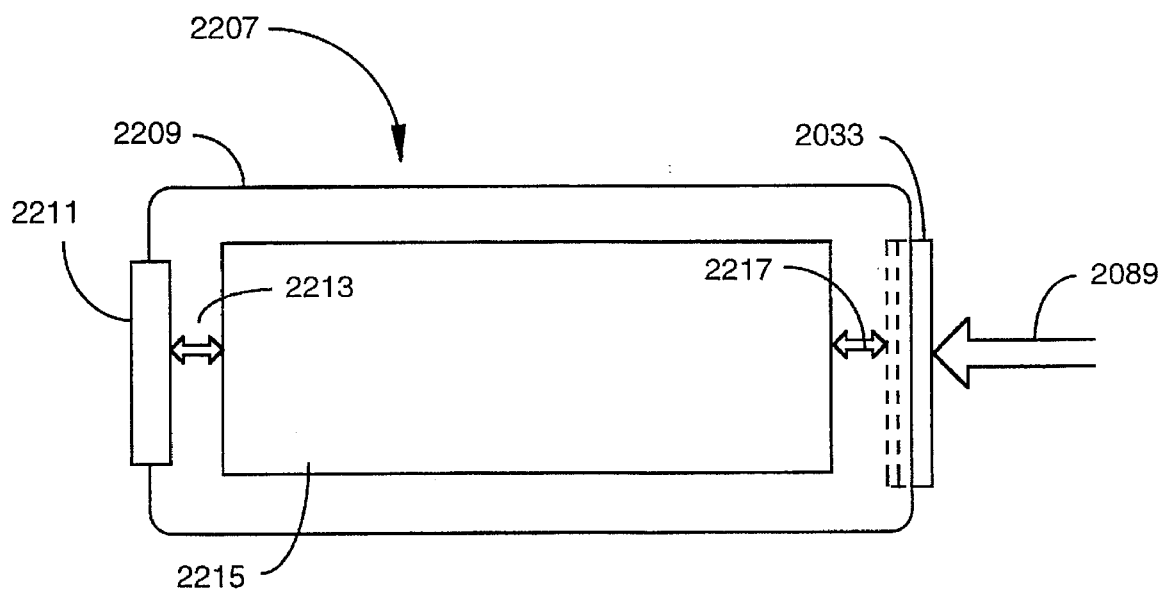
FIG. 41 is a block diagram of a data acquisition module according to an embodiment of the present invention.

FIG. 41 shows a specialty data acquisition module 2207 plugged into connector 2033 in a module bay in a notebook computer according to an embodiment of the present invention. Module 2207 comprises a circuit card 2215 mounted in a case 2209 to be compatible with plugging into a module bay. Card 2215 communicates over lines 2213 to an interface 2211 which may comprise one or several acquisition leads for connecting to outside equipment. For example, a data module may be provided for following the output of the vertical and horizontal sweep of an oscilloscope, and would have at least two input leads; one for the vertical and one for the horizontal sweep.

Card 2215 communicates over lines 2217 to connector 2033, hence Notebus 2089. The circuitry on card 2215 is designed to digitize the input if the input is analog, and to be compatible with Notebus 2089. Given the characteristics of signals to be measured and the characteristics of Notebus 2089, implementation of such a card is within the ordinary skill in the art.

The embodiments of the present invention described above relate primarily to notebook type computers. However, the invention has broader applications. The principles of the invention are also applicable to portable computers known as palmtop computers, and further embodiments are described below.

Figure 42A:
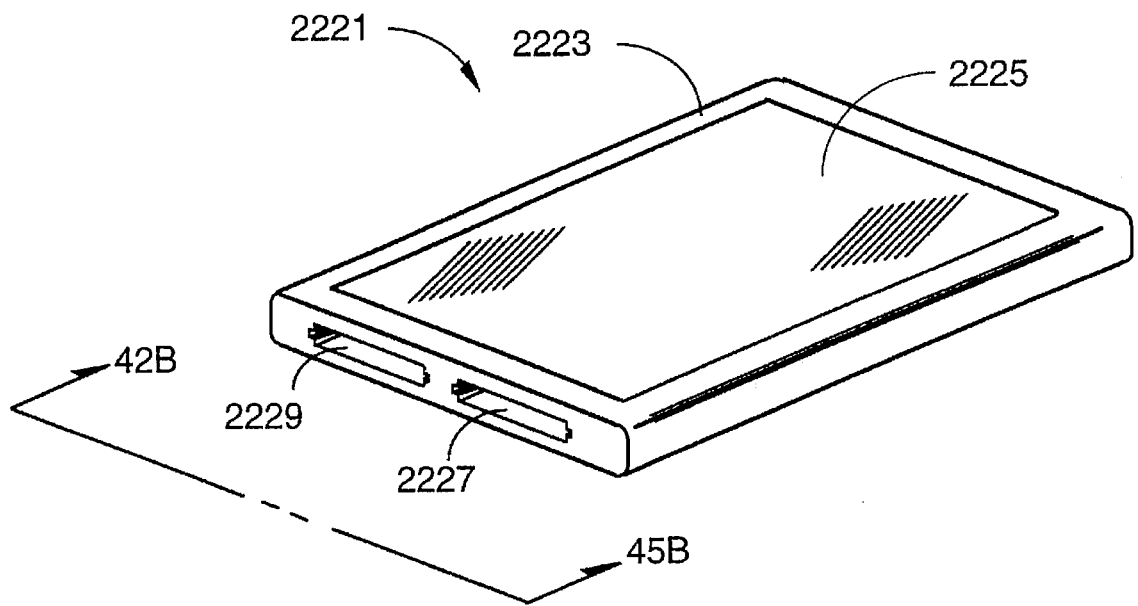
FIG. 42A is an isometric view of a modular palmtop computer framework according to an embodiment of the present invention.

FIG. 42A is an isometric view of a modular palmtop computer 2221 according to an embodiment of the invention. Computer 2221 is approximately the size of one-half a standard piece of paper (approximately 5.5 inches by 8.5 inches) and in a preferred embodiment comprises a planar array of four Personal Computer Memory Card International Association (PCMCIA) Type II module bays in a case 2223.

In this embodiment case 2223 has a combination I/O area 2225 implemented on one side of computer 2221, comprising a display overlaid with a touch sensitive planar structure. In other embodiments, the display may be a flat-panel display pivoted to the case, or a separate monitor in communication with case 2223. The touch screen provides a "softkey" operation in conjunction with interactive control logic. In a preferred embodiment of the invention, the control logic resides in static or dynamic memory within case 2223 but may also be part of an installed PCMCIA-type peripheral. A power unit (not shown) is enclosed within case 2223 for converting electrical input on a wide variety of standards to the form required by the computer. For example, there is a port (not shown) for connecting to a standard household outlet, rated at 120 V., 60 Hz, alternating current. The power unit converts the input to outputs as needed by the computer bus and function modules. There are also input ports for 6 V. DC, 12 V. DC, 9 V. DC, and others, and the power unit in one embodiment of the present invention is capable of recognizing the input characteristics by sampling, and switching to proper onboard circuitry to utilize the input.

In the embodiment of the invention shown by FIG. 42A, two module bays 2227 and 2229 are provided on one side of case 2223. There are two more module bays along the other side of the case opposite the module bays shown. In other embodiments bays may open to other edges of the case. The configuration provides a good balance between the need to stay small and simple, and to also have adequate versatility. In alternative embodiments other module configurations may be used, such as PCMCIA Type III, and others. In the alternative configurations the arrangement of the planar array of modules may vary as well.

Figure 42B:
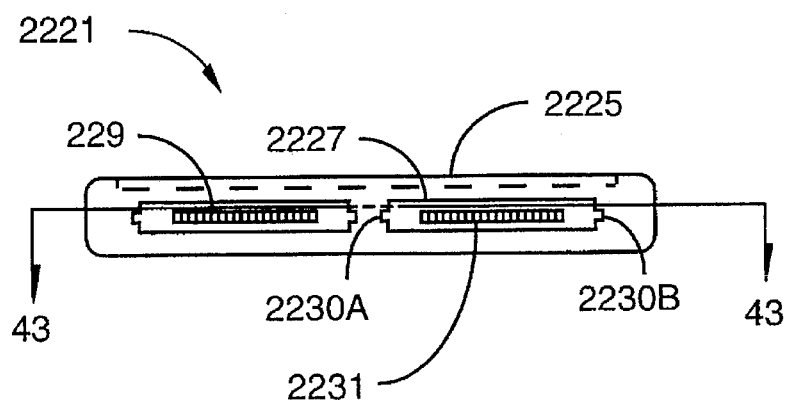
FIG. 42B is a view of the computer framework of FIG. 42A from one side from the vantage of line 42B—42B on FIG. 42A.

FIG. 42B is a view of computer 2221 in the direction of arrows 42B—42B of FIG. 42A. I/O area 2225 is located on top of case 2223. Module bay 2227 has a set of guide slots 2230A and 2230B. The guide slots are to position and guide a PCMCIA module card inserted into the module bay. Each module bay in this embodiment is configured to PCMCIA dimensional and connective standards and secures the fitted PCMCIA cards according to those standards. In this embodiment of the present invention, case 2223 has bays configured to PCMCIA type 2, revision B standard. In another embodiment of the invention, the case may have other types of PCMCIA module bays, or bays configured to one or another proprietary standard.

Each module bay has a bus connector, such as connector 2231. In this embodiment, connector 2231 is a standard PCMCIA connector that accepts PCMCIA cards and is electrically connected to the palmtop's internal bus. It will be apparent to those with skill in the art that there are a number of equivalent ways to connect a function module.

Figure 43:
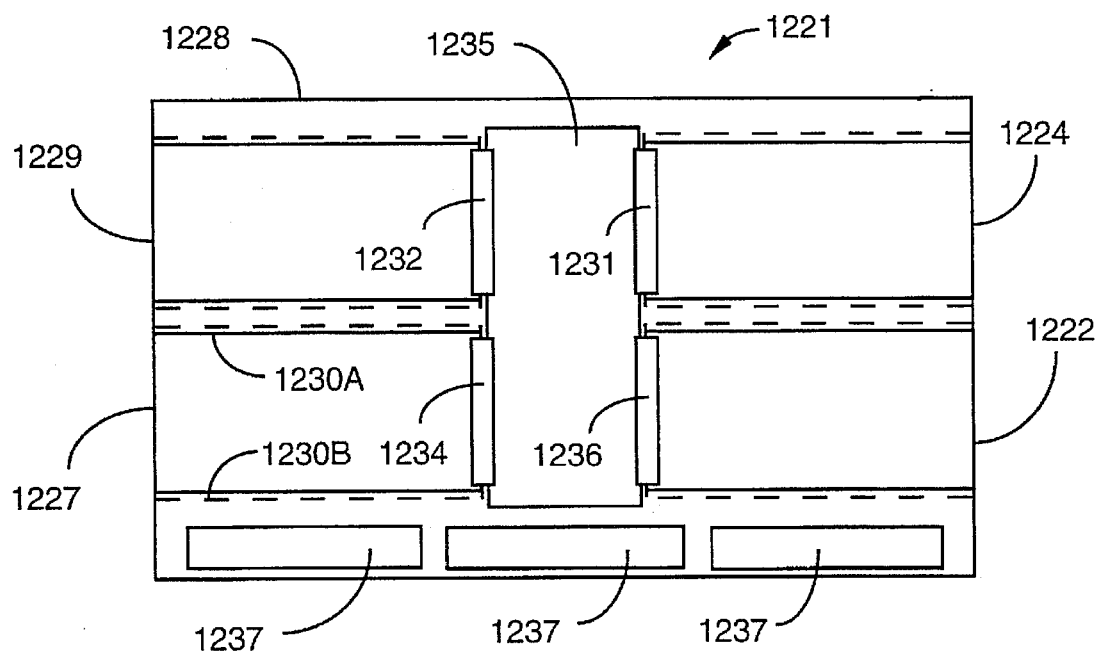
FIG. 43 is a sectioned plan view of the computer framework of FIG. 42A taken along section line 43—43 of FIG. 42B.

FIG. 43 is a simplified plan sectional view of computer 2221 taken according to section line 43—43 of FIG. 42B. Frame 2228 frames four PCMCIA module bays 2222, 2224, 2227 and 2229 arranged in a planar array. A printed circuit board structure 2235 is fastened and positioned down the center of frame 2228, and connectors 2231, 2232, 2234 and 2236 are connected to the printed circuit board structure and present their pin structure outward toward the respective bay areas. In the presently described embodiment, the internal connectors are male connectors, but this is not a requirement of the invention.

Slots 2230A and 2230B serve to guide a PCMCIA-type card into module bay 2227, and similar slots are located in each of the other module bays shown as dotted lines in the sectional view. A set of three AA batteries 2237 are located generally in the plane of the module bays and provide a portable power means in one embodiment. In another embodiment, outside power sources may power computer 2221 as described above.

Figure 44:
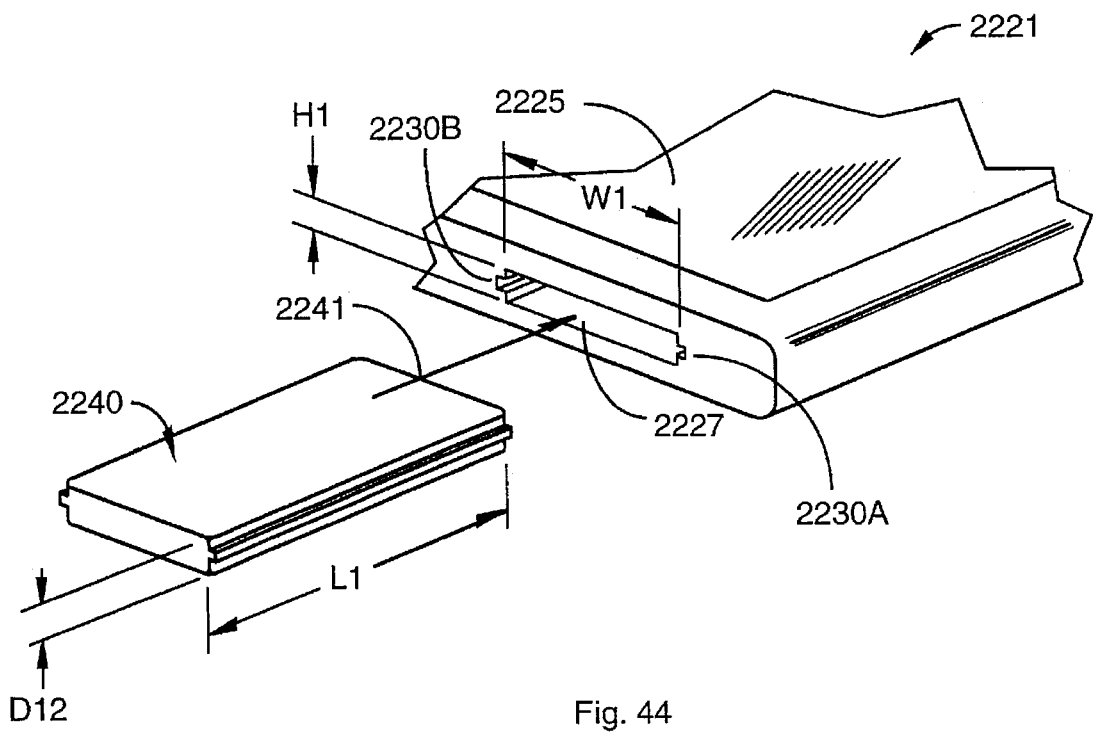
FIG. 44 is an isometric illustration showing a function module and a dedicated docking bay in an embodiment of the present invention.

FIG. 44 is a partial isometric view of a function module 2240 according to an embodiment the invention, aligned with module bay 2227 of computer 2221. Arrow 2241 shows the direction of insertion of the function module. I/O area 2225 is implemented on top of case 2223 in a plane parallel with the plane of the module bays. Module 2240 is a Type 2 PCMCIA card and has a thickness D12. The opening of module bay 2227 has width W1 and height H1. The length of function module 2240 is L1. In this embodiment of the present invention, these dimensions conform to PCMCIA industry standards. In an alternative embodiment of the present invention, module bay 2227 may change in dimension to accommodate other standard or proprietary modules.

Module bay 2227 engages function module 2240 in the full inserted position according to PCMCIA standards. In another embodiment of the invention, detents may be provided similar to those in FIG. 30 for the larger notebook computer embodiment. There are a number of ways known in the art to position and secure a small module. Securing a module may also be accomplished by other means, such as clamping or wedging and/or closing retaining mechanisms.

Figure 45:
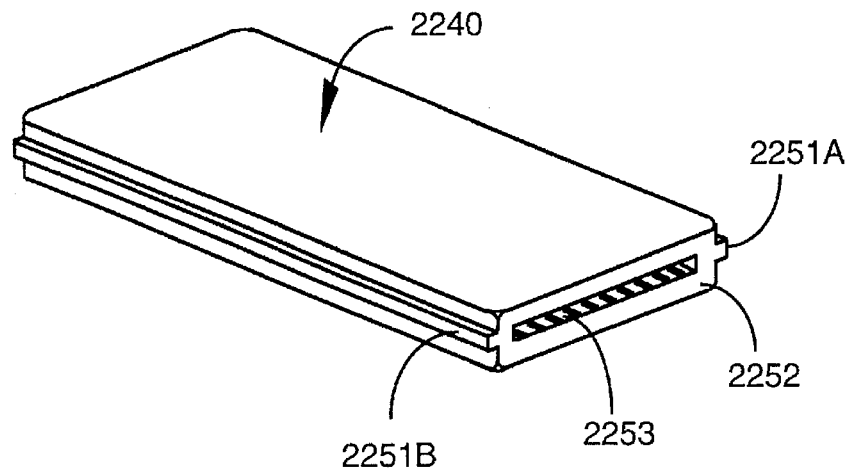
FIG. 45 is another view of a function module according to an embodiment of the present invention.

FIG. 45 is an enlarged isometric view of function module 2240 according to Type 2 PCMCIA standards. Back face 2252 includes a female connector 2253 for mating with a male connector positioned in each module bay, such as connector 2231 in FIG. 42B and FIG. 43. Connectors 2231 and 2253 are PCMCIA connectors and interface according to that industrial standard. Guide 2251A and 2251B are sized according to the PCMCIA standards.

Function modules are provided in many models capable of a wide range of functions. For example, computer 2221 in one embodiment has no onboard CPU or system memory. These functions are provided by function modules that may be inserted in any one of the available module bays. Other kinds of function modules that may be inserted include I/O system modules that provide speech-based, pen-based or keyboard based input. There are also floppy-disk drives, hard-disk drives, flashcard memory modules, LAN and modem adapters, Fax modules, specialty modules such as data acquisition modules adapted to specific equipment, specialty video modules, modules to adapt scanner peripherals to the computer, telephone adapters, and more.

In the case of I/O modules, necessary software, and in some cases firmware and hardware, may be connected to the internal bus structure by the insertion of a module. For example, a module is provided in one embodiment comprising an induction coil and a controller for decoding signals received via a varying magnetic field and providing code to the computer's internal bus. The varying magnetic field is produced by a stand-alone keyboard wherein the keystrokes are coded and transmitted as signals on the field.

In another embodiment, a similar module provides for communication from an auxiliary pen-based input pad. In yet another embodiment, a plug-in module provides a microphone, DSP circuitry, and necessary software to accept input from a user by voice, and to convert the voice input to machine-readable code. Provision of the necessary software and circuitry in these instances in module form provides for maximum flexibility an upgradability for modular systems according to the invention.

Electronic Architecture

Figure 46:
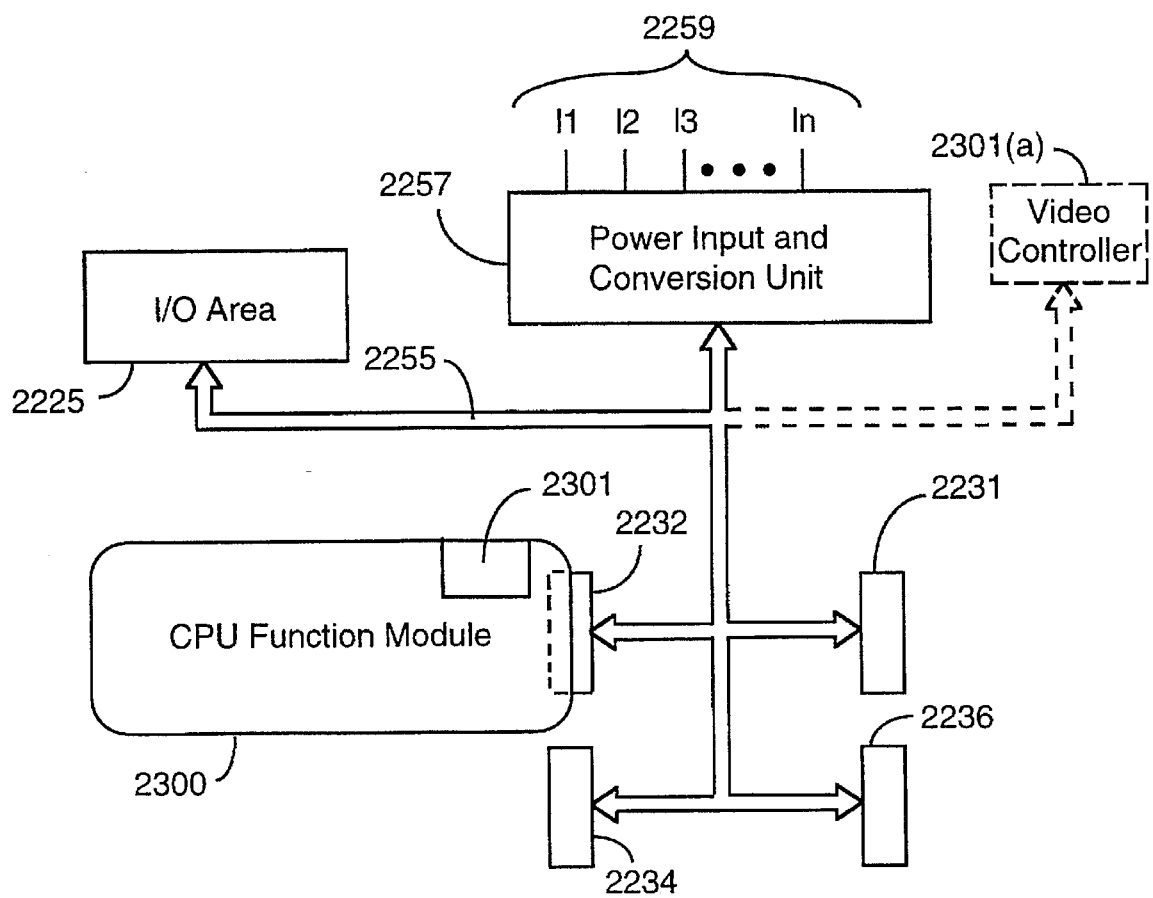
FIG. 46 is a block diagram of a compressed bus and connection to docking bays in a computer framework according to an embodiment of the present invention.

FIG. 46 is a block diagram showing internal elements of palmtop computer 2221, connected to show the electronic architecture of the modular computer according to an embodiment of the invention. A power input and/or conversion unit 2257 is housed in case 2223 (FIG. 42A) and has ports 2259 for power inputs. Power input may be from AA batteries 2237 (FIG. 43) or from an optional conversion unit via outside electrical sources. Conversion unit 2257 senses the input conditions and selects appropriate circuitry to convert the input to the voltages needed to power the elements of the system. Output from the conversion unit is to bus 2255, which comprises paths for power as well as for digital information such as data and addresses.

Because there are a wide variety of function modules, as indicated above and described in more detail below, there needs typically to be more than one power line in bus 2255. For example, computer 2221 may utilize hard disk drive modules, and these modules are preferably provided without onboard power sources. The motor drive for a hard disk requires a different power configuration (voltage and current) than does a CPU, for example, so there may be parallel power lines of differing size and voltage level in bus 2255. Bus 2255 may have a line for 24 V DC, another for 12 V DC, and yet another for 5 V DC, as well as perhaps multiple ground lines.

Bus 2255 connects I/O area 2225 and transmits video signals from a video controller. The video controller may be integral to a function module, which is shown as video controller 2301 in a CPU function module 2300, or implemented in the case, shown as optional video controller 2301(a). As described above in a preferred embodiment of the present invention, I/O area 2225 is a combination display with an overlaid touch sensitive screen. In another aspect, the I/O area may comprise an active-matrix display, in which case, dedicated analog driver lines from video controller 2301 connect to the display. I/O area 2225 may also comprise a conventional LCD display wherein I/O control logic is a function of an installed and dedicated I/O peripheral modules. In an alternative embodiment, video controller 2301 is built into case 2223 (FIG. 42A), and connected directly to bus 2255, similar to the modular notebook computer described above.

Bus 2255 connects to each of module bays 2222, 2224, 2226 and 2227 (FIG. 43) through connectors 2232, 2234, 2236 and 2231. When a function module, such as CPU module 2300, is inserted into a module bay, female connector 2253 (FIG. 45) mates with the respective male connector 2232 located in that module bay, and circuitry inside the CPU module is then connected to bus 2255.

Palmtop Function CPU Module

The onboard video controller 2301 built into CPU function module 2300 is a unique feature in one aspect of the present invention. A user is provided an ability to tailor the CPU power and type of video controller to the other modules and applications for palmtop computer 2221. This provides a simple means for upgrading by switching CPU function modules. Video signals are local to the CPU, which increases system performance.

Figure 47:
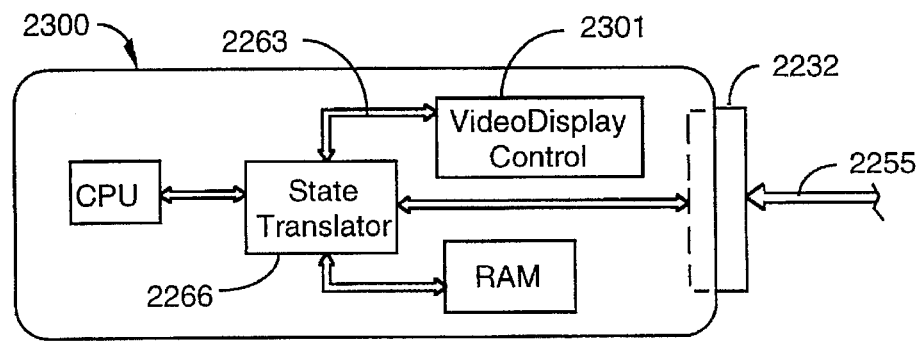
FIG. 47 is a block diagram of a CPU function module according to an embodiment of the present invention.

FIG. 47 is a more detailed diagram of CPU module 2300 for computer 2221. CPU module 2300 is similar in function to CPU module 2099 (FIG. 33), except for the addition of video controller 2301. Onboard video controller 2301 is bus connected by line 2263 to a state translator 2266. In this embodiment of the invention, the state translator is configured to transmit and receive video signals and commands over bus 2255 via connector 231 as well as other functions as described above.

Other Aspects and Features

The embodiments of the present invention described above specifically address notebook-type and palmtop-type computers. The embodiment described below addresses yet another aspect of the palmtop type computers.

Figure 48:
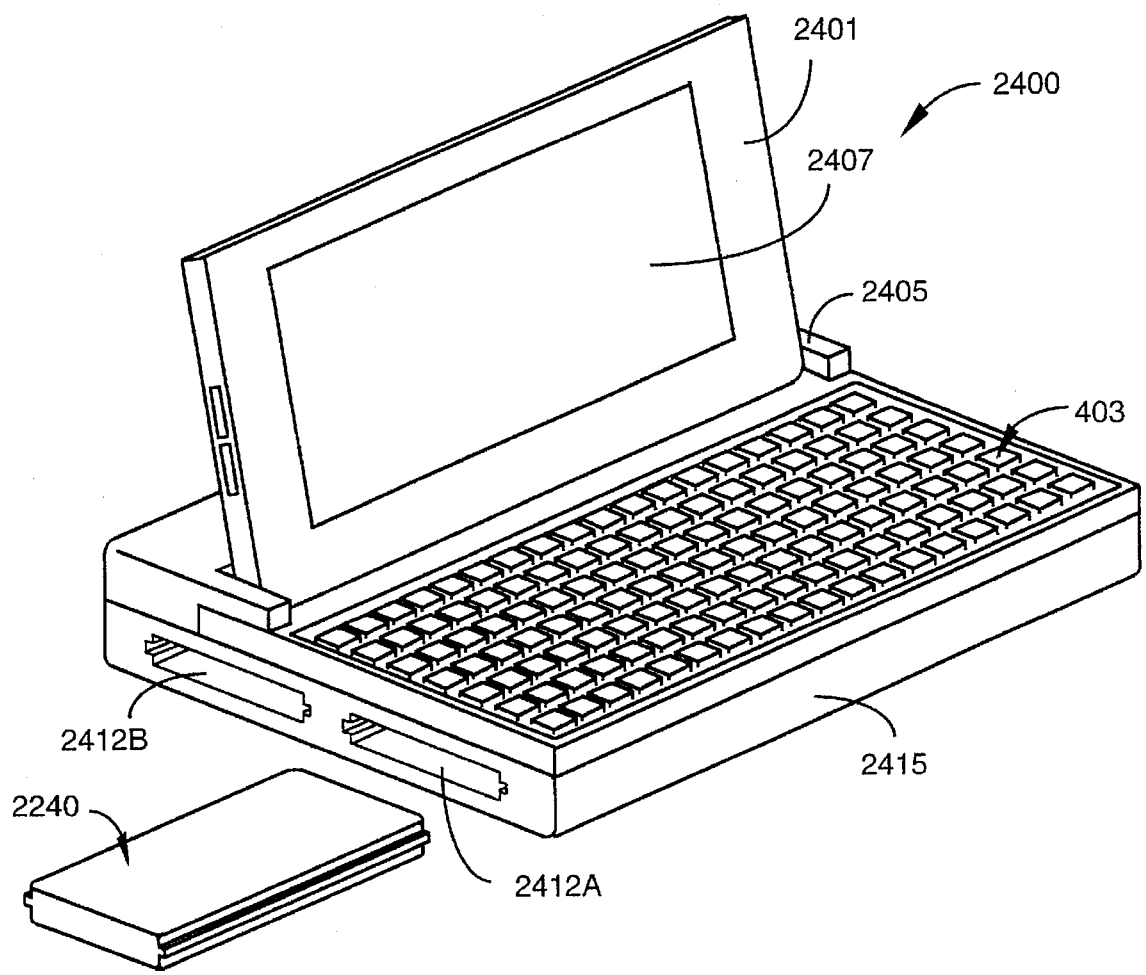
FIG. 48 is an isometric drawing of modular palmtop computer according to another embodiment of the present invention.

FIG. 48 is an isometric drawing of another embodiment of the present invention. Computer 2400 comprises an attached pivotable display case 2401 and a fixed keyboard 2403. The display case rotates about a hinge 2405 and closes in a fixed detented position above the keyboard. Display case 2401 comprises a flat-panel display 2407. There are two PCMCIA-type module bays 2412A and 2412B on one side of the case, and two more (not shown) on the side opposite. The four PCMCIA module bays are arranged in a planar array as described above. A frame 2415 contains a bus structure (not shown) that interconnects all aspects of the PCMCIA type module bays to computer 2400 as described above. In this embodiment of the present invention, a standard keyboard controller (not shown) enclosed in frame 2415 connects keyboard 2403 to the internal bus structure.

It will be evident to one with skill in the art that there are many changes that might be made without departing from the spirit and scope of the invention. Many of these alternatives have been described above. For example, there may be more than the four module bays described, or fewer. There may also be more than one planar array of module bays. To provide more docking bays in a compact arrangement, one might privide two or more planar levels, with multiple docking bays in each plane. Similarly, there are many ways modules may be built to be docked in a framework such as computer 2011, 2221 and 2400 to form a planar array. There are similarly many different kinds of connectors that might be utilized as well as many kinds of compressed buses that can be used. There are many kinds of modules that may be provided, and many other changes that might be made within the spirit and scope of the invention.

It will be apparent to one with the skill in the art that there are many changes that might be made and many other combinations that might be made without departing from the spirit and scope of the invention. There are, for example, many ways to implement the support structure of the μPDA, and to interconnect the active components. One way has been illustrated by FIG. 2 and described in accompanying text. There are many alternatives to this preferred structure. There is also a broad range of sizes and form factors that might be assumed by devices according to the present invention. The use of well-known PCMCIA form factors has been disclosed, but other sizes and forms might also be provided in alternative embodiments. In larger embodiments, on-board peripherals may be implemented.

In addition to these alternatives, there are various ways the connectivity of a μPDA bus might be provided. The well-known PCMCIA standard has been disclosed as a preference, but other connectivity may also be used in alternative embodiments. Memory types and sizes may vary. Means of providing a security code may vary. The nature of the internal bus may vary. There are indeed many variations that do not depart from the spirit and scope of the invention.

What is claimed is:

1. A digital assistant, comprising:

an enclosure for enclosing and supporting internal elements;

a local CPU within the enclosure for managing functions of the digital assistant;

a local memory connected to the local CPU by a bus the local memory for storing data and executable routines;

a power supply within the enclosure for supplying power to power-using elements of the digital assistant;

a flat-panel display operable by the local CPU and implemented on a surface of the enclosure;

input apparatus connected to the local CPU for providing commands and data to the digital assistant; and a host interface comprising a host interface bus connected to the local CPU and to a first portion of a host interface connector at a surface of the enclosure, the host interface configured to directly connect the local CPU to a compatible bus structure of a host computer having a host CPU and a host memory, the host interface bus including address lines, data lines, and control signal lines, the control signal lines including read/write control signals and at least one memory control signal;

wherein the flat-panel display comprises a matrix of elongated electroluminescent cells substantially orthogonal to the plane of the flat-panel display, with individual cells having excitation electrodes along opposite elongated edges of the cells providing excitation voltage parallel to the plane of the flat-panel display.

2. A digital assistant as in claim 1 additionally comprising an expansion bus interface comprising an expansion bus connected to the local CPU and to a first portion of an expansion bus connector implemented on a surface of the enclosure.

3. A digital assistant as in claim 1 additionally comprising a nonvolatile storage device connected to the local CPU and containing a code unique to the digital assistant, for uniquely identifying the digital assistant to connecting digital devices.

4. A digital assistant as in claim 3 wherein the nonvolatile storage device is an EEPROM device.

5. A digital assistant as in claim 1 wherein the power supply comprises a user-accessible well having electrical connections for a storage battery.

6. A digital assistant as in claim 1 wherein the power supply comprises a solar energy conversion panel having electrical connections for attaching to and recharging a storage battery.

7. A digital assistant as in claim 1 wherein the input apparatus comprises a pointer device for providing positional and directional input for control operations performed in conjunction with the flat-panel display.

8. A digital assistant as in claim 7 wherein the pointer device comprises a thumbwheel implemented at one corner of the enclosure.

9. A digital assistant as in claim 7 wherein the pointer device comprises a four-way pressure-sensitive region on a surface of the enclosure.

10. A digital assistant as in claim 1 wherein the memory comprises a ROM portion for storage of executable routine and a RAM portion for storage of data.

11. A digital assistant as in claim 1 wherein, upon connecting to the compatible bus structure of the host computer, the local CPU requests security identification from the host computer, and grants access to the local memory selectively based on the security identification.

12. A digital assistant as in claim 11 wherein, after security identification, the local CPU cooperates with the host CPU to update files in both the host memory and the local memory depending on prestored criteria.

13. A digital assistant as in claim 1 additionally comprising read-only (ROM) memory having compressed code, wherein the compressed code is decompressed into random access memory (RAM) for execution by the local CPU.

* * * * *